(12) United States Patent
Shai

(10) Patent No.: US 11,294,424 B2
(45) Date of Patent: Apr. 5, 2022

(54) FLEXIBLE DEVICES AND RELATED METHODS OF USE

(71) Applicant: SAMSUNG ELECTRONICS CO., LTD., Suwon-si (KR)

(72) Inventor: Saar Shai, Kochav Yair (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/448,423

(22) Filed: Jun. 21, 2019

(65) Prior Publication Data

US 2019/0311692 A1 Oct. 10, 2019

Related U.S. Application Data

(63) Continuation of application No. 15/281,359, filed on Sep. 30, 2016, now Pat. No. 10,339,892, which is a continuation of application No. 13/123,717, filed as application No. PCT/IB2009/054475 on Oct. 12, 2009, now Pat. No. 9,459,656.

(60) Provisional application No. 61/104,733, filed on Oct. 12, 2008.

(51) Int. Cl.
*G06F 1/16* (2006.01)
*G06F 3/041* (2006.01)
*G06T 3/40* (2006.01)
*G09G 5/00* (2006.01)

(52) U.S. Cl.
CPC ............ *G06F 1/1615* (2013.01); *G06F 1/169* (2013.01); *G06F 1/1626* (2013.01); *G06F 1/1641* (2013.01); *G06F 1/1647* (2013.01); *G06F 1/1652* (2013.01); *G06F 1/1656* (2013.01); *G06F 1/1679* (2013.01); *G06F 1/1684* (2013.01); *G06F 3/0412* (2013.01); *G06T 3/40* (2013.01); *G09G 5/003* (2013.01); *G09G 2340/04* (2013.01); *G09G 2354/00* (2013.01)

(58) Field of Classification Search
CPC .... G06F 3/0414; G06F 3/0412; G06F 1/1615; G06F 1/1641; G06F 1/1647; G06F 1/1652; G06F 1/1656; G06F 1/1679; G06F 1/1684; G06F 1/169
See application file for complete search history.

(56) References Cited

U.S. PATENT DOCUMENTS

| | | | |
|---|---|---|---|
| 6,160,540 A | 12/2000 | Fishkin et al. | |
| 6,680,724 B2 | 1/2004 | Lichtfuss | |
| 8,023,060 B2* | 9/2011 | Lin | G06F 1/1652 349/58 |
| 2004/0008191 A1 | 1/2004 | Poupyrev et al. | |
| 2004/0183958 A1* | 9/2004 | Akiyama | G09F 9/30 349/58 |
| 2006/0238494 A1 | 10/2006 | Narayanaswami et al. | |
| 2006/0274036 A1 | 12/2006 | Hioki et al. | |
| 2007/0139391 A1 | 6/2007 | Bischoff | |

(Continued)

*Primary Examiner* — Towfiq Elahi
(74) *Attorney, Agent, or Firm* — Sughrue Mion, PLLC

(57) ABSTRACT

Disclosed are devices which include flexible display sheets or other flexible elements, whereas by physically manipulating said flexible display sheets or elements, interaction with said device may be facilitated. Flexibility features may be employed to provide methods of interaction which include manipulating flexible section. Some of said methods of interaction are disclosed. Further disclosed are units which can connect to flexible display sheets, for interacting with said flexible display sheets.

11 Claims, 34 Drawing Sheets

(56) References Cited

U.S. PATENT DOCUMENTS

| | | | |
|---|---|---|---|
| 2007/0211036 A1* | 9/2007 | Perkins | G06F 1/1615 |
| | | | 345/173 |
| 2007/0247422 A1 | 10/2007 | Vertegaal et al. | |
| 2007/0257821 A1 | 11/2007 | Son et al. | |
| 2008/0212271 A1* | 9/2008 | Misawa | G02F 1/133305 |
| | | | 361/679.01 |
| 2009/0085866 A1 | 4/2009 | Sugahara | |
| 2010/0011291 A1 | 1/2010 | Nurmi | |
| 2014/0028597 A1 | 1/2014 | Cho | |

* cited by examiner

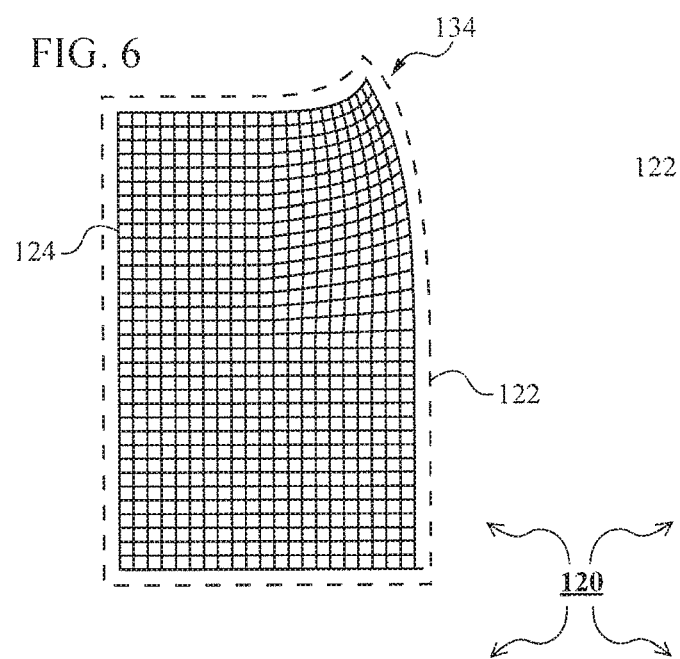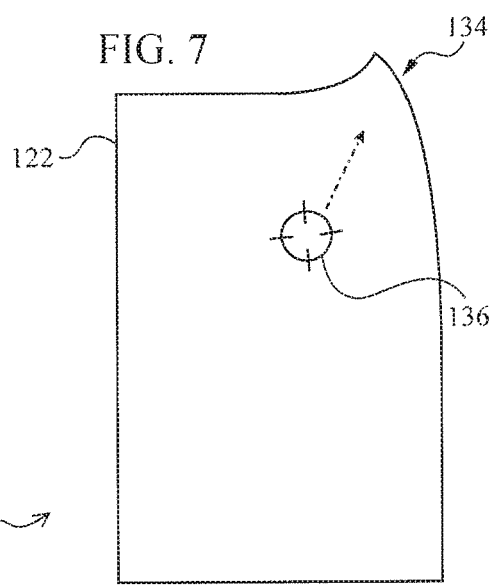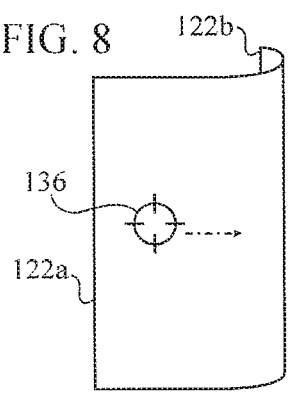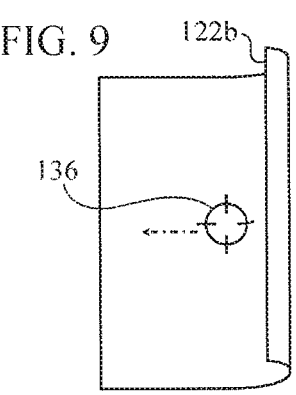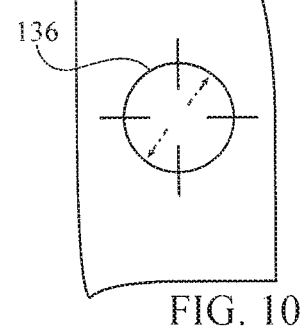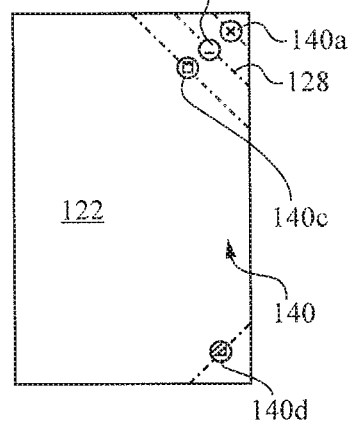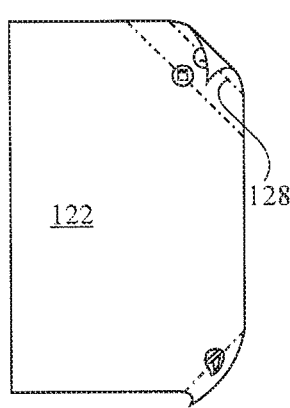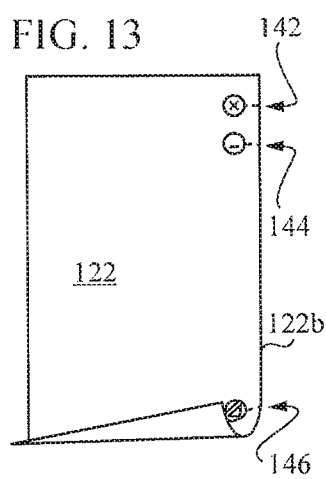

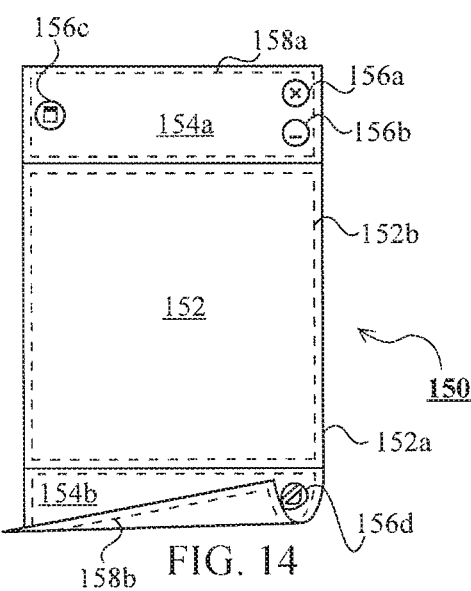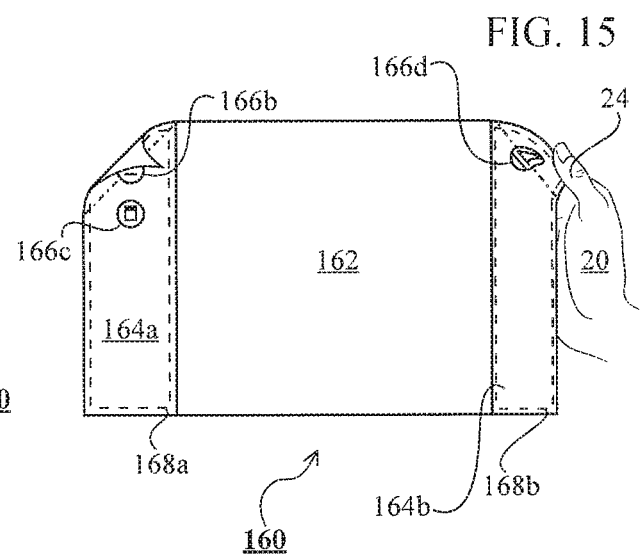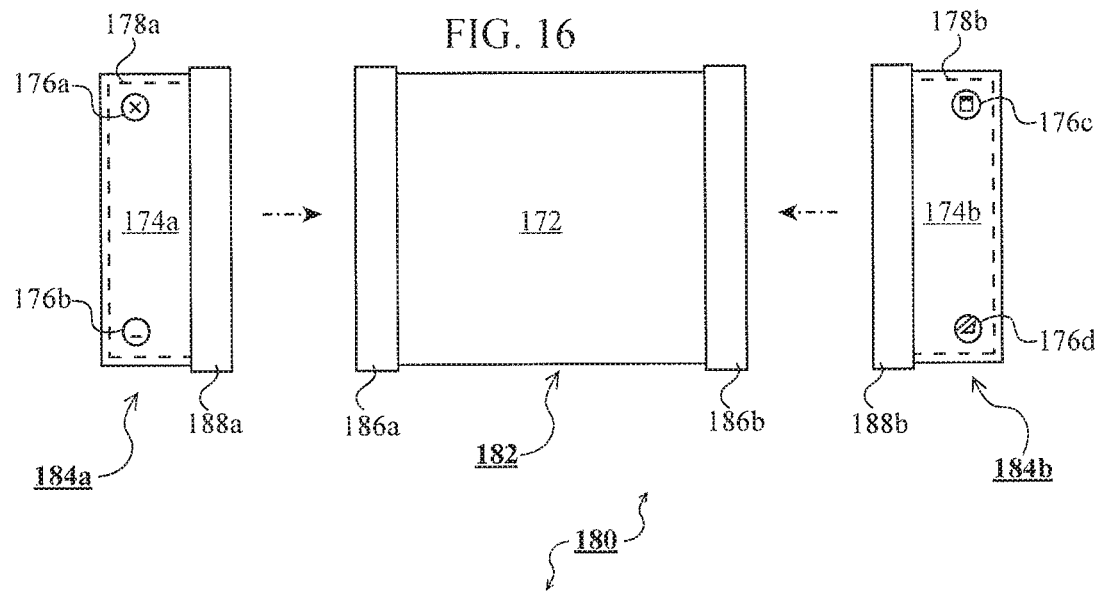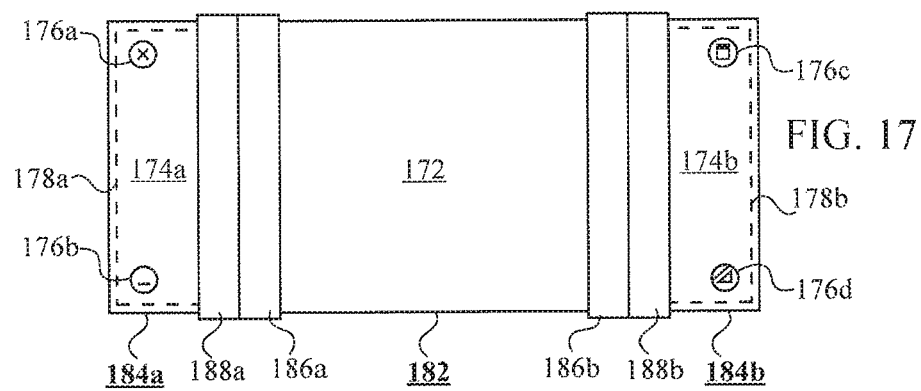

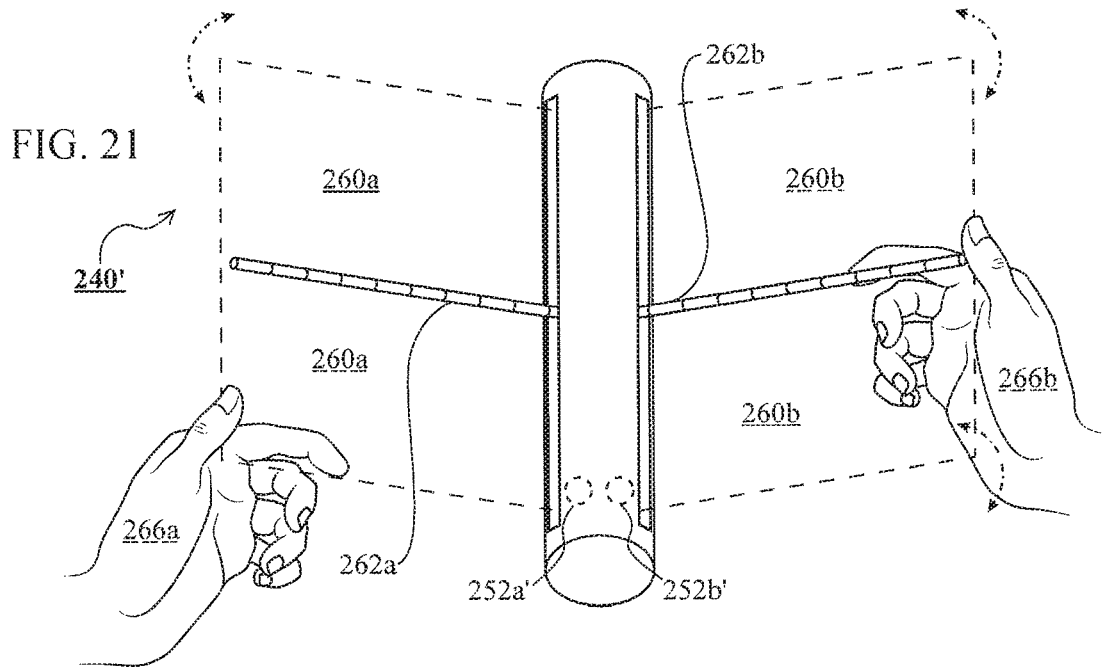
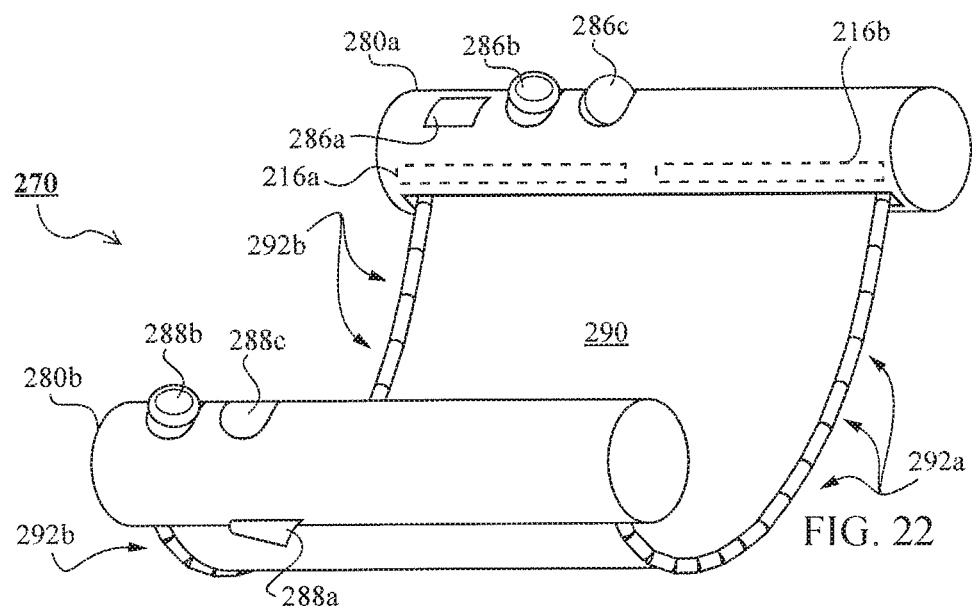
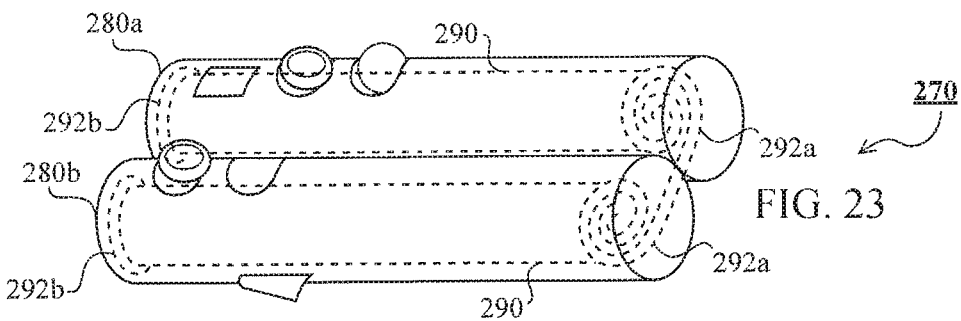

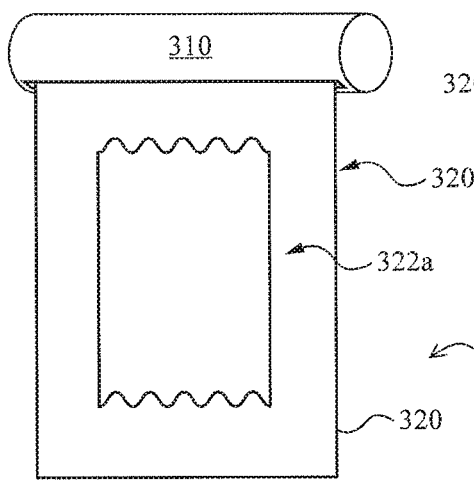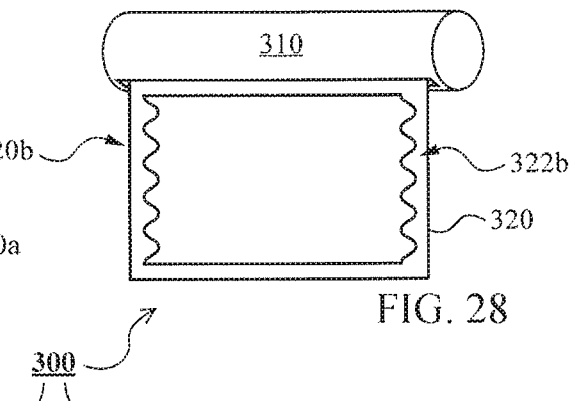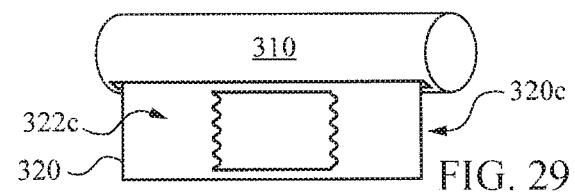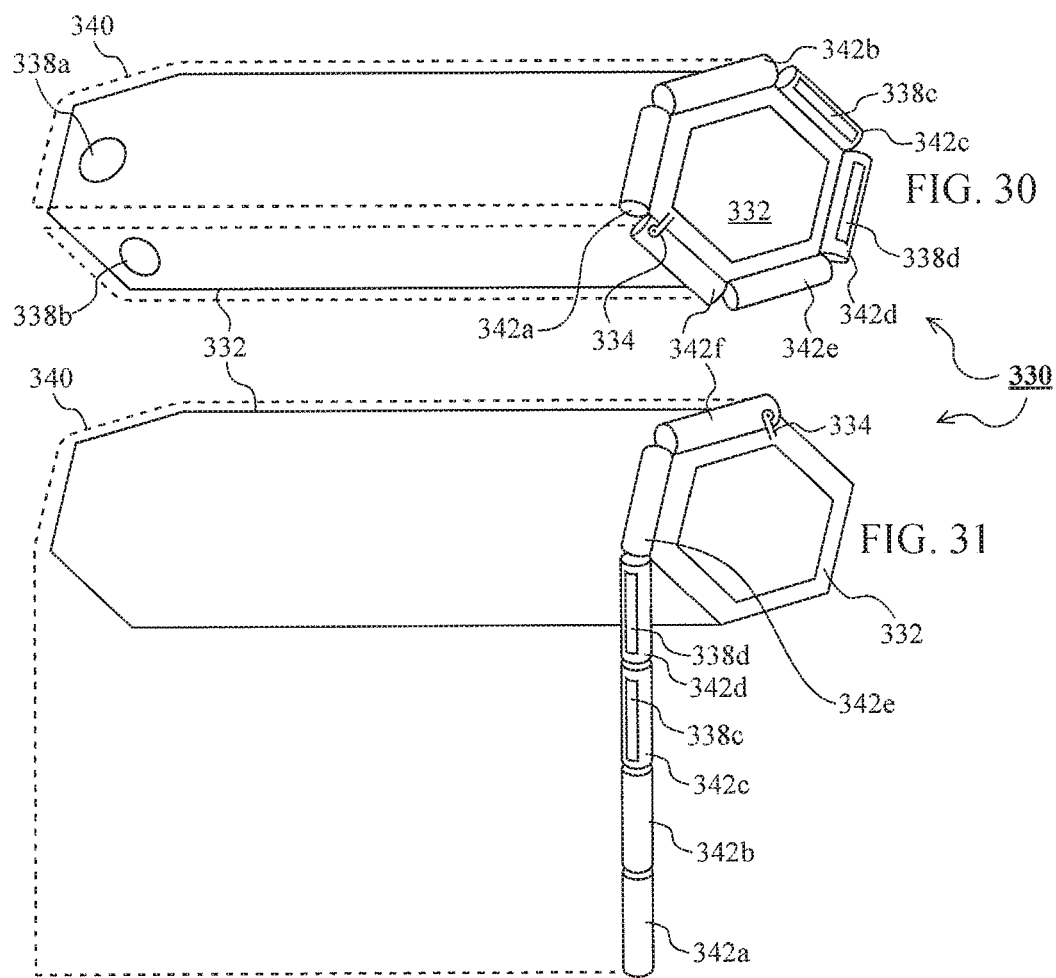

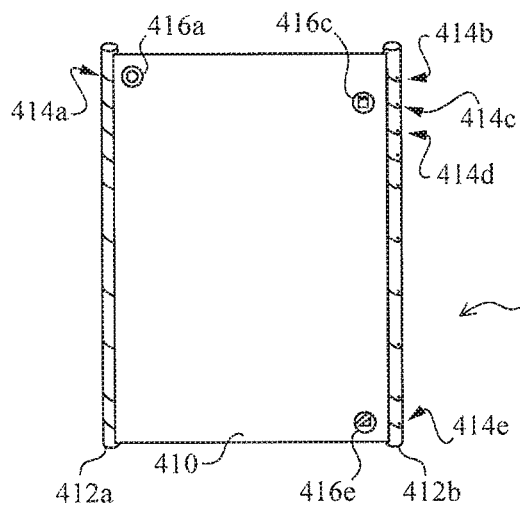
FIG. 39
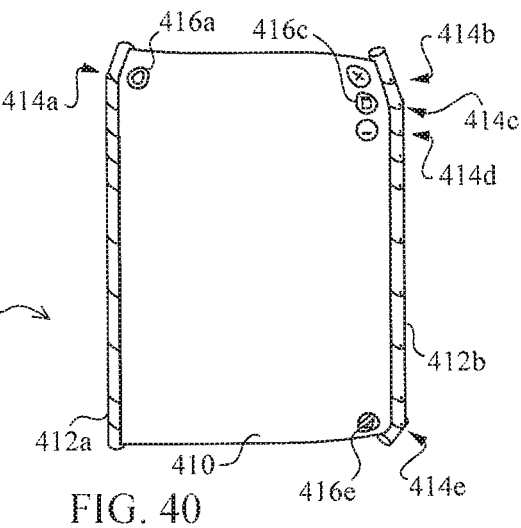
FIG. 40
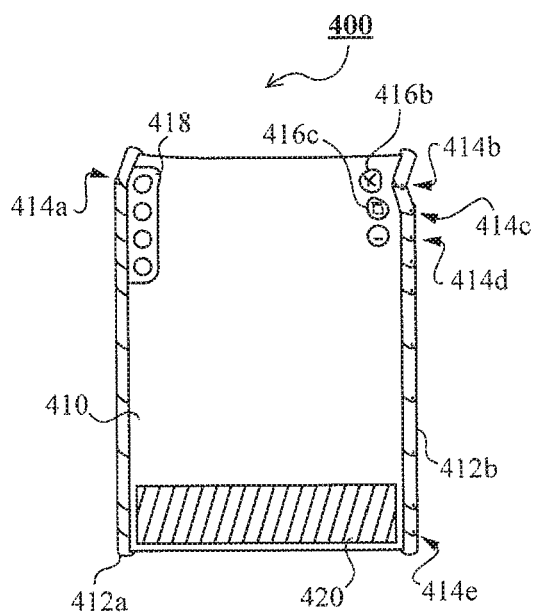
FIG. 41
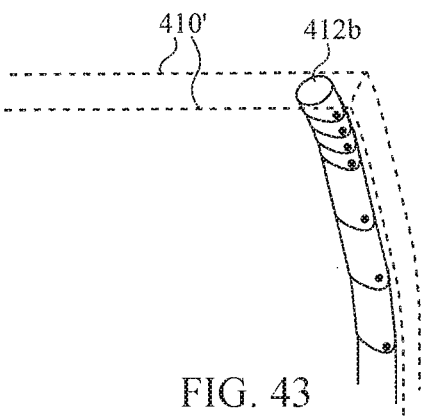
FIG. 42
FIG. 43

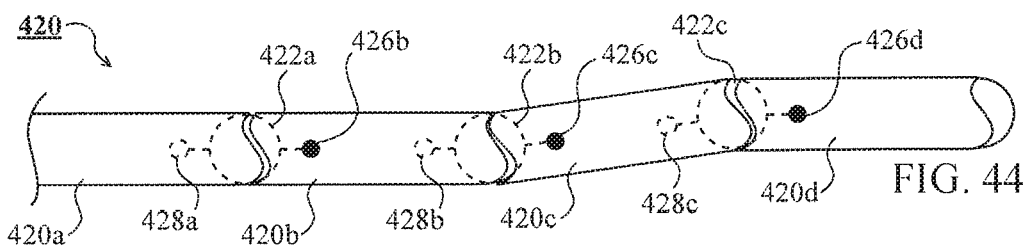
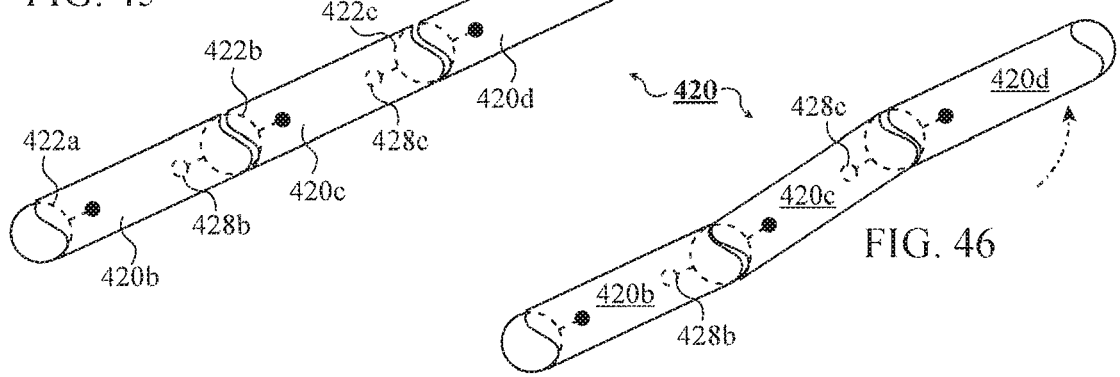
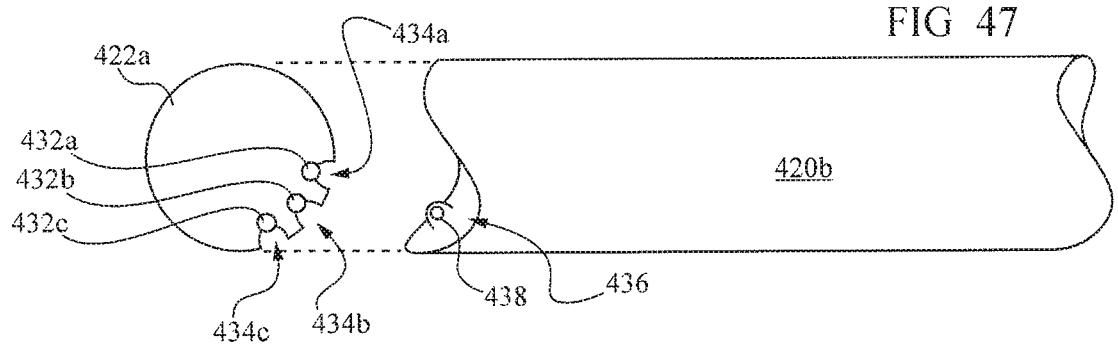
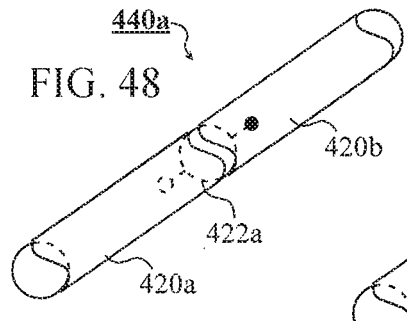
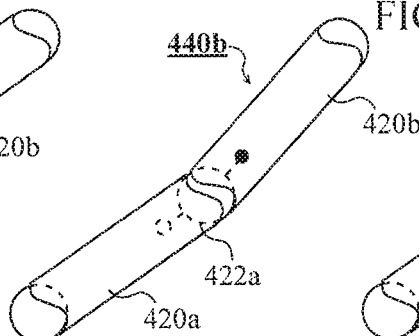
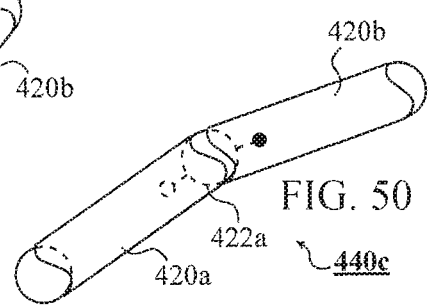

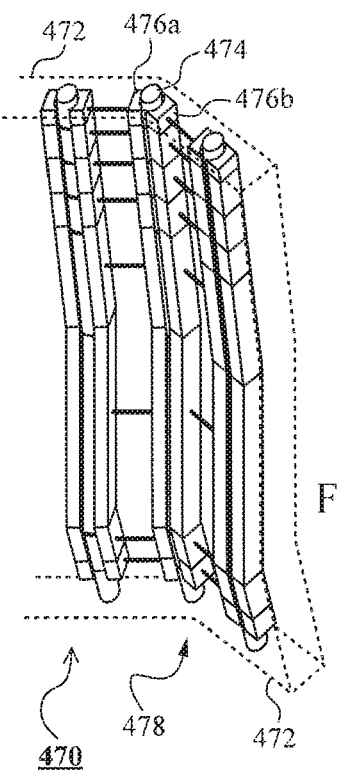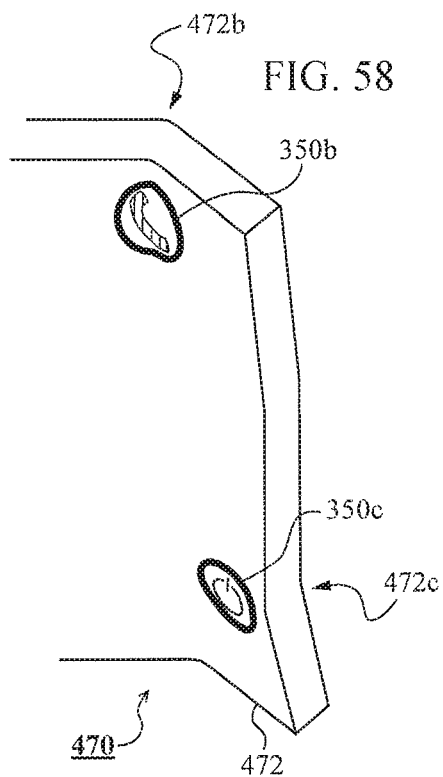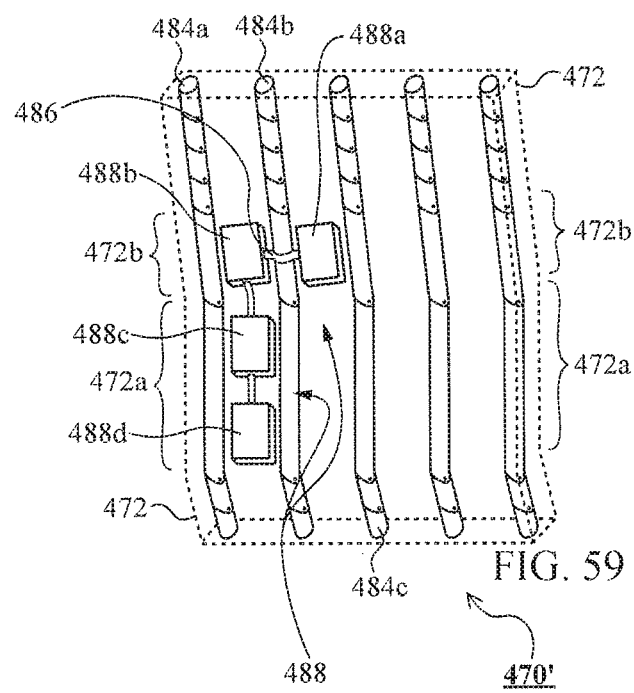

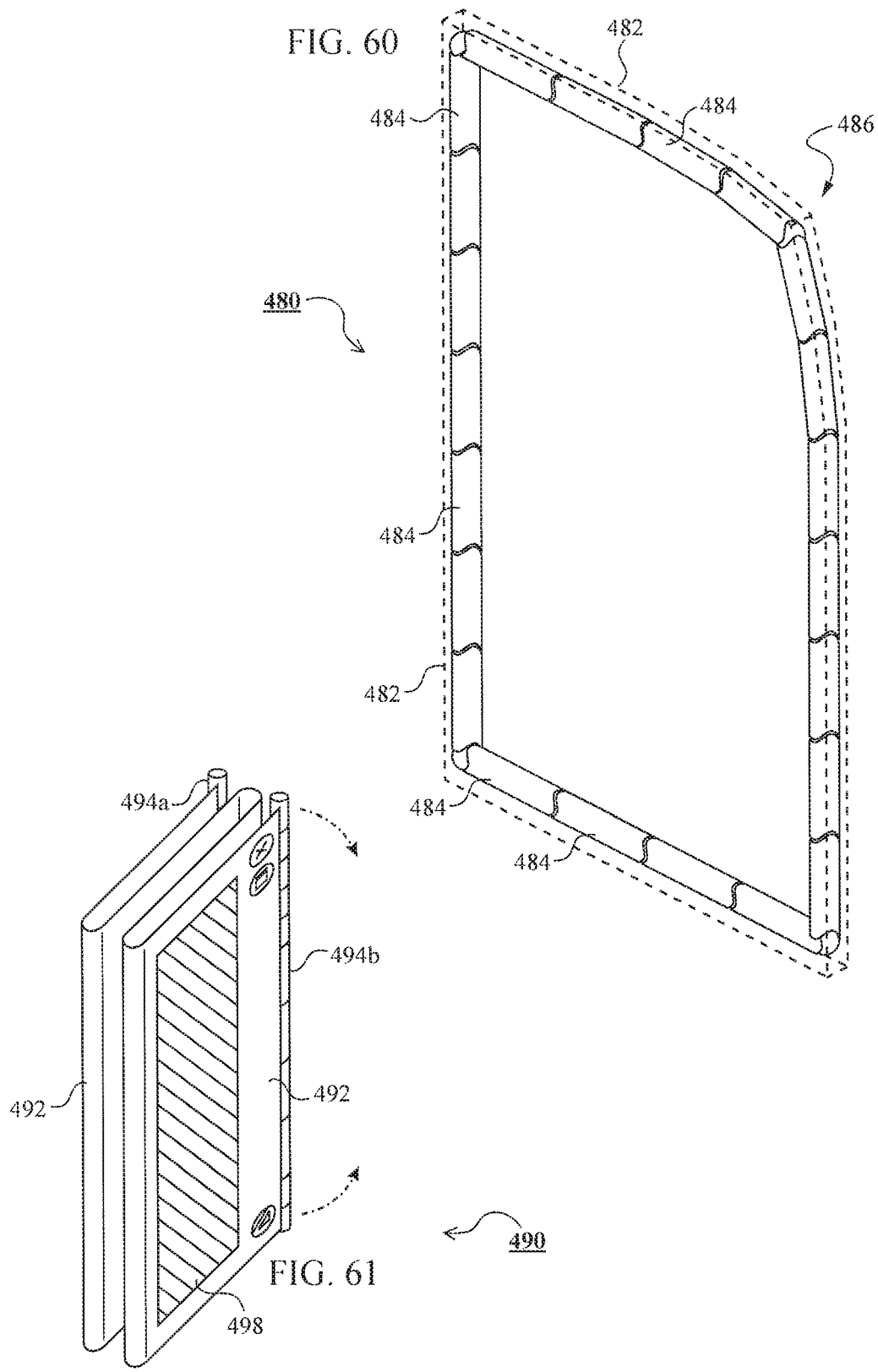

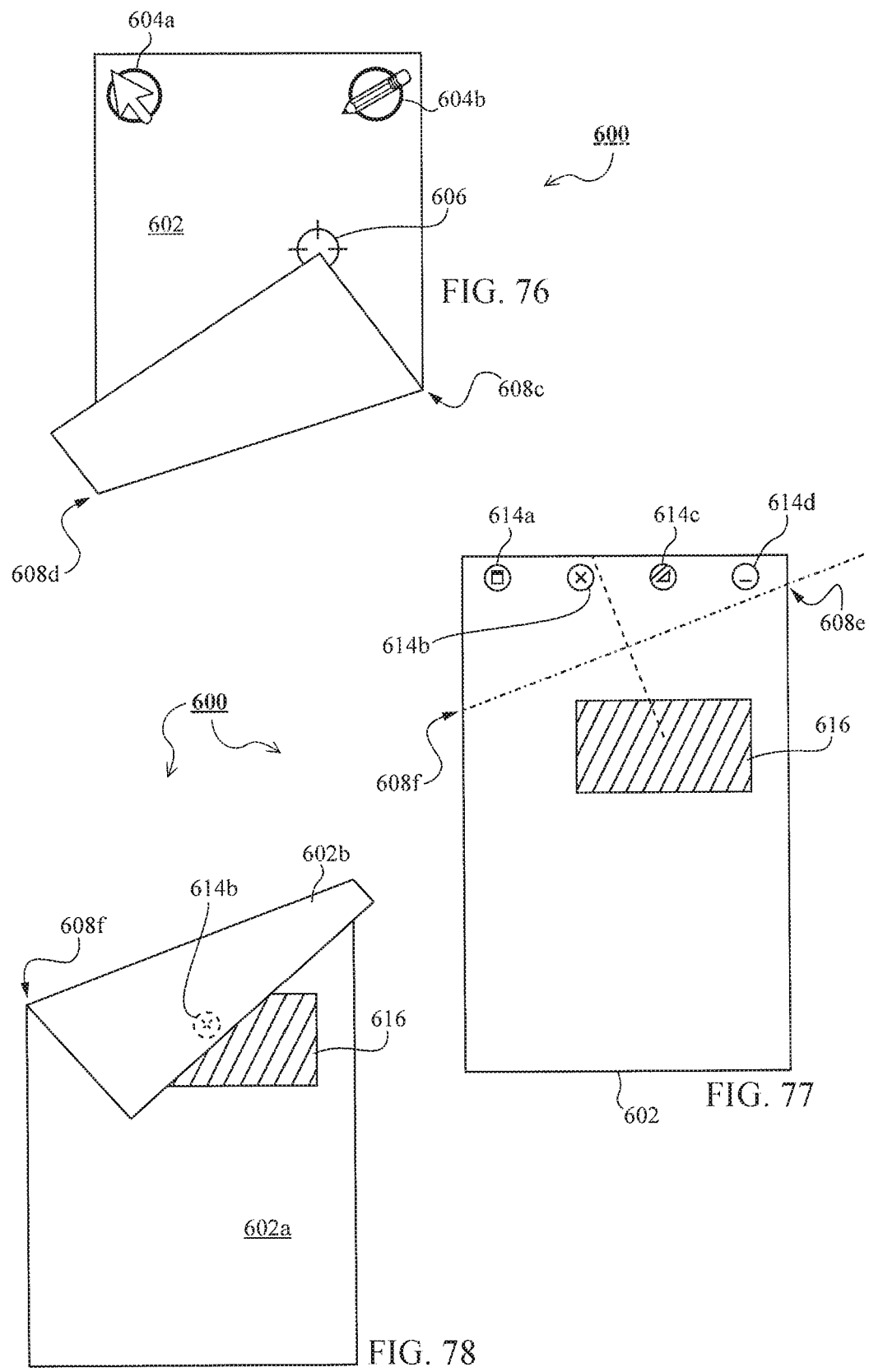

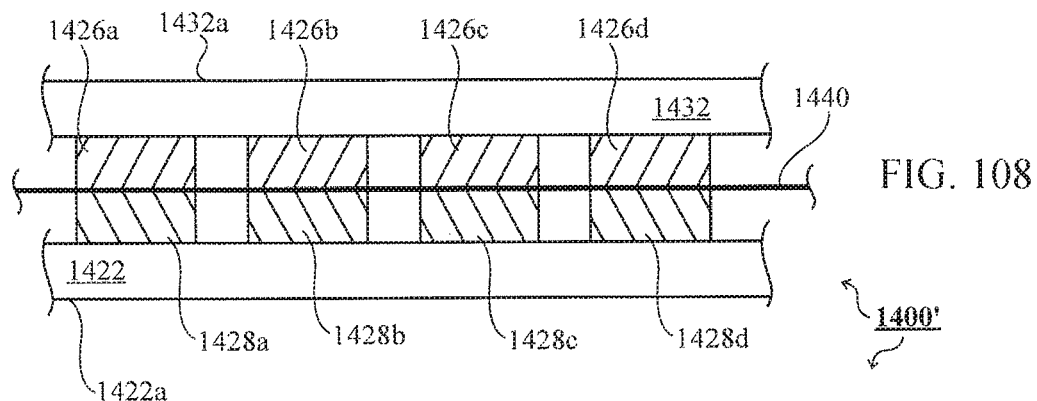
FIG. 108
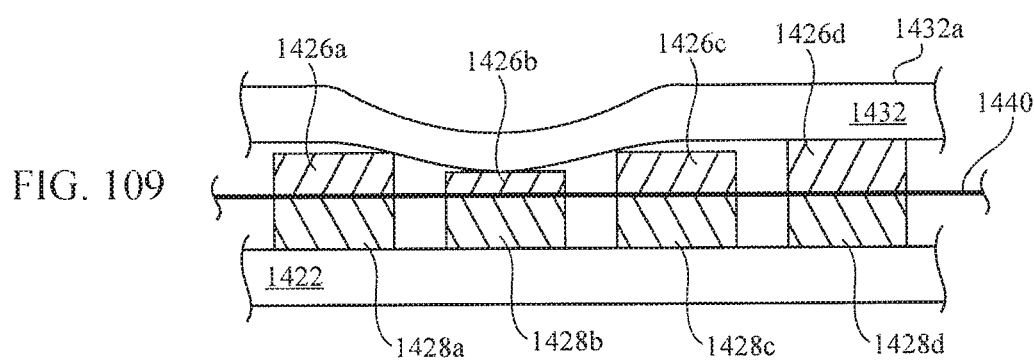
FIG. 109
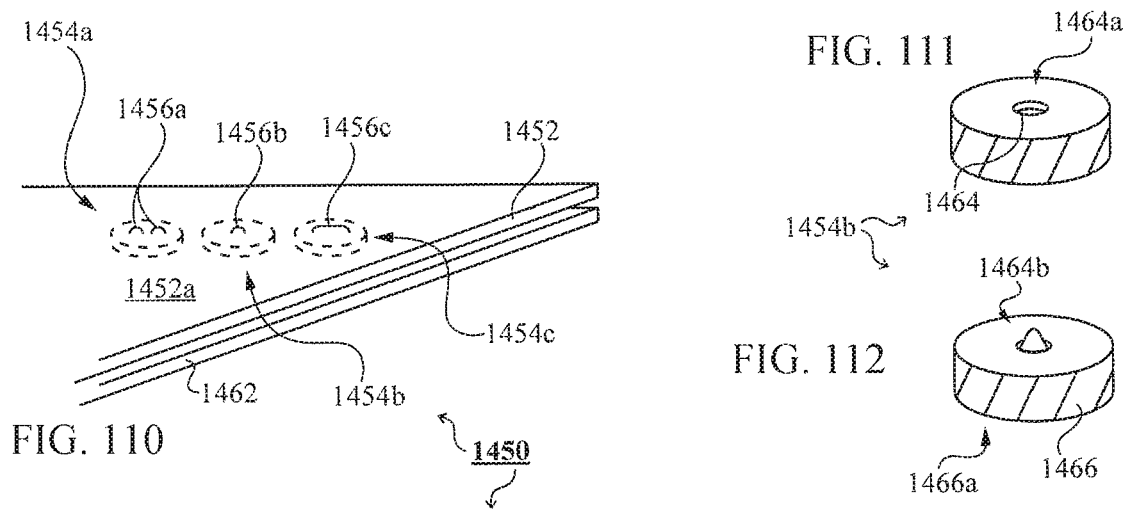
FIG. 110
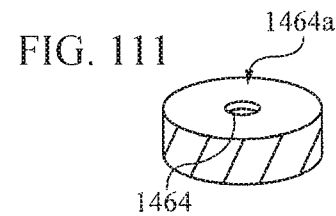
FIG. 111
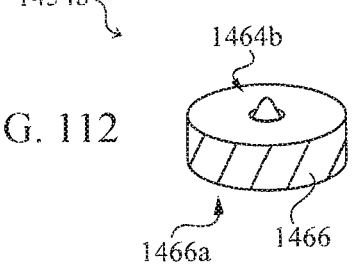
FIG. 112
FIG. 113
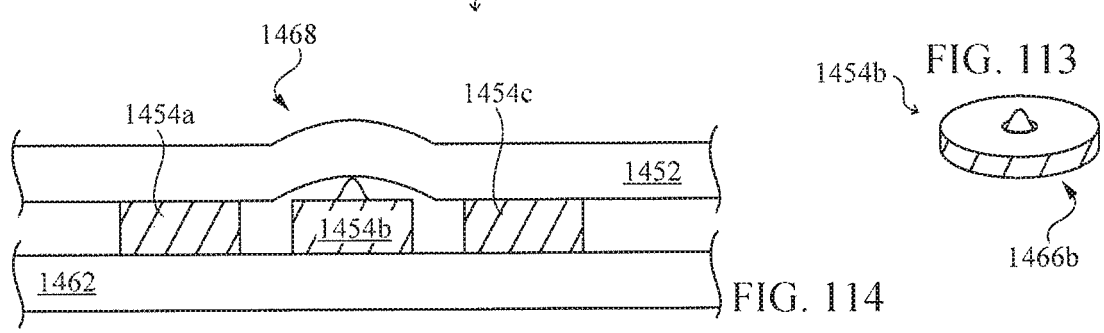
FIG. 114

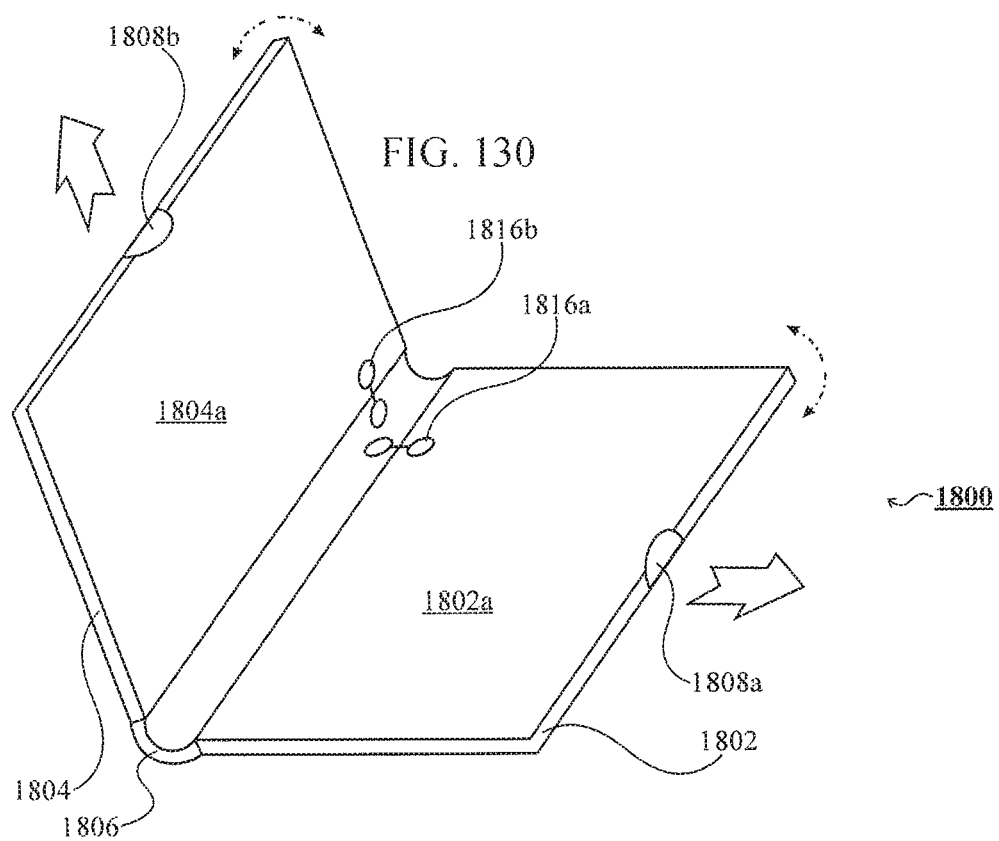
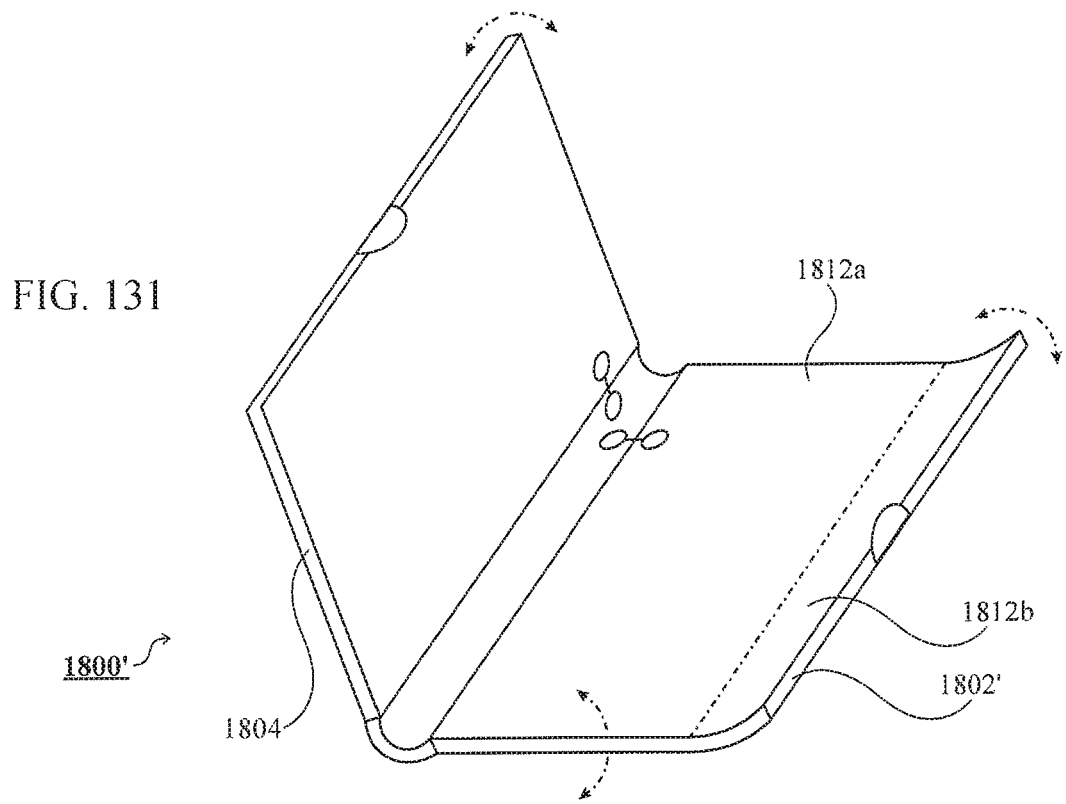

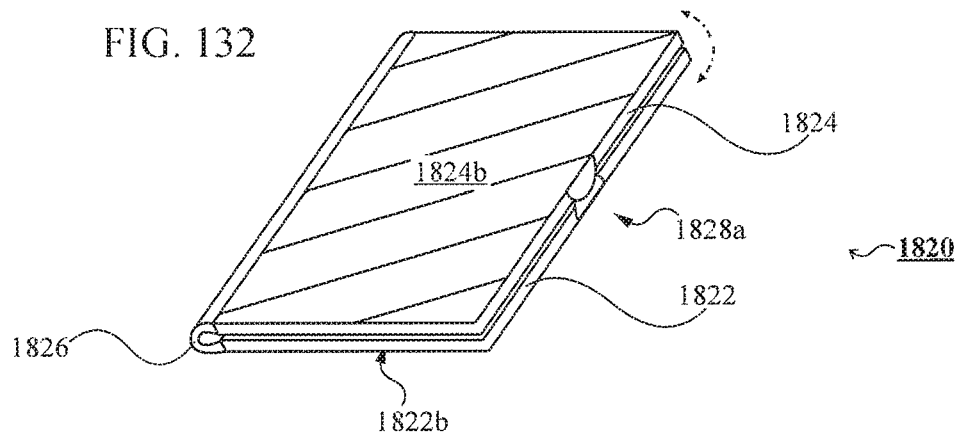
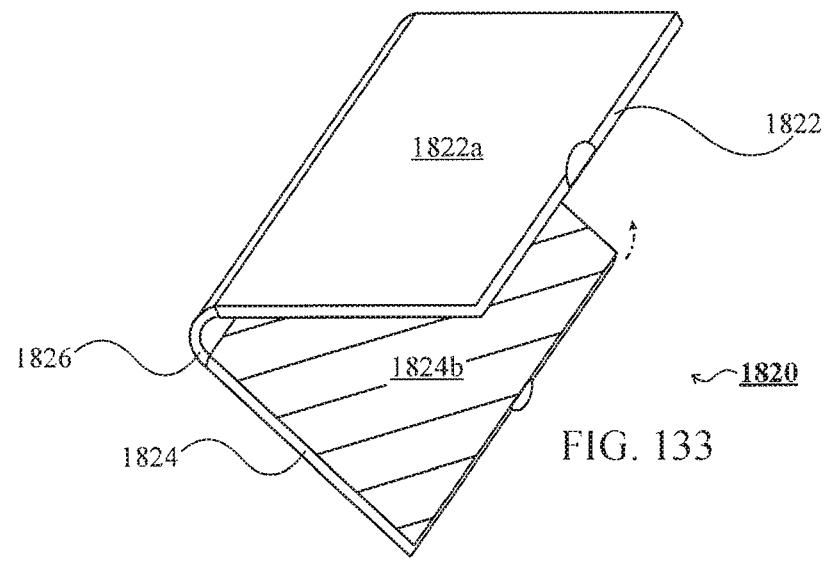
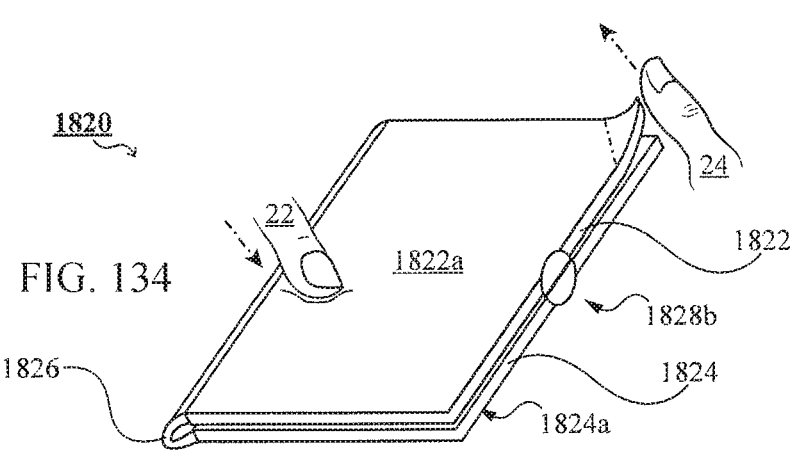

FLEXIBLE DEVICES AND RELATED METHODS OF USE

CROSS REFERENCE TO RELATED APPLICATIONS

This is a Continuation application of U.S. application Ser. No. 15/281,359, filed on Sep. 30, 2016, which is a Continuation of U.S. application Ser. No. 13/123,717 filed Apr. 12, 2011, which issued as U.S. Pat. No. 9,459,656 on Oct. 4, 2016 and is a National Stage application of International Application No. PCT/IB2009/054475 filed Oct. 12, 2009, which claims priority from U.S. Provisional Application No. 61/104,733 filed Oct. 12, 2008, the contents of all of which are incorporated herein by reference in their entireties.

FIELD OF THE INVENTION

The invention relates to the fields of flexible displays and human-computer-interaction (HCI) in general, and flexible display devices and methods of interacting therewith in particular.

BACKGROUND OF THE INVENTION

There are known in the art devices which include flexible displays (see e.g. U.S. Pat. Nos. 6,490,402, 5,469,020, 7,242,315, 5,821,688, 6,680,724, 6,204,902, 7,128,269, 7,274,413, 6,885,032 and 7,161,590). Some such devices (or sections thereof, e.g. the surface of their flexible displays) may be folded or bended such that their flexible displays (or surfaces thereof) may be curved. The flexibility of the displays of these devices gives rise to several advantages, such as portability. By utilizing the flexibility feature of the displays, compact devices may be developed which are generally slim so that they are commercially appealing. And yet, many benefits remain untapped. Some aspects of the similarity of flexible displays to sheets of paper and other bendable surfaces, and shared characteristics therewith, have not yet been exploited. Additionally, maintaining the suggested compact nature may bring about some limitations which have not yet been surpassed. As devices discussed above (i.e. devices which include flexible displays) become more popular and available, there exists a need to address such issues.

Generally, visuals displayed by flexible displays may be a result of users interacting with devices which include such flexible displays. Accordingly, it may be desired to facilitate interacting with said devices, or to facilitate operating them, for controlling what is displayed by said flexible displays.

SUMMARY OF THE INVENTION

The invention provides, in various embodiments, devices and systems which include flexible elements, such as flexible display sheets or stretchable sections, where the invention further provides elements which may facilitate operating or interacting with said devices and systems, or otherwise which facilitate specific features of said device and systems.

Further provided by the invention are methods for operating or interacting with the aforementioned devices and systems.

BRIEF DESCRIPTION OF THE DRAWINGS

The invention is herein described, by way of example only, with reference to the accompanying drawings, wherein:

FIGS. 4 through 13 show another embodiment of the invention;
FIGS. 14 and 15 show another embodiment of the invention;
FIGS. 16 and 17 show another embodiment of the invention;
FIG. 21 shows an embodiment of the invention;
FIGS. 22 and 23 show another embodiment of the invention;
FIGS. 27 through 29 show an embodiment of the invention;
FIGS. 30 and 31 show another embodiment of the invention;
FIGS. 39 through 41 show an embodiment of the invention;
FIGS. 42 and 43 show an embodiment of the invention;
FIGS. 44 through 46 show an embodiment of the invention;
FIG. 47 shows a close-up of a section of an embodiment of the invention;
FIGS. 48 through 50 show an embodiment of the invention;
FIGS. 57 and 58 show a method of operating an embodiment of the invention;
FIG. 59 shows an embodiment of the invention;
FIG. 60 shows an embodiment of the invention;
FIG. 61 shows an embodiment of the invention;
FIGS. 73 through 78 show an embodiment of the invention and interfaces thereof.

FIGS. 108 and 109 show a cross-section of an embodiment of the invention;

FIG. 110 shows an embodiment of the invention;

FIGS. 111 through 113 show an element of an embodiment of the invention;

FIG. 114 shows a cross-section of an embodiment of the invention;

FIG. 130 shows an embodiment of the invention;

FIG. 131 shows an embodiment of the invention;

FIGS. 132 through 134 show an embodiment of the invention;

The drawings constitute a part of this specification and include exemplary embodiments to the invention, which may be embodied in various forms. It is to be understood that in some instances various aspects of the invention may be shown exaggerated or enlarged to facilitate an understanding of the invention

DETAILED DESCRIPTION OF THE INVENTION

It is to be understood that dashed lines in certain figures may have a different purposes of depiction, or a different illustrative functions. For example, in a certain figure, dashed lines may be guide lines for connection (such as common in explosion diagrams), whereas in another figure, dashed lines may illustrate or depict background elements which are supposedly obscured by elements in the foreground.

Figure 1:
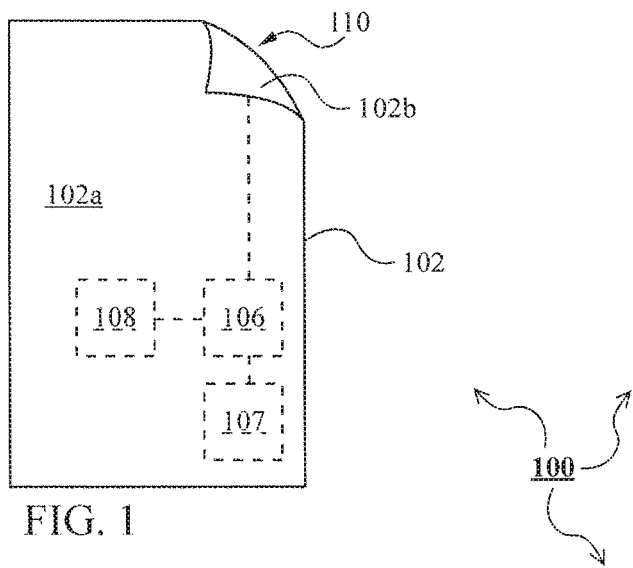
FIG. 1 shows an embodiment of the invention.

FIG. 1 shows an embodiment of the invention as a flexible display device 100 (or simply "device"). Device 100 generally includes a flexible sheet 102 (or simply "sheet") having a front side 102a (or simply "side") on which visuals can be displayed, and a back side 102b (or simply "side"). Accordingly, sheet 102 may be, or may include, a flexible display, such that visuals may be displayed on front side 102a. Sheet 102 is shown in FIG. 1 having a curve 110 at a first corner. The curve may be caused by a temporary bending (or "curving", or "flexing") of said first corner. Said temporary bending may be performed by a user of device 100, such as a person holding sheet 102 and bending said first corner of the sheet. Described in other words, sheet 102 may be a generally flat and straight sheet which is flexible so that the sheet can be bent (or "curved", or "flexed") to a certain extent. By sensing bending of sheet 102 (e.g. sensing curve 110 at the aforementioned first corner, in FIG. 1), input can be registered at device 100, such as by information from the sensing being sent to a processor 106 (optionally included in device 100 as shown in the figure). Sensing of bending may be performed by any means known in the art, or by any means described below for the invention. Accordingly, a user can use (or "operate", or "interact with") device 100 by bending at least one of its corners. As further shown in FIG. 1, device 100 may optionally include (in addition to the described above) a power source 108 which supplies power to operations of the device, such as a battery supplying electricity to electronic components of the device. Device 100 may also include a memory unit 107 connected to processor 106. Processor 106, power source 108 and memory unit 107 are illustrated in the figure by dashed lines, suggesting they may be located inside sheet 102. The processor, power source and memory unit may be interconnected, as illustrated in the figure connected by dashed lines, whereas any of them may be connected to sensing means for sensing bending of sheet 102. Note that it is made clear that any device or system of the invention may include a processor, a power source and/or a memory unit, located anywhere in said device or system. Further note that any device or system of the invention may include any element which can facilitate any of its features as described herein. For example, a device of the invention may include electronic boards having capacitors, resistors, switches, or any other components of electric circuitries. For a similar example, a device of the invention may include an electronic board on which there are installed processor 106, memory unit 107 and power source 108, whereas said electronic board may facilitate the processor, memory unit and power source being connected to each other.

In some embodiments, processor 106, memory unit 107 and power source 108 (or any processor, memory unit and/or power source optionally included in a device or system of the invention) may be flexible, such as by being a flexible and optionally printed microchip (see e.g. U.S. Pat. Nos. 6,307,751 and 5,442,470), Flash memory (see e.g. U.S. Pat. No. 6,515,371) and an organic radical battery (ORB), respectively, as known in the art. Flexible processors, memory units and/or power sources in any device of system of the invention may be located in flexible sections, as they may be curved (or "bent", or "flexed") in accordance with any curving (or "bending", or "flexing") of flexible sections.

Figure 18:
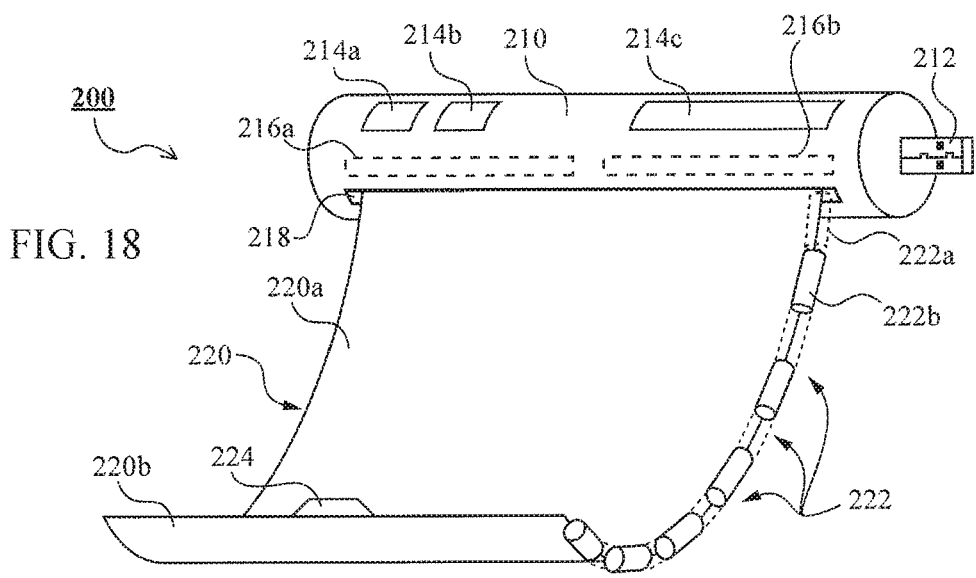
FIG. 18 shows an embodiment of the invention.

Note that in other embodiments, non-flexible processors, memory units and/or power sources may be located in non-flexible sections of devices or systems of the invention (e.g. in a container 210, as described for a device 200 shown in FIG. 18).

Figure 2:
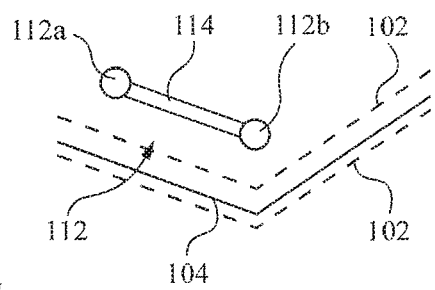
FIGS. 2 and 3 show a section of the embodiment shown in FIG. 1.
Figure 3:
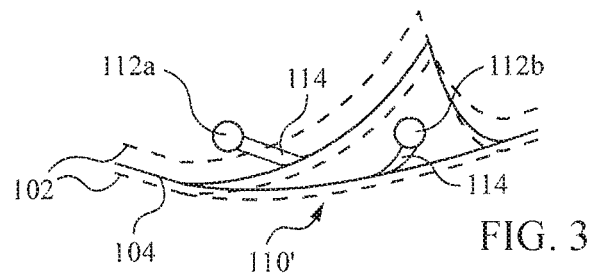

FIGS. 2 and 3 show a section of device 100, specifically a close-up view of a corner of display sheet 102 of the device (e.g. the aforementioned first corner as shown in FIG. 1 being bent, or having a curve 110). In FIGS. 2 and 3, sheet 102 (illustrated by dashed lines) is shown including a sensor 112, such as by sheet 102 being an enclosure inside which is located sensor 112. Sensor 112 may be, or may include, any means of sensing bending of sheet 102, specifically bending at a section shown in FIGS. 2 and 3. Optionally, as shown in the figures, sensor 112 may include a part 112a and a part 112b connected by a flexible section 114, which may be a flexible band or stripe. The sensor is shown to be positioned on a plane 104, near the aforementioned corner of sheet 102 (the corner of which a close-up view is specifically shown in the figures).

Specifically shown in FIG. 3 is sheet 102 being bent (or "curved") for forming a curve 110' similar to curve 110 shown in FIG. 1. When the sheet is bent and curve 110 is formed, the positions of part 112a and part 112b relative to each other may change (as shown the difference of the relative positions of the parts in FIG. 2 from their relative positions in FIG. 3). Additionally, section 114 may be influenced by the bending of sheet 102, or specifically by the changing of the relative positions of parts 112a,b. For example, the shape of section 114 may be modified by the bending of sheet 102. Further additionally, the change in the positions of parts 112a,b relative to each other (caused by the aforementioned bending of sheet 102) and/or the influence on section 114 by the bending, may be sensed, such as for registering input. Otherwise, the forming of curve 110 may influence section 114 and/or the positions of parts 112a,b relative to each other, such that input which corresponds to influence on section 114 and/or on said positions may be registered, such as for executing an operation of device 100, or such as for device 100 to perform a function (e.g. display certain visuals on side 102a of sheet 102).

Following the above, in some embodiments, input may be registered from detection (or "sensing") of bending of sheet 102, or from detection (or "sensing") of a curve (or plurality thereof) formed in sheet 102. Said input may correspond to the bending of the sheet on any section (e.g. a corner) of the sheet, or to the forming of said curve in the sheet, such as by said input corresponding to a bending "event" or to the presence of said curve. Additionally or alternatively, said input may correspond to the direction of said bending, or to the direction of said curve. Accordingly, detecting (or sensing) bending of sheet 102, or a curve formed in sheet 102, may be for registering input. Registering input may be for prompting an operation of device 100. For example, device 100 may display a page of an "e-book" (as known in the art for digitally stored content of a book) on frond side 102a of sheet 102, whereas bending (or "curving") the upper right corner of sheet 102 (when the sheet is held by a user such that side 102a is facing said user) towards back side 102b may be for displaying the following (also "subsequent") page in said "e-book", while curving the upper right corner of sheet 102 towards front side 102a (as shown in FIG. 1) may be for displaying the previous page in said "e-book". Accordingly, a user may flip between pages of said "e-book" by curving the upper right corner of the sheet forward or backward, whereas a curving backward may correspond to viewing a subsequent page (to a page displayed), and whereas curving forward may correspond to viewing a previous page. In other words, flipping forward or backward among pages of an "e-book" displayed by device 100 may be by curving a corner (or plurality thereof) of sheet 102 in corresponding directions.

In some embodiments, the extent to which sheet 102 is curved (or "bent") may also be registered as input, such as being a value that is measured by a sensor and then processed for a function that is associated with said value. For example, curving a corner of sheet 102 to a certain extent may be for flipping between pages in an "e-book" as said pages are displayed on front side 102a, whereas curving said corner to a larger extent (in the same direction) may be for "skipping chapters" (i.e. flipping from the first page of a chapter to the first page of the following chapter, and so on to first pages of subsequent chapters) of said "e-book". Alternatively, curving the corner to a larger extent may be for flipping pages faster, so that the more said corner is curved—the faster the display changes from one page to the other.

Note that sensing bending of a sheet (or plurality thereof) of any device or system of the invention, and/or registering input which corresponds to curves formed on a sheet (or plurality thereof) of any device or system of the invention, may be facilitated by any means known in the art, or in other words may be facilitated by utilizing any means known in the art, which may optionally be different than means described herein for similar purposes (see e.g. U.S. Pat. Nos. 6,127,672, 7,289,121, 6,563,107, 7,296,363, 6,940,062, 5,321,257, 6,556,288, 6,846,286 and 5,086,785). Accordingly, means described herein for sensing bending of a sheet (or plurality thereof) of any device or system of the invention, and/or for registering input which corresponds to curves formed on a sheet (or plurality thereof) of any device or system of the invention, are exemplary means for these purposes, yet it is made clear that the means described herein are within the scope of the invention.

Figure 4:
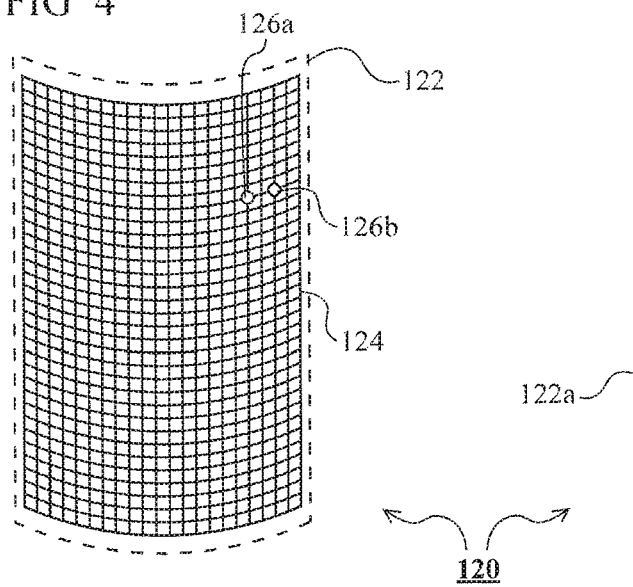

FIG. 4 shows an embodiment of the invention as a flexible display device 120 (or simply "device"). Device 120 generally includes a sheet 122 (illustrated by a dashed outline in FIG. 4, to reveal elements inside the sheet) similar to sheet 102, inside which is a sensing sheet 124 as an exemplary means for sensing bending of sheet 122 (i.e. sensing sheet 124 can sense bending of sheet 122), or otherwise for sensing topologic states of sheet 122 (i.e. states in which sections (e.g. corners) of sheet 122 are curved). For example, sensing sheet 124 may be an array of interconnected parts (shown parts 126a,b in the figure, which may be similar to parts 112a,b of sensor 112) such that any change in relative positions of parts may be sensed similarly to the described for sensor 112 in FIGS. 2 and 3. Said interconnected parts may be units of said array, or individual sensors (e.g. strain gauges) evenly distributed across sensing sheet 124 (and respectively across sheet 122).

Note that any number of sensing means known in the art may be included in and/or utilized by a device or system of the invention, for sensing (e.g. detection and/or measuring) topological states of a sheet on which visuals may be displayed (e.g. a flexible display sheet). Said sensing means may optionally be distributed inside said sheet, such as for sensing topologic properties (or "conditions") of specific sections of said sheet where each of said sensing means is located (e.g. for sensing curving of a corner of said sheet by sensing means located at, or near, said corner). Alternatively, said sensing means may sense topologic states (and changes thereof) remotely, such as by receiving modulated signals from transponders that are influenced by the topology of the sheet, or such as by sensing light in optical apparatuses influenced by the topology (see e.g. international publication WO 2006/134552).

Figure 5:
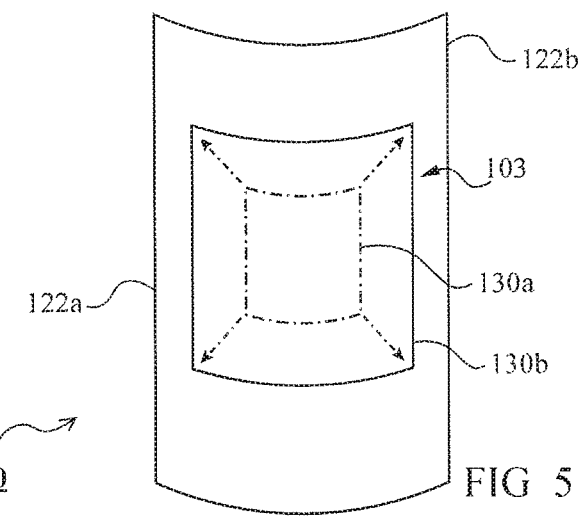

FIG. 5 shows device 120 in which sheet 122 is curved similarly to the shown in FIG. 4, specifically so that sides 122a,b of the sheet are curved towards the back of the sheet (i.e. curved "away" from the point of view of FIG. 5). In FIG. 5, sheet 122 is illustrated by a continuous outline (as opposed to the dashed outline in FIG. 4), while sensing sheet 124 is not shown, suggesting sensing sheet 124 is located inside sheet 122.

In some embodiments, specific topologic states, and/or changes thereof, of sheet 122, may prompt specific operations of device 120 (e.g. performing of functions in a graphic user interface (GUI) of the device), such as by sensing of the said specific topologic states (and/or changes thereof) by sensing sheet 124. Specifically, said sensing may be registered as input by a processor included in device 120 (see e.g. processor 106 of device 100 in FIG. 1). Said input may be utilized for, and/or prompt, operations of device 120, such as commands in an interface displayed by the device. For example, as shown in FIG. 5, sheet 122 may display an object 103 (e.g. a graphic entity or object in a GUI) having a size 130a (illustrated by a dashed-dotted outline in FIG. 5) when the sheet is straight (i.e. not curved or bent), whereas by curving sides 122a,b towards the back (or "backward"), as specifically shown in FIG. 5, object 103 may be magnified (or "enlarged") to a size 130b (illustrated as a continuous outline). Similarly, by curving sides 122a,b towards the front, object 103 may be contracted or shrunk to a smaller size than size 130a. In a similar example, visuals displayed on sheet 122 may be zoomed in or out depending on how sides 122a,b are curved, such as for a map being displayed by device 120. Sides 122a,b are preferably the sides at which device 120 is held by a user, similarly to holding a book or a sheet of paper.

FIG. 6 shows device 120 in which sheet 122 is generally straight yet curved at one corner (upper right in the figure) towards the back of the sheet, for a curve 134. In FIG. 6 there is shown sheet 122 (illustrated by a dashed outline) inside which is sensing sheet 124 influenced by the curving of the sheet (i.e. also curved, respectively to (or "in accordance with") sheet 122).

FIG. 7 shows device 120 wherein sheet 122 is in a topologic state similar to the state of sheet 122 as shown in FIG. 6, yet in FIG. 7 sheet 122 is illustrated by a continuous outline so that sensing sheet 124 is not shown (i.e. the sensing sheet is obscured because it is suggested to be inside sheet 122, on which visuals may be displayed). Further shown in FIG. 7 is an object 136 displayed on sheet 122.

In some embodiments, object 136 can be controlled by bending (or curving) sheet 122, such as by utilizing input registered from sensing bending of the sheet. Accordingly, changes in the topology of sheet 122 (i.e. curving or bending thereof) may respectively influence sensing sheet 124 (as shown in FIG. 6) such that said changes can be sensed by the sensing sheet. Accordingly, said changes may prompt operations of device 120 (e.g. in software whereat input may be registered correspondingly to said changes, for performing appropriate functions) that are associated with object 136 (or which corresponds to the object). For example, curve 134 may prompt an operation (e.g. in an interface displayed by device 120, and/or in a program run by the device) of attracting (or "moving") object 136 towards the corner of sheet 122 at which the curve is (upper right in FIG. 7), as shown a direction of attraction illustrated by a dashed-dotted arrow.

Following the above, any curving of sheet 122, optionally specifically curving the sheet towards the back (i.e. away from the viewpoint in FIG. 7), may be for moving a displayed object towards the curved section (e.g. the upper right corner where there is formed curve 134 in FIG. 7). Similarly, any curving of sheet 122 towards the front may be for moving a displayed object away from the curved section.

FIGS. 8 and 9 show different topologic states of sheet 122. Said topologic states may influence the location where object 136 is displayed according to directions illustrated by dashed-dotted arrows. Influencing the location may be by sensing or detecting (and/or measuring) of said topologic states and registering corresponding input. In FIG. 8, side 122b of sheet 122 is shown curved backward, for attracting object 136 rightward. In FIG. 9, side 122b of sheet 122 is shown curved forward, for repelling the object leftward. It is understood that said attracting and repelling are performed in a display which includes object 136, such as a display of an interface, wherein object 136 is included, by sheet 122.

FIG. 10 shows sheet 122 of device 120 in a topologic state where two opposite corners (upper right and bottom left from the point of view of the figure) of sheet 122 are curved backward, for prompting an operation of device 120. Said operation may specifically be the magnifying of object 136, similarly to the described for object 130 shown in FIG. 5. In an alternative topological state, the aforementioned two opposite corners may be curved forward, so that object 134 is made smaller (or "is contracted", or "is shrunk").

In some embodiments, similarly to the described for FIG. 5 and FIG. 10, curving (or "bending") any number of corners of sheet 122 of device 120 may be for zooming in and out (or for performing a zoom-in and zoom-out functions) in an interface displayed by the device, or in visuals displayed on sheet 122.

Note that the operations described for FIGS. 8 through 10, specifically the manipulation of or influence on the size and location of object 136 may be of the same interface, so that a user can control the size and/or location of object 136 by bending sheet 122 to form the topologic states shown in FIGS. 8 through 10, specifically as described for each figure.

In some embodiments, device 120 may be operated (e.g. specific input may be registered) by pulling side 122a and/or side 122b (also "pulling on side 122a and/or on side 122b") such that sheet 122 is stretched (horizontally, from the point of view in FIGS. 8 through 10). For example, a certain page on an "e-book" may be displayed by device 120, specifically on sheet 122, whereas when a stretching sheet 122 (preferably performed by a user holding the device), the stretching may be sensed by sheet 124, and a function corresponding to the sensed stretching may be performed, such as a function of displaying the following page of said certain page, similarly to the described for flipping pages by curving corners. Following the above, pulling or stretching may also be utilized to register corresponding input in device 120 (i.e. registering input which corresponds to said pulling or stretching, or specifically to how said pulling or stretching is being performed).

FIGS. 11 and 12 show device 120 displaying on sheet 122 an interface 140 which can be interacted with by bending. Interacting with interface 140 may be another method of operating device 120 than the described above for FIGS. 8 through 10. In FIGS. 11 and 12 there is shown interface elements 140*a-d* of interface 140 (interface elements 140*a-c* shown displayed near the upper right corner of sheet 122, and interface element 140*d* near the bottom right corner). Interface elements 140*a-d* may be visual representations (e.g. icons) of commands, objects, items, functions, events or any reaction in interface 140, or in a program of which interface 140 is an interface. Otherwise, interface elements 140*a-d* may correspond to commands, objects, items, functions or events which can be controlled by interacting with interface 140, specifically by operating device 120. For example, interface elements 140*a-c* may be graphic symbols which represent a function of controlling a "window" in a common "windows" interface (known for certain operating systems), such as by being virtual buttons representing a "minimize" function, a "restore" function and a "close" function. For another example, interface elements 140*a-d* may be options in a menu or tools in a tool-bar.

In some embodiments, any of interface elements 140*a-d* can be influenced (or "controlled", or "manipulated", or "interacted with") by bending sheet 122. Specifically, each of interface elements 140*a-d* may be influenced by bending sheet 122 differently (or "in a different manner") than bending the sheet to influence another interface element. Optionally, each of interface elements 140*a-d* may have a corresponding line of bending sheet 122 (interface element 140*b* shown having a corresponding line 128, whereas the rest of the interface elements are shown having corresponding bending lines crossing them and illustrated by dashed-dotted lines), such that bending sheet 122 at a line corresponding to a specific interface element may be for interacting with (or "influencing") said specific interface element. Any number of the lines of bending, which correspond to any of interface elements 140*a-d*, may be displayed by device 120 (specifically on sheet 122). Alternatively, any number of the lines of bending may not be displayed, whereas a user may estimate where and/or how to bend the sheet for interacting with any of corresponding interface elements.

In FIG. 11, sheet 122 is shown generally straight (otherwise "unbent"), whereas in FIG. 12, sheet 122 is shown bent forward (towards the viewpoint of the figure and preferably towards a user when device 120 is held by said user) in the upper right corner of the sheet, also bent backward at the bottom right corner. The bending at the upper right corner may generally be in accordance to a line crossing interface element 140*b* (shown a line 128 illustrated as dashed-dotted), so that input may be registered in association with (or "corresponding to") interface element 140*b*. For example, by bending sheet 122 at line 128 (which in any way corresponds to interface element 140*b*, such as by crossing the interface element), a "window" displayed on sheet 122 may be minimized.

In some embodiments, interface element 140*b* may represent (or "correspond to") a parameter (or plurality thereof) in interface 140, whereas a property (or plurality thereof) of said parameter may set by bending sheet 122 (or a section thereof, such as a corner or specifically a section defined by line 128 which may be a border of said section) backward or forward. Otherwise, interface element 140*b* may represent (or "correspond to") a variable (in interface 140 or in any program of device 120), the value of which may be increased or decreased by bending sheet 122 (or a section thereof) backward or forward. Accordingly, bending sheet 122 (or a section thereof) backward and forward may be for changing a parameter or variable (or plurality thereof) of an interface or program of device 120, whereas specifically bending a section of sheet 122, which is defined by line 128, forward or backward, may be for increasing or decreasing any number of properties or values of said parameter or variable (or plurality thereof). For example, similarly to the previous example above, bending sheet 122 backward at a line crossing interface element 140*b* (e.g. line 128 or any other line crossing the interface element but not crossing any other interface element) may be for maximizing the aforementioned "window", so a parameter corresponding to by interface element 140*b* may be the size of the "window" (set to a "maximized" property in the example). The "window" may similarly be minimized (whereas said parameter may be set to a "minimized" property) by bending sheet 122 forward at said line. For another example, interface element 140*b* may represent a scale value (e.g. of a map displayed on sheet 122), so that bending sheet 122 (at a line crossing the interface element) backward may be for increasing the scale of visuals displayed on it, whereas bending the sheet forward may be for decreasing said scale of said visuals. The latter example may similarly describe zooming visuals in and out by bending sheet 122 backward and forward.

In FIG. 12, sheet 122 is shown also bent (i.e. in addition the bending at line 128) at a line crossing interface element 140*d*, yet bent backward as opposed to the bending forward at line 128.

Note that because it is known that only one line may pass through two points, in some embodiments bending sheet 122 in accordance with (or "at") any line passing through any of interface elements 140*a-d* may be for registering input corresponding to that interface element, or otherwise for prompting a reaction in interface 140 (said reaction preferably corresponding to that interface element), whereas bending sheet 122 at the line which passes through any two or more interface elements (only one line exists for each two or more interface elements) may result in no input being registered, or otherwise may not result in prompting a reaction which corresponds with any of the interface elements through which said line passes. This is beneficial for ease of use when a user is using device 120, specifically for interacting with interface 140 or any interface element thereof, as said user may bend sheet 122 in many different manners to interact with a first interface element, and in many other different manners to interact with any other interface element. Note that by bending sheet 122 at a line which crosses two or more interface elements, input may be registered which corresponds to said two or more interface elements, or otherwise a reaction may be prompted in interface 140, whereas said reaction preferably corresponds to said two or more interface elements. For example, interface element 140*a* may represent (or "correspond to") an items of interface 140, whereas interface element 140*c* may represent a function of interface 140, so that bending sheet 122 at a line which crosses both interface elements (said line also crosses interface element 140*b* as interface elements 140*a-c* are shown to be generally aligned diagonally), said function may be performed on said item.

Further note that any line of bending which crosses an interface element (or plurality thereof) may define a section of sheet 122 of which that line may be a border, whereas other borders may be ends of sheet 122. For example, line 128 may define a section which is bent when bending sheet 122 at line 128, whereas the borders of said section may be line 128 and the two sides of the upper right corner of the sheet (as shown in FIG. 11 said section formed by said upper right corner and line 128, whereas inside said section is shown interface element 140*a* (shown displayed between line 128 and the two sides of said corner).

FIG. 13 shows another arrangement of interface elements 140a,b and 140d (interface element 140c is excluded) on sheet 122 (numbered in FIGS. 11 and 12). The interface elements are arranged near side 122b (numbered in FIGS. 8 and 9, and also in FIG. 13). Each of interface elements 140a,b and 140d may be displayed at a location which corresponds to a bending location on side 122b, whereas said bending location may be a location whereat bending sheet 122 may be for interacting with an interface element displayed at a corresponding location. In FIG. 13 there are shown locations 142, 144 and 146 corresponding to interface elements 140a, 140b and 140d, respectively (shown dashed lines connecting between locations 142, 144 and 146 to where interface elements 140a, 140b and 140d are displayed on sheet 122). Sheet 122 is shown in FIG. 13 bent forward from location 146, preferably for interacting interface element 140d, or for any operation of device 120 which is associated with interface element 140d, or for registering input corresponding to interface element 140d, or for a reaction of interface 140 (interface elements 140a,b and 140d are suggested to be elements of) which corresponds to (or "which is associated with") interface element 140d. Optionally, said reaction of interface 140, said operation of device 120 or said registered input may also correspond to (or "be associated with") the direction and/or extent of a curve formed by bending sheet 122 at location 146 (or otherwise "may correspond to the direction and/or extent of bending sheet 122 at location 146). For example, interface element may correspond to the size of a graphic object displayed at the center of sheet 122, whereas bending sheet 122 forward at location 146 (e.g. by a thumb of a hand of a user hold and using device 120 pressing on location 146 whereas another finger pushed a section of sheet 122 which is below location 146), as shown in FIG. 13, may be for decreasing the size of said graphic object, and whereas bending the sheet backward at location 146 may be for increasing the size (note that the increasing or decreasing relates both to location 146 and to the direction of bending). Optionally, for the same example, slightly bending may be for a small change (e.g. increasing or decreasing) of the size, whereas bending to a larger extent may be for a larger change, in which case the operation of changing the size may also relate to the extent of the bending.

Note that in some arrangements of interface elements on sheet 122, and in some embodiments, bending sheet 122 at a location which corresponds to an interface element may be performed by placing a thumb (or any other finger) on said location (preferably so that the said location is between said thumb and the same hand, or a finger of the same hand) and then pushing or pulling forward or backward. In such cases the bending may not start exactly at said location, yet a general range of distance from said location may be utilized if said interface element is far enough from other interface elements (so that non-precise bending can still be performed for interacting with specific interface elements).

Note that whereas the described above for interface elements 140a-d being displayed as visuals, it is made clear that interface elements 140a-d may be tactile indicators, or otherwise any tactile output, in case tactile output may be formed by device 120, specifically on sheet 122, as known in the art for displays with tactile feedback (see ref. international application WO 02/27645).

FIG. 14 shows an embodiment of the invention as a device 150 which may include a display unit 152 and flexible sections 154a,b (shown by way of example located above and below display unit 152). Flexible sections 154a and 154b may include sensing means 158a and 158b, respectively, for sensing bending of the sections, or curves formed by manipulating the sections, or topologic states of the sections. Bending flexible sections 154a,b and/or pressing on locations on sections 154a,b may be for operating device 150 or interacting with the device, specifically with visuals or an interface displayed by display unit 152. Display unit 152 may be any section or element of device 150 which facilitates displaying visuals, such as a flat liquid-crystals-display (LCD) or an array of organic-light-emitting-diodes (OLED) as known in the art. Visuals displays by display unit 152 may optionally be displayed, as shown in FIG. 14, on a sheet 152a (preferably having a surface or side on which visuals may be displayed) by utilizing a display apparatus 152b (which facilitates generating visuals), whereas display apparatus 152b and sheet 152a may together form display unit 152. Note that display 152, or specifically any of display apparatus 152b and sheet 152a, may be non-flexible or otherwise less flexible than flexible sections 154a,b. For example, display unit 152 may be a display which includes a flexible sheet and a flexible display apparatus, whereas display unit 152 (or any section thereof) may have less flexibility than flexible sections 154a,b which may be highly elastic sheets of elastic silicon or rubber. Accordingly, flexible sections 154a,b may be bent to larger extents than apparatus 152b, or may be bent in manners which display unit 152 (or specifically any of display apparatus 152b and sheet 152a) cannot. This may be beneficial when display apparatus 152b does not have a flexibility required for operating device 150 by bending, whereas flexible sections 154a,b may have said flexibility yet cannot display visuals.

In FIG. 14 there are shown items 156a-c included in flexible section 154a and an item 156d included in flexible section 154b. Items 156a-d may be any indicators (visual or otherwise, such as tactile) for bending flexible sections 154a,b to operate device 150 or to interact with visuals or an interface displayed by display unit 152, or otherwise for registering input in device 150. Similarly to interface elements 140a-d, items 156a-d may represent or correspond to commands, objects, items, functions, events, elements or any reaction in an interface displays by device 150, specifically by display unit 152 (or more specifically on sheet 152a of display unit 152). Accordingly, flexible sections 154a,b may be bent for registering input, or for interacting with visuals displayed by display unit 152, or otherwise for prompting operations of device 150, similarly to the described for bending sheet 122 of device 120, specifically by substituting (in the description) interface elements 140a-d with items 156a-d.

Note that as opposed to interface elements 140a-d, which may be displayed or not displayed, each of items 156a-d may be or include any number of static indications, visual or otherwise (e.g. tactile, such as in Braille), such as a printed graphic symbol (e.g. printed on any of flexible sections 154a,b or a sticker attached to any of the flexible sections).

FIG. 15 shows another embodiment of the invention as a device 160 similar to device 150. Device 160 is shown including a surface 162 on which visuals may be displayed, such as by including a display apparatus (see e.g. display apparatus 152b of device 150 in FIG. 14). Accordingly, displaying visuals on surface 162 may be facilitated by any means known in the art, whereas surface 162 may be a surface of any element of device 160, such as a sheet, screen or monitor. Similarly to device 150 including flexible sections 154a,b, device 160 is further shown including flexible sections 164a,b on two sides of surface 162, by way of example, whereas bending any of the flexible sections in any of specific manners (preferably manners corresponding to items 166*b-d* shown included in the flexible sections) may be for operating device 160, as described above for operating device 150 by bending flexible sections 154*a,b*. Note that flexible sections 164*a,b* may include sensing means 168*a,b*, respectively, for facilitating sensing (e.g. detecting and/or measuring) of bending of the flexible sections. Further note that surface 162 may be non-flexible or otherwise less flexible than flexible sections 164*a,b*.

In FIG. 15, device 160 is shown positioned horizontally such that a hand 20 of a user, and optionally another hand of the same user, may hold the device and simultaneously bend flexible sections 164*a,b* for operating device 160. Specifically shown in the figure is a thumb 24 of hand 20 bending a corner of flexible section 164*b*. The bending of the corner is shown performed at a line (illustrated as dashed-dotted) crossing item 166*d* in flexible section 164*b*, for prompting an operation of device 160 which corresponds to item 166*d*, such as for performing a function in an interface displayed on surface 162, or such as increasing the brightness or contrast of visuals display on surface 162. Note that further shown in the figure is a corner of flexible section 164*a* being bend (presumably by a hand other than hand 20) in a different direction the aforementioned corner of section 164*b*. The bending of flexible section 164 is shown in accordance with a line (illustrated as dashed-dotted) crossing item 166*b* in flexible section 164*a*, such as for registering input which corresponds to item 166*b*.

FIGS. 16 and 17 show an embodiment of the invention as a device 180 which may generally include a display section 182 including a surface 172 (similar to surface 162 of device 160) and flexible sections 184*a,b* (similar to flexible sections described above and including items 176*a-d*). Flexible sections 184*a,b* are shown in FIG. 16 physically separated from display section 182 yet are ready to be connected to the display section (directions of connection illustrated by dashed-dotted arrows), as shown connected in FIG. 17. Accordingly, it is made clear that flexible sections 184*a,b* may be connected to and disconnected from display section 182, such as by each of the sections being modules of device 180. Flexible section 184*a,b* are shown including connectors 188*a,b*, respectively, whereas display section 182 is shown including connectors 186*a,b*. Any (or both) of connectors 186*a* and 188*a* may facilitate connecting flexible section 184*a* to display section 182, whereas any (or both) of connectors 186*b* and 188*b* may facilitate connecting flexible section 184*b* to display section 182. Note that connecting any of flexible sections 184*a,b* to display section 182 may be for physical attachment, yet it is made clear that said connecting may facilitate exchange of power and/or data between any connected sections. For example, flexible sections 184*a,b* may include sensing means 178*a,b* (respectively) for sensing bending of any of the flexible sections, whereas information (or "data") from sensing of bending of flexible section 184*a* by sensing means 178*a* may be sent to display section 182 when flexible section 184*a* and display section 182 are connected (preferably by utilizing any of connectors 186*a* and 188*a*). Information may similarly be transferred from flexible section 184*b* to section 182 when the two sections are connected (FIG. 16).

FIG. 18 shows another embodiment of the invention as a device 200. Device 200 generally includes a display sheet 220 (or simply "sheet") having a side 220*a* on which visuals can be displayed, and a side 220*b*. Optionally, visuals may be displayed also on side 220*b*, in addition to visuals being displayed on side 220*a*. Device 200 further includes a container 210 which is an exemplary container that is shown as cylindrical, by way of example. Sheet 220 may be rolled into and out of container 210, similarly to a scroll. Inside container 210, sheet 220 may be rolled similarly to a "rolled-up" scroll. Additionally, sheet 220 can be rolled in and out of container 210 through an opening 218.

In some embodiments, sheet 220 may have a tab 224 that is sticking-out (or "extending out", or "protruding out") of container 210 when the sheet is rolled inside the container, and which can be pulled by a user for rolling the sheet out of the container. Accordingly, tab 224 of device 200 may facilitate pulling sheet 220 out of container 210. Note that it is made clear that tab 224 is an exemplary means for extending sheet 220 from container 210 in device 200.

In some embodiments, a retraction mechanism 216*a* may be included in device 200 for retracting (or "rolling back") sheet 220 when the sheet is extended out of container 210, so that when sheet 220 is out of container 210 (partially or completely) and a user is not holding the sheet, the sheet may "snap-back" (or "retract") automatically into the container. Such a mechanism (i.e. retraction mechanism 216*a*) may be similar to common mechanisms of measuring tapes or dog-leashes, for automatically retracting the tapes or leashes when they are extended out of a housing, and when no external force is applied (such as a user holding a tape outside a housing of a measuring tape device, to prevent said tape from snapping back).

In some embodiments, states of device 200 wherein sheet 220 is completely or partially extended out of container 210 may be temporarily locked to prevent automatic retraction of the sheet (preferably by mechanism 216*a*) into the container (or otherwise to maintain any extracted position of the sheet), so that the sheet will remain comfortably out of the container. Locking states wherein sheet 220 is extended out of container 210 to any extent may be facilitated by a locking mechanism 216*b*, and may be performed by a user operating device 200, such as by rotating a knob or pressing a button (or otherwise specifically operating any control of the device, see e.g. a control 214*a* below). Similarly to the described for retraction mechanism 216*a*, locking mechanism 216*b* may be similar to common mechanisms of measuring tapes or dog-leashes, which facilitate locking states in which a tape or a leash are extended to any extent out of a housing, to prevent said tape or said lease from snapping back into said housing. Optionally, a state wherein sheet 220 is completely (or almost completely) extended out of container 210 may be locked automatically (e.g. by locking mechanism 216*b*), whereas an operation of a user may be required to unlock said state, such as by further pulling of the sheet (such as by pulling on tab 224), or otherwise by any other operation (e.g. activating a switch or pressing a button).

In some embodiments, as mentioned above, locking of any state of device 200 in which sheet 220 extended out of container 210 (i.e. when the sheet is outside the container to any extent) may be performed by a user of the device, such as by operating device 200. For example, a user may wish for the device to remain in a state where only half of sheet 220 is extended out of the container, such as in case it is not desired for the sheet to extend completely outside the container. Therefore, said user may pull on tab 224 to roll sheet 220 halfway out of container 210, and then said user may lock the state where the sheet is halfway extending from the container, such as by pressing a switch of device 200. Different states of a sheet being extended to different extents out of a container are shown in FIGS. 27 through 29 for a sheet 320 and a container 310 of a device 300.

Following the above, it is made clear that within the scope of the invention is a device which includes a container and a flexible display sheet which can be housed (or "contained") inside said container, and which can be extended out of said container, optionally by manipulating a tab (or any other means which facilitate pulling of said sheet), to different extents, whereas when no external force is applied on said sheet (e.g. by a user holding said sheet when the sheet is extended out of said container), said sheet may retract automatically into said container, and whereas the aforementioned device may further include a locking mechanism for preventing automatic retraction of said sheet when said sheet is partially or completely extended from said container (or for maintaining any extended position of the sheet). This may be beneficial for cases wherein space (in which the device is used) is limited, such as in a crowded place, and in cases wherein visuals can be displayed on just a part of said sheet (a part that is extended out of said container), such as visuals that do not require all of said sheet for being displayed (see ref. FIGS. 27 through 29).

In some embodiments, container 210 may include a connector 212 which facilitates connecting device 200 to other devices, such as to a computer. For example, connector 212 may be a common USB (universal-serial-bus) plug which can be inserted into a common USB socket, for transferring data (e.g. "e-book" files) to device 200 and/or for charging a power source (e.g. a battery) of device 200 (as mentioned above, specifically for the description of device 100, any device of the invention may include a processor (or "processing means"), a memory unit and/or a power source).

In some embodiments, container 210 may further include interfacing elements (i.e. elements which facilitate interacting with device 200 or operating device 200) such as controls 214a,b and a control 214c, as shown in FIG. 18. For example, control 214a may be a power button for turning device 200 on or off. For another example, control 214b may be a switch for locking and unlocking states of device 200. For yet another example, control 214c may be a touch-operable strip for scrolling (also "browsing" or "navigating") between pages of an "e-book" as it is displayed on sheet 220.

In some embodiments, sheet 220 may include a support 222, or otherwise be attached to or installed on support 222 (see e.g. U.S. Pat. Nos. 6,256,938, 6,920,722, 7,082,998, 5,908,049, 6,446,672, 6,706,348 and 7,154,362). Support 222 may a section of device 200 which is attached to sheet 220, specifically along the sheet, such as attached on a side of the sheet along the length of the sheet. Support 222 may provide physical support for sheet 220 (such as being a spine or base of the sheet) and/or may influence the shape of sheet 220, specifically how the sheet is bent, folded or rolled, or otherwise in any way determine topologic states of sheet 220.

In some embodiments, support 222 may be loosened or flexed and stiffened or straightened, whereas sheet 220, by being attached to support 222 may adhere to the loosening or flexing and the stiffening or straightening of the support. Said loosening or flexing and the stiffing or straightening of the support may be facilitated by any means known in the art, such as in the field of endoscopic devices (see e.g. U.S. Pat. Nos. 6,676,665, 5,439,156, 5,501,654, 4,930,494 and 5,486,183).

In some embodiments, support 222 may include parts (parts 222a,b are numbered in FIG. 18) which may be connected in a series (every other part in the series is illustrated by dashed lines in the figure, to facilitate depiction), similarly to links in a chain or vertebras in a spine.

Figure 19:
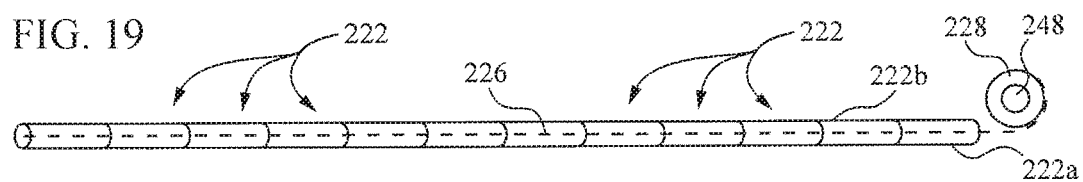
FIG. 19 shows an embodiment of the invention.

FIG. 19 shows an exemplary embodiment of support 222 (which may be included in some embodiments of device 200). In FIG. 19, a series of parts of support 222 (parts 222a,b are numbered in the figure) may be connected (i.e. each part may be connected to a following and/or previous part) by a flexible string 226 (illustrated as a dashed line in FIG. 19) or wire (see e.g. U.S. Pat. Nos. 4,723,936, 4,474,174 and 5,269,757) that is connected at one end to a mechanism 228, which is preferably located inside container 210 of device 200. Mechanism 228 can stretch the string (e.g. by pulling it) for a straight line, as shown in FIG. 19, such that the aforementioned parts of the support respectively align to form a straight rod (or "to form a rod-like shape"). Mechanism 228 may control flexible string 226 by any means known in the art (see e.g. U.S. Pat. Nos. 4,991,784, 5,373,942, 5,176,452, 5,123,474, 5,392,835 and 4,825,921), such as by being a pulley which can be electrically actuated, or such as a spool that can be operated manually by turning (also "rotating") a small handle, without requiring electricity.

Figure 24:
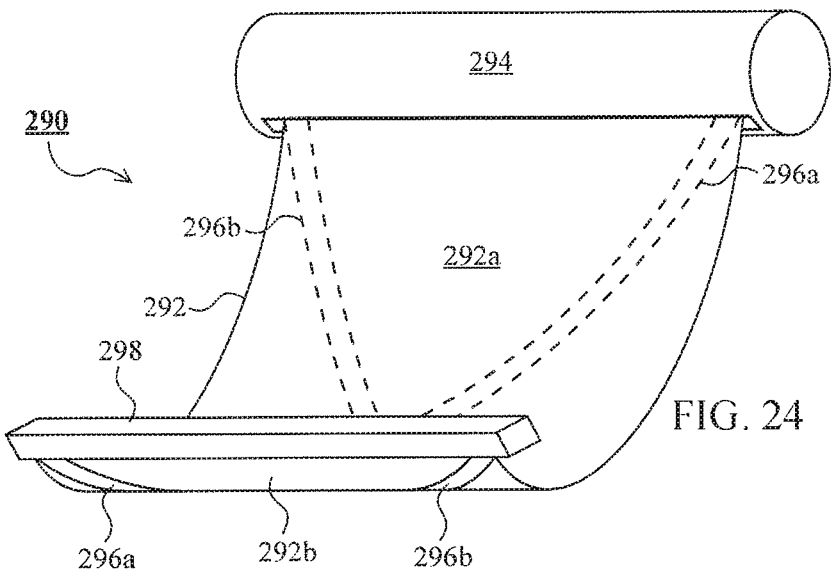
FIG. 24 shows an embodiment of the invention.
Figure 25:
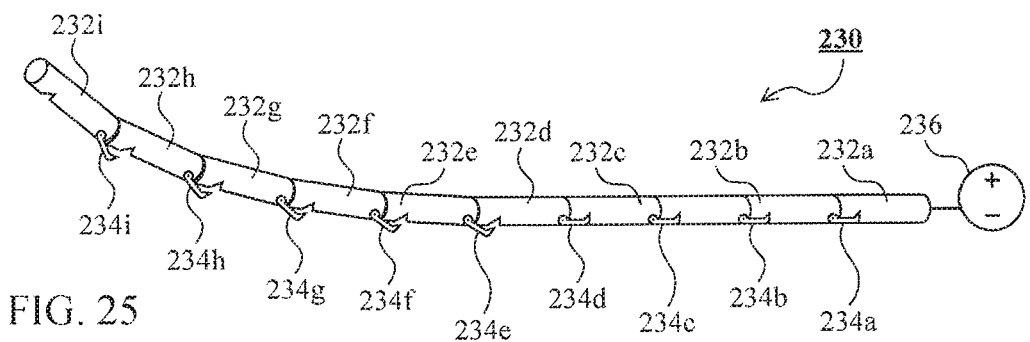
FIG. 25 shows an embodiment of the invention.
Figure 26:
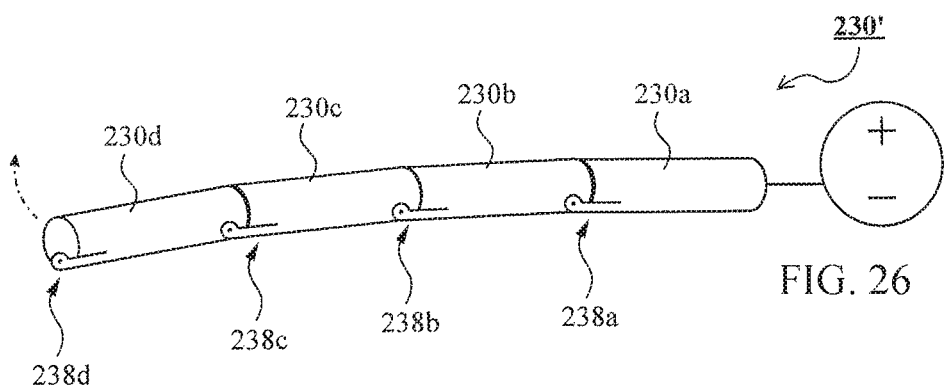
FIG. 26 shows an embodiment of the invention.

Note that mechanism 228 is an exemplary mechanism for controlling support 222, whereas a mechanism for controlling the support may be any mechanical and/or electrical means known in the art. Note that a support, or plurality thereof, may be located anywhere in (or "on") a device of the invention, for facilitating influencing a display sheet and/or for serving as a support for the shape of the sheet. Also note that a support may be any means which facilitate influencing the shape of a display sheet (see ref. FIGS. 24 through 26). For example, a micro-electromechanical system (MEMS) may be integrated inside the thickness of sheet 220 and across its length, serving as a dynamic chassis that can be hardened (for straightening the sheet) and loosened (for "releasing" the straightening of the sheet). In some embodiments, said chassis may be an array of connected parts distributed across the sheet, and which can align on a plane for influencing the sheet to form a flat (or "straight") shape.

In some embodiments, a mechanism for controlling support 222 (e.g. mechanism 228), or otherwise device 200, may include a locking mechanism 248 for locking (or maintaining) specific states or shapes of support 222, such as a straightened shape or state as shown in FIG. 19 (whereby sheet 220 may be influenced by said straightened shape or state and may correspondingly be straightened). For example, a user may operate control 214a of device 200 for straightening sheet 220 by straightening support 222, and may operate control 214b for locking (or maintaining) the support in a straightened state so that sheet 220 will remain straightened. Additionally, for the same example, said user may operate control 214b again, for releasing the support (and accordingly the sheet) from being straightened. Straightening of sheet 220 may be beneficial for comfortably maintaining a flat display area when using device 200. The releasing may be beneficial for rolling the sheet back into container 210.

Figure 20:
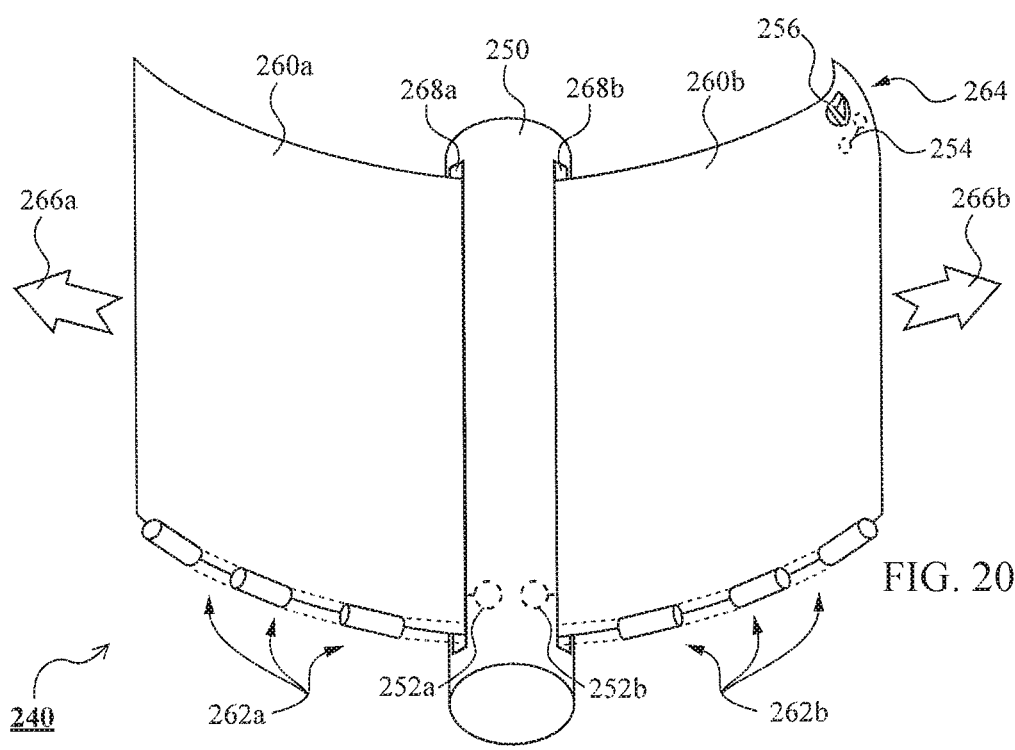
FIG. 20 shows an embodiment of the invention.

FIG. 20 shows another embodiment of the invention as a device 240. Device 240 may generally include a container 250 into which and out of which sheets 260a,b can be extended (e.g. rolled), similarly to the descried for container 210 and sheet 220 shown in FIG. 18. Flexible display sheets 260a,b (or simply "sheets") can be rolled in and out of container 250 through openings 268a,b, respectively, which may be located on generally opposite sides of the container. Accordingly, when the sheets are rolled out of the container, a shape similar to an open book is formed, as shown in FIG. 20. Note that each of sheets 260a,b may include means for extending the sheets from container 250, similarly to the described for tab 240 regarding FIG. 18. Following the above, a device of the invention may include a container from which two flexible display sheets may be extended, for simulating an arrangement of pages as in an open book (wherein each of said flexible display sheets may serve as a page in a spread of said open book). Optionally, said flexible display sheets may be retracted into said container, such as to be comfortably stored within said container.

In some embodiments, sheets 260a and 260b may include (or otherwise "be attached to", or "be installed on") supports 262a and 262b, respectively, similarly to the described above for support 222, so that the supports may provide physical support for the sheets, and/or may influence the shape or topologic state of each sheet. Accordingly, supports 262a,b may facilitate straightening sheets 260a,b by influencing the sheets as the sheets are in any way connected to the supports (or including the supports). Straightening may be facilitated by any means known in the art, either electronic or mechanical, such as in case a user can manually operate controls (of device 240) which mechanically controls the sheets. In some embodiments, supports 262a,b may be controlled separately (i.e. each of the supports may be controlled individually) and/or simultaneously (e.g. one operation of device 200 can influence both supports).

In some embodiments, sheets 260a,b, may be bent by a user, regardless of influence from supports 262a,b (e.g. even when the support are straightened and accordingly the sheets are straightened, see e.g. FIG. 21), such as for registering input or prompting an operation of device 240. Accordingly, while the supports straighten the sheets (for a generally flat plane topology), or otherwise when the supports influence the sheets in any way, some modifications to the topology of the sheets can still be performed by a user, such as bending (also "curving") corners of the sheets that are not directly connected to the support (or which are far enough from the support to not be influenced by the supports. Note that bending of corners, or otherwise any changing of the topology of each of sheets 260a,b, may be sensed by sensing means included in device 240 (see e.g. sensing sheet 124 in FIGS. 4 and 6).

In FIG. 20, by way of example, there is shown a curve 264 of a corner of sheet 260b. Curve 264 may be formed by a user bending said corner. Curve 264 can be formed even while the sheet is generally straightened because the curve is at a corner of the sheet that is not directly connected to the support and therefore may not be directly influenced by it. Further shown in FIG. 20 is an interface element 256 displayed on sheet 260b such that curve 264 is formed generally at a line crossing the location where the interface element is displayed, such as for registering input which corresponds to (or "which is represented by") the interface element. Sheet 260b is shown including sensor 254 (illustrated by dashed lines suggesting the sensor may be located inside the sheet) for sensing curve 264, or otherwise the forming of curve 264 (e.g. by fingers of a user holding device 240), such as to facilitate registering input which corresponds to any interface element displayed where the sensor is located along sheet 260b.

In some embodiments, the supports may be located at the centers of the widths of the sheets so that other corners (i.e. the corners of the sheets that are shown in FIG. 20 to be near the end of the supports) can be bent, see ref. FIG. 21.

In some embodiments, pulling sheet 260a and/or sheet 260b outward from container 250 (shown outward directions 266a and 266b, respectively), when the sheets are in a state of being extended or partly extended and locked in that state, as described for locking mechanism 216b of device 200 re. FIG. 18), may be for registering input in device 240, for operating device 240 or otherwise for prompting an operation of the device. In FIG. 20 there is shown device 240 including sensors 252a and 252b as means for sensing pulling of sheets 260a and 260b, respectively. For example, device 240 may display a certain page of an "e-book" on sheet 260a and a following page of said "e-book" on sheet 260b, while sheets 260a,b are completely extended out of container 250 and are straightened by their respective supports. A user may pull on sheet 260a (or on any means which facilitate pulling of the sheet, see e.g. tab 224 of device 200 in FIG. 18) such that a first switch (as an example for sensor 252a) is activated, for displaying the previous couple of pages (also "spread") of said "e-book" on sheets 260a,b, or alternatively for displaying a page of annotations or illustrations on sheet 260a, which may relate to the page displayed on sheet 260b. Similarly, a user may pull on sheet 260b so that a second switch (as an example for sensor 252b) may be activated, for displaying the following "e-book" spread (i.e. couple of pages) on the sheets, or alternatively for displaying a page of annotations or illustrations, relating to the page displayed on sheet 260a, on sheet 260b. For the same example, pulling on both sheets 260a,b may be for another operation of device 240, such as displaying illustrations or references, or a previously bookmarked spread, on both sheets, whereas pulling both sheets again may be for displaying again the spread that was displayed before the sheets were pulled the first time. Accordingly for the above example, a user can "flip through" pages of the aforementioned "e-book" by pulling on sheet 260a or sheet 260b. The aforementioned switches may be connected to the sheets inside of container 250 (as shown sensors 252a,b illustrated by dashed lines, suggesting they may be located inside the container). Note that other functions may be performed by pulling both sheets (also "pulling on both sheets"), as described above. For example, bookmarking a spread (i.e. a couple of pages of an open book or magazine) may be performed by pulling on the sheets and holding the pulled state for a certain period of time (e.g. two seconds) when said spread is displayed (as opposed to pulling and immediately releasing, for displaying a previously bookmarked spread). The latter example, for pulling and holding, may facilitate, in some cases, common interaction procedures such as "click-and-hold" and "tap-and-hold" of computer mice and touch-pads, respectively, or any common "hold" operation.

In some embodiments, sensors 252a,b may sense force applied on pages 260a,b, such as for sensing how much force is applied when the pages are pulled. Sensing, or specifically measuring, the amount of force applied on pages 260a,b may facilitate additional features to the described above. The sensors may be connected to the sheets inside the container, as parts of a discrete apparatus inside the container. The amount of force measured by the sensors when the sheets are pulled may be registered as input, for certain operations or of device 240 associated with how much force is used to pull. For example, sheet 260b may be connected inside container 250 (e.g. one end of the sheet may remain inside the container when the rest of the sheet is completely extended out of the container) to a strain gauge (as an exemplary sensor 252b), so that said gauge can measure how hard the sheet is pulled when the sheet is completely extended from the container. Pulling on sheet 260b when it is extended out of the container may be for flipping forward through spreads of an "e-book" as it is displayed on sheets 260a,b, whereas the hardness of the pulling (which may be measured by said gauge) may determine the rate by which the flipping is performed (or "determine how fast spreads are changing on a display on sheets 260a,b), so that by pulling harder, the displaying of spread changes from one spread to another faster.

Note that it is made clear that sensors 252a,b may not necessarily be connected directly to sheets 260a,b, such as in case they are connected to the respective supports (i.e. supports 260a,b) of the sheets. Further note that sensors 252a,b may be, or may include, any sensing means which facilitate sensing of pulling of sheets 260a,b.

FIG. 21 shows another embodiment of the invention as a device 240', similar to device 240, whereas in device 240' supports 262a,b are located at the center of the width of the sheets (preferably along the length of the sheets) and optionally behind the sheets or inside the sheets (or otherwise in any way obscured from view when the device is being operated or used, such as in other embodiments between two flexible display sheets. In device 240', sheets 260a,b (illustrated by dashed lines to facilitate depicting supports 262a,b) can be pulled and pushed forward and backward (suggested direction of pulling and pushing by dashed-dotted arrows) for registering input or for prompting an operation of the device, additionally or alternatively to being pulled outward as described for the embodiment shown in FIG. 20 (i.e. device 240). For example, pulling sheet 260a forward (i.e. toward the point of view of FIG. 21 and preferably toward a user holding the device) may be for flipping forward between pages of an "e-book", a spread of which may be displayed on both sheets 260a,b, whereas pushing sheet 260a backward may be for flipping backwards. Additionally, pulling sheet 260a outward (i.e. toward the left from the view point of FIG. 21) may be for prompting the displaying of a bookmarked spread on both sheets 260a,b. Similarly, sheet 260b may be pulled forward, pushed backward and pulled outward, for registering different inputs (e.g. three types of input, one for each action) or for prompting different operations of device 240'.

In FIG. 21, there is shown device 240' including sensors 252a' and 252b' similar to sensors 252a,b of device 240, whereas sensors 252a' and 252b' may further sense pulling or pushing of sheets 260a,b in multiple directions (e.g. backward and forward), and optionally the amount of force applied for said pulling or pushing (e.g. by including pressure sensing means). Accordingly, sensors 240' and 240' may facilitate registering input, or prompting operations (or "reactions") of device 240' by sensing pushing and pulling in multiple directions (said input may correspond to any number of multiple directions), and optionally sensing of forces applied to perform said pushing or pulling (e.g. by a user).

In FIG. 21, device 240' is shown being in a state where supports 262a,b, and accordingly sheets 260a,b, are straightened. The supports preferably support the sheets and generally influence their shape for a flat panel topology of the sheets. This may facilitate having the sheets less flexible along their length than when the supports are not straightened.

FIG. 21 further shows hands 266a,b holding sheets 260a,b, respectively. Hand 266b is shown holding sheet 260b specifically at the end of support 262b, for comfortably pushing and pulling the sheet forward and backward without bending the sheet. Said pushing and pulling may be for registering input, as described above, and/or for adjusting the position (e.g. changing the angle relative to container 250) of sheet 260b, to facilitate a desirable position of the sheet. If hand 266b were to hold sheet 260b far from support 262b (e.g. at a corner of the sheet, similarly to hand 266a shown holding sheet 260a at a corner), the sheet, (specifically the corner of the sheet in case the sheet is held at a corner) would bend when pushed or pulled. Accordingly, registering input by pulling or pushing sheets 260a,b, or adjusting the position of sheets 260a,b, may be performed by manipulating (e.g. with hands or fingers) supports 262a,b, such as to directly influence the support and not sections of the sheets that are far from the supports (e.g. so to not bend or curve corners of the sheets while pulling or pushing). In alternative embodiments, other element may be utilized (i.e. included and integrated in device 240). Note that even when pushing or pulling sheets 260a,b near supports 262a,b, the sheets may slightly be bent. However, it is understood that device 240' may be adapted to not react (e.g. register input or execute an operation) when slight bending of the sheets occurs, even in case said slight bending is sensed.

Note that while the described above mainly describes registering input by pushing or pulling any of sheets 262a,b, it is made clear that such pushing or pulling, specifically backward and forward, may be for adjusting the position of that sheet, such as for comfortable viewing visuals displayed on that sheet. Each position to which sheets 262a,b may be adjusted by pushing or pulling may be maintained (e.g. temporarily locked), so that a user does not have to hold the sheets at that position.

FIGS. 22 and 23 show another embodiment of the invention as a device 270. Device 270 generally includes containers 280a,b out of which and into which a sheet 290 can be rolled (see e.g. U.S. patent application Ser. No. 29/274, 001 and U.S. Pat. No. 7,180,665). In device 270, sheet 290 may be connected to supports 292a,b from opposite sides, while the supports can be straightened by any means known in the art, such that sheet 290 is accordingly straightened by being connected to the supports, as the supports support and influence the shape and flexibility of the sheet.

FIG. 22 specifically shows a first state of device 270 in which sheet 290 is completely rolled outside containers 280a,b (yet supports 292a,b are not shown straightened and so the sheet it curved). FIG. 23 specifically shows a second state of the device in which the sheet is completely rolled inside containers 280a,b (the sheet illustrated by dashed lines, suggesting it is inside the containers) along with supports 292a,b (also illustrated by dashed lines). In some embodiments, a user of device 270 can switch the device from said first state to said second state by pushing the containers towards each other, whereas by pulling the containers apart, a user can switch the device from said second state to said first state. Additionally to said first and second states, sheet 290 may be rolled out of containers 280a,b to any extent, for multiple other states of device 270, whereas the section of supports 292a,b which is out of the containers when a certain extent is out of the containers may be straightened, while the rest of the support may be rolled inside the container, so that the section of sheet 290 which is outside the containers may be straightened (and optionally stiffened from the original flexibility of the sheet), whereas the rest of the sheet may be rolled inside the containers. Accordingly, by pushing and pulling the containers, device 270 can alternate between different states (i.e. extents by which the sheet is rolled out of containers 280a,b).

In some embodiments, different states of device 270, as described above, may be locked (or otherwise maintained), such as by the device including locking mechanism 216b (see ref. FIG. 18, and the locking mechanism included in device 270 in FIG. 22) for comfortably holding and/or operating the device while sheet 290 is rolled out of containers 280a,b to any extent. Accordingly, any state of device 270 wherein sheet 290 is partially or completely (or not at all) rolled out of containers 280a,b, and optionally straightened by supports 292a,b, may be temporarily locked, so that a user cannot accidentally roll and/or bend the sheet while holding and/or operating the device.

In some embodiments, sheet 290 and supports 292a,b may be retracted automatically into the containers when a user is not holding the containers apart to prevents it (and when a state of the device is not locked), such as by device 270 including a retraction mechanism 216a (see ref. FIG. 18, and the retraction mechanism included in device 270 in FIG. 22). Said automatic retraction (i.e. automatic mechanical rolling of sheet 290 into containers 280a,b, without the involvement of a user) may be to negate the need to roll the sheet into the containers manually by pushing the containers together.

Note that device 270 is shown including locking mechanism 216b and retraction mechanism 216a only in FIG. 22 (and not in FIG. 23), for the purpose of facilitating depiction of the device in FIG. 23, and not to suggest that in FIG. 23 the device does not include the mechanisms.

In FIGS. 22 and 23, containers 280a,b are shown having controls 286a-c and 288a-c, respectively. The controls may be any number of elements which can be operated (by a user) for interacting with (or "using") device 270, such as for registering input. For example, controls 286b and 288b may be thumb-sticks (commonly known in video games controllers) which a user can operate when holding each container with each of his/her hands. Device 270 is preferably held by each of the hands of a user holding a container (i.e. any of containers 280a,b) such that controls 286a-c and 288b,c can be operated by the thumbs of the hands, similarly to holding a gaming controller or a portable gaming console.

In some embodiments, controls of device 270 may (additionally or alternatively to the described above) be located on other sides of containers 280a,b such that other fingers of a user (that is suggested to be holding the device) can operate them (see control 288a located on an opposite side to controls 288b,c in container 280b in FIGS. 22 and 23). For example, control 288a may be a trigger (also as commonly known in video games controllers) located on the containers so that when device 270 is held, an index finger of a hand holding the device can reach said trigger and press it.

Note that it is made clear that any device or system of the invention may include controls which facilitate registering input in device 270, or which facilitate interaction with or control of device 270.

FIG. 24 shows another embodiment of the invention as a device 290, wherein a flexible display sheet 292 (or simply "sheet") can be rolled in and out of a container 294, while the extending end (also "side") of sheet 292 may connected to a handle 294, whereas the handle may serve as means for extending the sheet from the container, similarly to the described for tab 224 connected to sheet 220 shown in FIG. 18.

In FIG. 24, sheet 292 of device 290 is shown installed on support strips 296a,b as means of providing structural (or otherwise "physical") support to sheet 292, or otherwise as exemplary alternatives to supports 292a,b of device 270 shown in FIGS. 22 and 23. Support strips 296a,b may be connected to a surface 292b of sheet 292 that is opposite to a surface of the sheet on which visuals are displayed (i.e. a surface 290a). Otherwise, support strips may be located inside sheet 292 or in other embodiments between two flexible display sheets. The support strips, as shown in FIG. 24, may be positioned generally perpendicularly to each other, for facilitating support of sheet 292.

In some embodiments, support strips 296a,b may be made of an electroactive or thermoactive material (e.g. certain polymer materials) and/or a "shape memory" material (e.g. certain alloy materials), or plurality thereof, which can change between shapes and/or elasticity states (i.e. states of having different values of elasticity or flexibility) when introduced to electric voltage, or current, or heat (see e.g. U.S. patent application Ser. Nos. 11/679,150, 11/077,493 and 11/078,678 and U.S. Pat. No. 4,840,339). Alternatively, the support strips can be made of, or include, any means known in the art for dynamic shape modulation or alteration. For example, support strips 296a,b may utilize (e.g. be made of) micromechanical formations (see e.g. U.S. Pat. Nos. 5,909,078, 6,367,251 and 6,675,578, and U.S. patent application Ser. No. 10/243,705) which are optionally bi-stable (see e.g. U.S. Pat. Nos. 6,828,887 and 6,753,582), or other mechanical elements (see e.g. U.S. Pat. No. 7,347,019).

Following the above, the strips may influence the shape and/or flexibility (also "elasticity") of sheet 292 when they are "activated" or "deactivated" (or otherwise when they are in any one of multiple states). For example, in some embodiments, when voltage is applied to the support strips, such as from a power source integrated in device 270, the strips may stiffen or become rigid (as opposed to being flexible or loose without voltage) so that they may generally be straightened and therefore generally straighten sheet 292 for a flat (or "straight") and rigid display plane.

Note that whereas the described herein is for perpendicular support strips positioned across a flexible display sheet (i.e. sheet 292), any other means and any other structures, composition or formations of means may be included in devices or systems of the invention, for providing support for a flexible display sheet, and/or for influencing the shape and/or flexibility of said flexible display sheet, or plurality thereof, preferably temporarily. For example, multiple support strips can be structured as intertwined, similarly to a net, inside a flexible display sheet of a device of the invention. For another example, multiple support strips may be positioned generally around a flexible display sheet, for composing a frame (which includes said multiple support strips), on which said flexible display sheet may be installed.

Further note that the described herein for supports and support strips is interchangeable, so that the described for supports may also refer to support strips, and vice versa.

FIG. 25 shows a support 230 similar to support 222. Mechanism 230 may include parts 232a-i connected as a series. Each of the parts may include an actuator (parts 232a-i are shown including actuators 234a-i, respectively) that can be activated to align that part with the previous part of said series. Accordingly, when all the actuators of all the parts are activated, support 230 may be straightened, such as to form a shape of a straight rod. In FIG. 25, the right section of said series of parts of the support is shown straightened, as the actuators of the parts in the section may be activated, whereas the left section is shown bent (or "curved") as the actuators of the parts may not activated. When said series of parts is bent or curved, activating the actuators may be for "snapping back" the parts of the support to aligned positions (as shown in the right section in the figure). The actuators may be activated by a power source 236 which can send a current through the series of parts 232a-i. The actuators, for example, may include piezoelectric elements.

In some embodiments, each actuator may have two states—activated and deactivated, whereas maintaining each state may not require power (i.e. each actuator may be bi-stable). Power may be required only for switching between the states.

For the above, see e.g. U.S. Pat. Nos. 5,572,776, 7,013,538, 6,544,245, 6,983,517, 7,200,902 and 6,603,386.

FIG. 26 shows another embodiment of the invention as a support 230' similar to support 230, whereas instead of utilizing actuators for aligning parts, each part of support 230' (shown parts 230a-d) may include a hinge (parts 230a-d shown to include hinges 238a-d, respectively). Each hinge can be fastened, for aligning the parts (therefore straightening the support), and loosened for releasing the alignment so that the support can be bent. The hinges may be mechanically activated (and deactivated) and/or electronically activated. For example, support 230' may include mechanical apparatuses in the hinges, which can lock the hinges when the parts of the support are aligned. A user may therefore straighten the support manually (for aligning the parts, in a suggested direction illustrated by a curved dashed-dotted arrow) and then activate said mechanical apparatuses (e.g. by operating a device including 230'), so that the hinges are locked and the support remains straight.

FIGS. 27 through 29 show an embodiment of the invention as a device 300. Device 300 may generally include a containing container 310 and a flexible display sheet 320 (or simply "sheet") which can be extended out of the container to any extent (it is understood that the extents of the extending are limited by the length of the sheet). In FIGS. 27 through 29, sheet 320 is shown having lengths 320a-c, respectively, extended from container 310. In device 300, visuals that are displayed on sheet 320 may automatically be adjusted or modulated (or otherwise in any way set or determined) according to the extended length of the sheet (i.e. the extent to which the sheet is extended from container 310) at any given time.

In some embodiments, the aforementioned visuals may be adjusted or modulated such that their entirety will appear on the sheet (i.e. they will completely be displayed on the sheet), whereas the size of said visuals may be determined by the extent sheet 320 is extended from container 310 (i.e. the length of the sheet that is outside the container). An object 322 (as exemplary visuals displayed on sheet 320) is shown in FIGS. 27 through 29 having display states 322a-c, respectively. Display states 322a-c refer to the orientation and size of object 322 as it is displayed on sheet 320. When length 320a of sheet 320 is extended from container 310 (specifically shown in FIG. 27), object 322 is displayed having state 322a (shown squiggly sides of the object at top and bottom of the object). When the extended section of the sheet is of length 320b (specifically shown in FIG. 28), object 322 has a state 322b where its orientation is different than when in state 322a (shown squiggly sides of the object as left and right as the object is displayed positioned as rotated ninety degrees relative to its position (or "orientation") in state 320a). The different in orientation of the object between states 322a and 322b may be beneficial for displaying object 320 in its entirety (i.e. all of the object) as large as possible (i.e. without reducing its size in state 322b relative to its state 322a). For length 320c of sheet 320 to be extended from container 310 (specifically shown in FIG. 29), object 322 may have a state 322c where its size is different (shown smaller than in states 322a,b). The size is smaller to facilitate displaying the object in its entirety on length 320c. Automatic changing of display states of object 322 (as described above depending on the length of the section of sheet 320 which is extended out of container 310 at any given time) may be facilitated by sensing the extent to which sheet 320 is rolled out of container 310 (e.g. a sensor may be utilized to measure the extension length) and by device 300 performing an operation (e.g. by a processor and program) of calculating the available resolution (e.g. pixels) in the extended section (also "length") of the sheet, for adjusting the display of the object appropriately.

Following the above, device 300 can be operated (or "used"), such as for viewing visuals displayed on sheet 320, when sheet 320 is rolled out to different extents (i.e. when different lengths of the sheet are extended) from container 310, whereas visuals intended to be displayed on sheet 320 may receive an orientation and size to be accommodated (or specifically "displayed") on the length of a section of sheet 320 which is rolled out. By changing between states of displayed visuals, such as adjusting orientation and/or size, said visuals can still be displayed in their entirety on the sheet, compromising the size of the visuals, and/or their orientation (it may be required for the device may be held by a user at a different angle for each state). Changes in size are usually associated with changes in resolution. When visuals (e.g. a displayed object) are "contracted" (i.e. becomes smaller), the number of pixels that form the display of said visuals may be reduced, and so the resolution of the object may be lowered. This is similar to how visuals can be made smaller on common graphic user interfaces (GUIs) by displaying them at a lower resolution (i.e. the visuals may be displayed by fewer pixels and are therefore smaller, but still displayed in their entirety).

FIGS. 30 and 31 show an embodiment of the invention as a device 330. Device 330 generally includes a section 332, which is shown by way of example as an elongated base on which (or specifically "around which") and off of which a flexible display sheet 340 (illustrated by dashed lines) can be rolled. As opposed to the described above for containers into which and out of which a flexible display sheet may be rolled (i.e. retracted and extended, respectively), in device 330 the flexible display sheet (or simply "sheet", i.e. sheet 340) may be rolled on and off another section (i.e. section 332 of device 330), such as "wrapped on" and "peeled off" another section, respectively. Accordingly, the sheet can encase or cover the section, and additionally be taken off the section. Preferably, when sheet 340 covers section 332, the surface of the sheet on which visuals may be displayed may be facing outward, so that they are viewed when the sheet covers the section. Note that it is made clear that sheet 340 may cover any section (or "area", or "part") of section 332, such as by the sheet being wrapped along the entire curve (i.e. the circumference along the length) of the section in case the section is a tube, whereas the holes of said tube (mentioned as an example of the section) may remain uncovered, or similarly such as by the sheet being wrapped only along half of the aforementioned curve (either half the length of the circumference or half the circumference all along the length).

In some embodiments, sheet 340 may be connected to section 332 such that only a section of the sheet covers only a section of the section, as specifically shown in FIG. 31 the sheet partially rolled on the section (as opposed to generally covering the entire circumference along the length of the section in FIG. 30). In FIGS. 30 and 31, sheet 340 is shown to be connected to a support 342 (similar to the described above for supports of devices of the invention) which includes parts 342a-f. Section 332 is shown (by way of example) as having six sides forming a hexagonal shape, so that when the sheet is rolled on the base, each part of support 342 settles (also "is situated") on one of said sides, as specifically shown in FIG. 30 for a first state of device 330. In FIG. 31, only parts 342e,f are shown settled on two sides, while the rest are rolled off the base respectively to sheet 340, for a second state of the device (not that in FIG. 31, section 332 is shown as rotated (around its hexagonal base) from its position in FIG. 30, for facilitating depiction of said first and second states).

In some embodiments, when any part of support 342 is settled on a side of section 332, that part may be temporarily connected (i.e. may be later disconnected) to that side by any means known in the art, such as by clips or magnetic attraction. Optionally, that part may be disconnected from said side by any action of a user, such as by operating a control of device 330 (e.g. pressing a button), or such as by being pulled from said side with enough force. Said force may be applied to other parts and may reach said part, such as in case a user is pulling on an end of the support to release it (and the sheet) from the section. Accordingly, parts of the support and the sheet can temporarily be attached to the section when rolled on it, for facilitating states of the device, whereas said parts, and according the sheet, may be detached by an action of a user.

In some embodiments, states of device 330 in which several or all parts of support 342 are settles of several or all sides of section 332 (specifically sides of its length) may be locked (or otherwise maintained), similarly to the described for locking mechanisms of devices of the invention. Accordingly, it is made clear that a locking mechanism may be included in device 330 for locking states of the device as described herein.

Further shown in FIGS. 30 and 31 is part 342$f$ connected to the section 332 by a connector 334 such that in some embodiments the connector facilitates support 342 remaining constantly connected to section 332, whereas in other embodiments the connector facilitates the support being connected to and disconnected from the section.

In some embodiments, connector 334 can facilitate connecting support 342 (and accordingly sheet 340) to section 332, whereas when connected, the connector (or any other means known in the art) may facilitate locking a state of device 330 in which the support (and accordingly the sheet) is connected to the section, such as for locking the connection between the support and the section so as to not accidently disconnect the support from the section.

Figure 34:
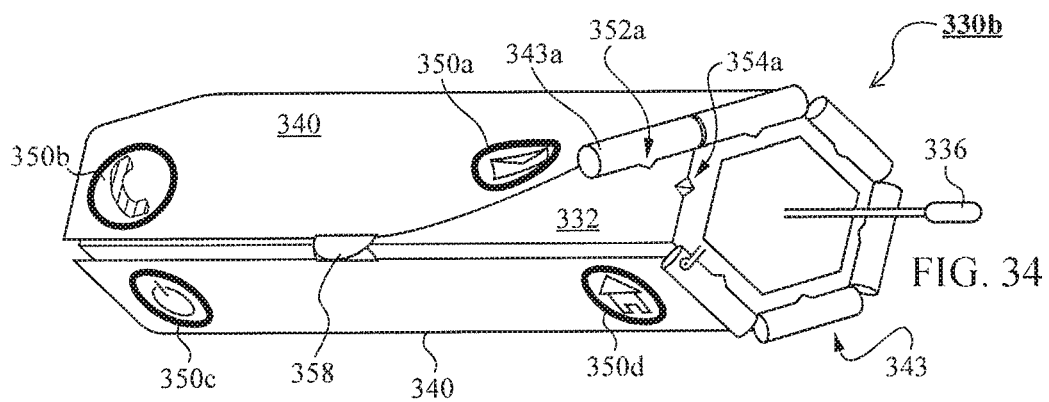
FIG. 34 shows an embodiment of the invention.

In some embodiments, sheet 340, as connected to support 342, may be operated when connected to section 332 (see ref. FIG. 34) and/or when not connected to section 332, whereas in some embodiments, section 332 may be operated when sheet 340 is connected to the section and/or when the sheet is not connected to the section. For example, sheet 340 may include a processor, a memory unit, a power source, controls and/or topology sensors, for being operated or used separately from section 332 (specifically, sheet 340 itself, as a module of device 330, may be similar to device 100 or to device 120, see ref. FIGS. 1 through 6), whereas the section may serve a "docking station" for the sheet, and can be utilized for recharging said power source of the sheet and/or for uploading information to said memory unit (said power source and memory unit as suggested to be optionally included in sheet 340). In some such embodiments as in the latter example, sheet 340 may be operated by bending (as described above re. FIGS. 1 through 13). For another example, section 332 may itself be a device (such as a serving as a module of device 330) includes a memory storage capacity (or "memory unit") for data (e.g. "e-book" files) which can be utilized for generating visuals on sheet 340 (e.g. displaying "e-book" pages on the sheet), such as by connector 334 facilitating exchange of data from the section to the sheet. Accordingly, for the same example, the sheet (together with support 342) may be connected to section 332 (by connector 334) for displaying visuals generated by processing data stored in section 332, and/or for supplying power to any element of sheet 340 which requires power for operations (e.g. a display apparatus). Note that in some embodiments, sheet 340 may similarly be connected to other sections (preferably sections similar to section 332) which store other data. In a similar example, different sections may be different models of hardware (or otherwise any type of products), so that device 330 can be upgraded by disconnecting support 342 and accordingly sheet 340 from section 332 and connecting them to an upgraded section (as a different hardware model).

Note that it is made clear that a device of the invention may include a flexible display sheet and a support, as described herein, such as an embodiment including device 120 and support 222 (see ref. FIGS. 4 through 13 and FIGS. 18 and 19, respectively) wherein sheet 122 of device 120 may be connected to the support. Such devices of the invention may exclude a section to which a support (or plurality thereof) of such devices may connect and/or from which said support may disconnect.

In some embodiments, a support included in device of the invention may include controls, such as shown for support 342 including controls 338$c,d$, specifically on parts 342$c,d$ of the support, in FIGS. 30 and 31. Said controls included in said support may facilitate operating a device of the invention which includes a flexible display sheet and said support, or facilitate operating a module of a device of the invention which includes a flexible display sheet and a support, specifically when said module is not connected to any other section of said device, such as described for operating sheet 340 and support 342 as connected to each other, when not connected to section 332.

In some embodiments, a section of a device of the invention (e.g. section 332), to which a flexible display sheet (e.g. sheet 340) and/or a support (e.g. support 342), may include controls (e.g. controls 338$a,b$ as shown included in section 332 in FIGS. 4 and 6), to facilitate operating said device (or specifically said section, in case said section is itself a device, as a module) when said flexible display sheet and/or said support are disconnected from said section. Note that in some embodiments, said controls may, additionally or alternatively, facilitate operating said device (or specifically said section) when said flexible display sheet and/or said support are connected to said section.

Figure 32:
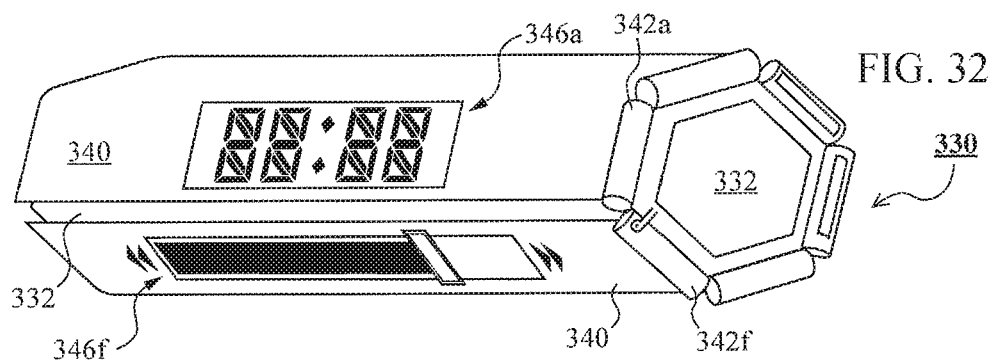
FIG. 32 shows an embodiment of the invention.

FIG. 32 shows device 330 in which sheet 340 is illustrated by continuous lines (as opposed to the shown in FIGS. 30 and 31), so that section 332 is generally obscured by the sheet as the sheet is rolled on it and accordingly covers it. Preferably, as mentioned above, when the sheet covers the section, the external side of the sheet (i.e. the side which can be viewed when the sheet covers the section) is the side on which visuals may be displayed.

In FIG. 32, sheet 340 is showed displaying visuals 346$a$ on a section of the sheet which covers a first side of section 332, and displaying visuals 346$f$ on a section of the sheet which covers a second side of the section. Respectively, parts 342$a$ and 342$f$ of support 342, which correspond to the aforementioned sections of sheet 340, may be settled on said first and second sides. Visuals 346$a$ can be any visuals that can be displayed on the sheet section which covers said first side of the section, whereas visuals 346$f$ can be any visuals that can be displayed on the section of the sheet which covers said second side of the section. Accordingly, the visuals may fit (or "be accommodated by") the sizes of aforementioned sections of sheet 340, so that the visuals are displayed in their entirety on said sections. For example, the section of sheet 340 covering the aforementioned first side of section 332 may be wide enough for displaying clock digits (as exemplary visuals 346a) and other clock and time related elements, so that a clock (preferably shown what time it is) can be displayed on that section. For another example, the section of the sheet covering the aforementioned second side of the section may be wide enough for displaying a "status bar" (as exemplary visuals 346f), so that a "status bar" (e.g. a playback track of a media file, and other related information about said media file) can be displayed on that section. Accordingly, when a part of support 342 is settled on a side of section 332, and the corresponding section of sheet 340 directly connected to said part covers said side, specific visuals may be displayed specifically on said corresponding section.

Figure 33:
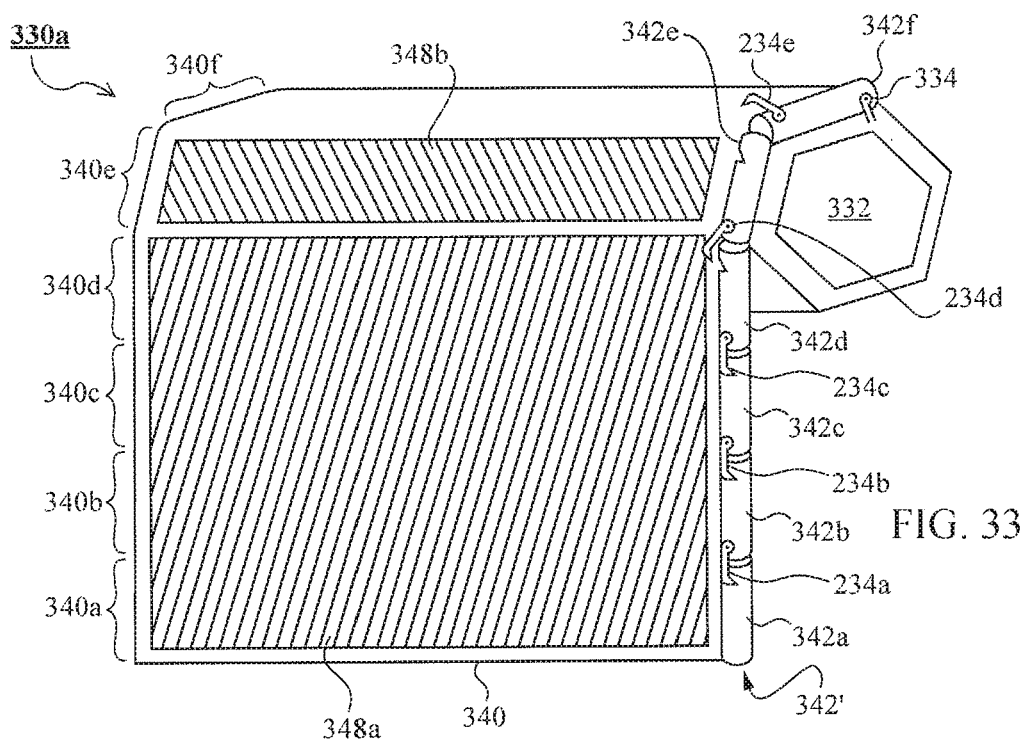
FIG. 33 shows an embodiment of the invention.

FIG. 33 shows an embodiment of a device 330a as a variation of device 330. Device 330a is shown including a support 342' (as a variation of support 342) which may include parts 342a-d (connected to sheet 340 as with the described above for device 330). In FIG. 33, parts 342a-d are shown not connected to any side of section 332 (included in device 330a), whereas each of parts 342e,f is connected to a side of the section. In device 330, sheet 340 is shown including (or "divided into") sections 340a-f which may correspond to parts 342a-f of support 342', respectively. Following the above, sections 340e,f of sheet 340, as corresponding to parts 342e,f of support 342', may directly cover sides of section 332, whereas sections 340a-d of the sheet, as corresponding to parts 342a-d of the support, may not directly cover sides of section 332.

In some embodiments, parts of support 342' and/or sections of sheet 340 (preferably sections corresponding to said parts of the support) which are not connected to section 332 may be straightened (following the described herein regarding straightening of a support, and regarding straightening of flexible display sheets or sections thereof), as shown in FIG. 33 parts 342a-d not connected to section 332, and sections 340a-d not covering the sections, whereas parts 342a-d and sections 340a-d are shown straightened, as opposed to parts 342e,f and sections 340e,f.

In FIG. 33 there is further shown sections 340a-d of sheet 340 (which may correspond to parts 342a-d of support 342) collaboratively displaying visuals 348a (i.e. the visuals are displayed across all the sections). Accordingly, visuals 348a may spread across sections 340a-d which may display them collaboratively. Section 340e (which may correspond to part 342e) is shown displaying visuals 348b which may be limited to section 340e, or specifically to a surface or the section on which visuals may be displayed.

In some embodiments, any part of support 342' connecting to section 332, specifically to a side of the section, may be sensed (e.g. by a switch being activated when a connection occurs), so that it is known that a part is connected to the section, and optionally which part is connected and/or which side of the section said part is connected to. This may facilitate certain features related to parts of the support being connected to the section, and/or related to sections of sheet 340 covering sides of section 332. By known that a part of the support is connected to a side of section 332 (and optionally which part of the support is connected to which side of the section), a related operation of device 330 may be prompted, such as the displaying of visuals on a section of sheet 340 which corresponds to said part which is connected to said side (as shown by way of example in FIG. 32 visuals 348b being displayed on section 340e as the section corresponds to part 342e which is connected to a side of section 332), or such as (additionally or alternatively) displaying visuals on sections of the sheet which correspond to parts of support 342' which are not connected to sides of section 332 (as shown by way of example in FIG. 32 visuals 348a being displayed on sections 340a-d as the sections correspond to parts 342a-d which are not connected to sides of section 332).

Following the above, a device of the invention may operate when a flexible display sheet of said device, and/or a support connected to said flexible display sheet, are not connected to any other section of said device, or are partially connected to any other section, and/or are completely connected to any other section. Accordingly, a device of the invention may operate in any of a first state, a second state and a third state wherein a flexible display sheet of said device, and/or a support connected to said flexible display sheet, are not connected to a section of the device, are partially connected to a section of the device, and are completely connected to a section of the device (respectively to said first state, second state and third state). For example, a first device of the invention may operate when a support, which is preferably connected to a flexible display sheet of said first device, is partially connected to another section of said first device, and when said support is completely connected to another section of said first device, whereas a second device of the invention may operate when a support (preferably connected to a flexible display sheet) is completely connected to another section of said second device and when said support is not connected at all to another section.

In some embodiments, as mentioned above, parts of support 342' which are not connected to section 332 may be straightened while other parts (suggested to be connected to the section) are not straightened, so that sections of sheet 340 which correspond to straightened parts of the support are accordingly straightened, while other sections are not (as shown in FIG. 33 parts 342a-d straightened while parts 342e,f are not)

In FIG. 33, support 342' is shown including clips 234a-e (see ref. FIG. 22) for facilitating straightening of specific parts of the support. Specifically in the figure, clips 234a-c are shown straightening parts 342a-d whereas clips 234d,e may not straighten parts 342e,f which are shown not aligned with the rest of the parts, and are shown directly connected to section 332 (as opposed to the rest of the parts).

Note that any other means (i.e. other than the aforementioned clips) can be utilized for straightening parts of a support (as described herein) in a device of the invention, while leaving other parts not aligned (or "not straightened"). Accordingly, any means know in the art can be utilized for modulating the straightness of any number of parts of a support so that accordingly and indirectly modulating the straightness of any number of sections of a flexible display sheet which correspond to said any number of parts.

Note that the described herein for connections between any elements of embodiments of the invention may refer to physical attachment, and/or to a connection facilitating data transfer between connected elements, and/or to a connection facilitating power transfer between connected elements. For example, a connection between a flexible display sheet and a support may be for physically fastening the support to the flexible display sheet, whereas a connection between a flexible display sheet and another section of the same device may facilitate data (e.g. signals or coded transmissions) exchange and power (e.g. electricity) transfer between said flexible display sheet and said another section.

FIG. 34 shows an embodiment of a device 330b (as a variation of device 330) in a state wherein sheet 340 is rolled on section 332 and generally covers the section. Device 330b is shown including a communication unit 336 (e.g. a cellular transceiver and antenna) which facilitates wireless communication. Accordingly, device 330 may serve as a mobile phone (see e.g. U.S. Pat. No. 6,311,076) or a wireless network connection device (e.g. Wi-Fi enabled device).

In FIG. 34, device 330b includes a support 343 similar to support 342 and support 342', whereas parts of support 343 (numbered a part 343a) are shown having connectors (illustrated as triangular protrusions of each part), such as part 343a having a connector 352a. Each connector of each part may facilitate connecting that part to a side of section 332 which is included in device 330b. Similarly to the described above for other embodiments, device 330b may include sheet 340 connected to support 343. In the figure, the parts of support 343, excluding part 343a, are shown connected to sides of section 332, so that sheet 340 is shown generally covering sides of the section, except for where part 343a is not connected to a side of the section.

In FIG. 34, sheet 340 is shown displaying interface elements 350a,b on a first section of the sheet and interface elements 350c,d on a second section of the sheet. Interface elements 350a-d may represent or correspond to operations of device 330b, operations which may be prompted by bending sheet 340 correspondingly to where the interface elements are displayed (e.g. bending the sheet at a line crossing any of the interface elements), such as incase input is registered by the bending of sheet 340. For example, interface element 350a may be a graphic symbol representing an "e-mail" application, whereas interface elements 350b-d may represent a phone dialer application, a power on/off operation and a home-page shortcut function, respectively. Bending sheet 340 correspondingly to where any of the interface elements are displayed may be for prompting any reaction by device 330b (preferably specifically in an interface of the device which may be displayed on sheet 340) which is related to that interface elements (see ref. FIGS. 11 through 13 for interface elements displayed on a flexible display sheet of device 120).

In FIG. 34, sheet 340 is shown bent (from a rolled-up position on section 332) specifically corresponding to where interface element 350a is displayed (e.g. at a line crossing the interface element). Such bending of the sheet may be for prompting an operation (or "reaction") of device 330b which corresponds to interface element 350a, or to any interface or program object represented by the interface element. For example, referring to the example in the previous paragraph, a mail application may be opened (or "loaded"), or a function of said "e-mail" application may be executed, such as receiving incoming "e-mail" messages (preferably by utilizing communication unit 336) and optionally displaying any of said messages on any sections of sheet 340.

In FIG. 34, the general location on sheet 340 where interface element 350a is displayed may be directly connected to part 343a of support 343, so that bending of the sheet correspondingly to said general location may be by disconnecting the part from a side of section 332. Part 343a is shown having a connector 352a which, in some embodiments, can connect (e.g. interlock) with a connection unit 354a (e.g. a socket, such as in case connector 352a is a plug) shown located at a side of section 332. For example, in some embodiments, part 343a can be pulled from section 332 such that connector 352a (of the part) may be released from connection unit 354a. Note that following the above, parts of support 343 may be connected to sides of section 332 by each part including a connector (or "connection unit"), and/or by each side including a connection unit. For example, in a device of the invention similar to device 330b, sides of section 332 may include connector which facilitate connecting parts of support 343 to said sides, whereas said parts may not include any means for connection, such as in case each of said sides of section 332 includes a clip which can clip on any of said part of support 343, without the parts of the support required to include any connection means.

While supports of flexible display devices of the invention are shown and described herein to be connected to a display sheet, supports may alternatively or additionally be integrated inside a display sheet, provided they are slim (also "narrow") enough and the sheet wide enough to enclosure or house them. Additionally or alternatively, in some embodiments, sensors may be integrated in supports for sensing bending, instead of the exemplary means described above (i.e. sensor 112 shown in FIGS. 2 and 3, and sensing sheet 124 shown in FIGS. 4 and 6). For example, hinges may connect parts of a support, while switches which can be activated by bending each part in two directions (e.g. backward and forward, from an aligned position relative to its adjacent parts) may be included and integrated in said hinges. For another example, said hinges may include potentiometers or current dividers influenced differently by different bending extents, so that they (and respectively angles between parts) can be measured.

Figure 35:
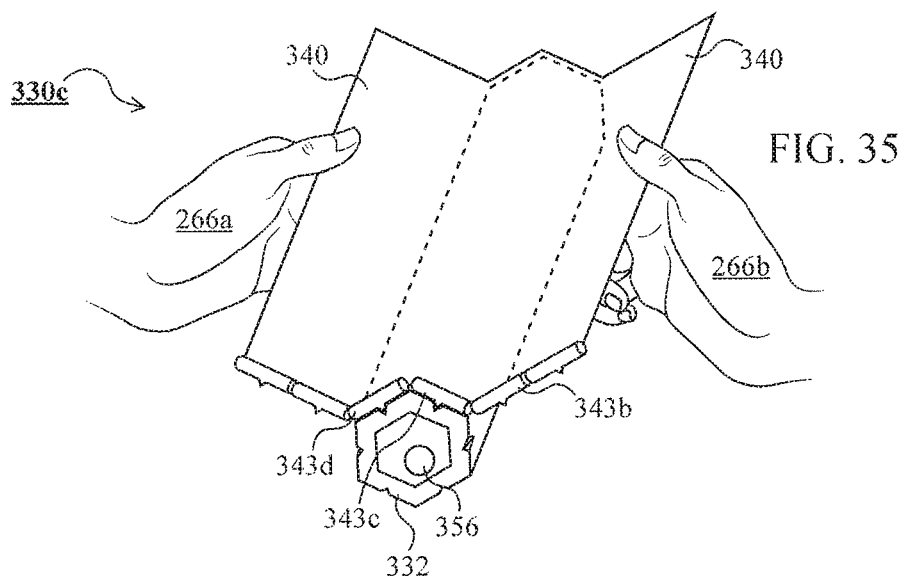
FIG. 35 shows an embodiment of the invention.

FIG. 35 shows an embodiment of a device 330c (as a variation of device 330, specifically similar to device 330b) being in a state wherein support 343 is connected to section 332 (the section is partly obscured by sheet 340 from the point of view of the figure, where it is illustrated by dashed lines) by middle parts of the support (shown parts 343c,d connected to sides of the section). In such a state, device 330b can be held (shown held by hands 266a,b, see ref. FIG. 21) similarly to holding a book. The parts of support 343 which are not connected to section 332 may be aligned from each side of the support (relative to the middle of the support connected to the section), such as in case sections of the support (i.e. a sequence or series of parts of the support) are straightened, as described herein for the invention. Accordingly, sections of sheet 340 which are directly connected (or "corresponding") to aligned parts of the support may be straightened (preferably influenced by the aligning of parts of the support), for providing flat surfaces for the sheet whereat visuals may be displayed. As shown in the figure, parts of support 343 and sections of sheet 340 may be positioned to provide a shape similar to an open book (hands 266a,b are shown holding device 330c similarly to holding a book).

In some embodiments, the sides of section 332 to which parts of support 343 are connected when device 330 is held like a book may smaller than the rest of the sides, so that the sections of sheet 340 which extend from section 332 may be longer than the sections that cover sides of section 332, to facilitate a greater similarity to a book. Accordingly, it is understood that parts of support 343 may be of different sizes.

In some embodiments, any part of support 343 can be disconnected from section 332, yet a mechanism 356 (which may be included in device 330c) may facilitate preventing a state of device 330c in which all connectable parts of the supports are disconnected from section 332. Accordingly, mechanism 356 may be any means known in the art (a processor coupled to sensors sensing connections of parts of support 343 to sides of section 332) utilized for ensuring that in any given time at least one part of support 343 is connected to section 332 (preferably to any side of the section). For example, in case a first part of support 343 remains connected to section 332 while the rest of the parts are disconnected, said first part may be automatically locked to the section so that it cannot be released (or "disconnected"), whereas in case a second part of the support is the only part which remains connected to the section, said second part may be automatically locked to the section. Accordingly, either said first part or said second part (or both) remain connected to the section at any given time, even while the rest of the parts are disconnected.

Note that following the above, device 330c may have multiple states where different parts of support 343 are connected to base 332, while having other states where other parts are connected.

Figure 36:
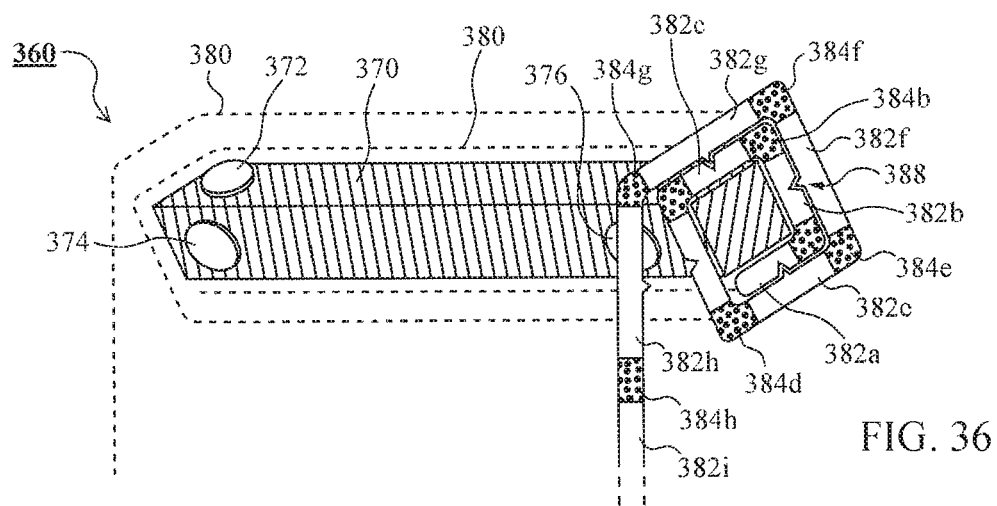
FIGS. 36 through 38 show an embodiment of the invention.

FIG. 36 shows another embodiment of the invention as a device 360, in which a flexible display sheet 380 (illustrated by dashed lines for purposes of depiction) can be rolled several times (or in other words "scrolled spirally") over a section 370 (illustrated as filled with a pattern of lines). In the figure there is shown flexible display sheet 380 (or simply "sheet") connected to a support 382 which includes parts 382a-i, between which may be any means known in the art for facilitating changing angles between the parts (or "changing positions of any of the parts relative to each other). Shown in the figure, as exemplary means for facilitating changing angles between parts of support 382, are hinges 384a-h which are illustrated as concertina-type hinges (similar to common bendable section of drinking straws) filled with a pattern of dots (for purposes of depiction). The hinges may be any means known in the art for the aforementioned changing of angles, such as by being or including mechanical hinges or elastic materials. Parts 382a-c are shown connected to parts 382e-g, respectively. Facilitating connection between the parts may be connectors or connection units similar to connector 352a and connection unit 354a (see ref. FIG. 34). Accordingly, it is made clear that in some embodiments of devices of the invention which include a support (or plurality thereof), parts of said support may connect to each other (as shown in FIG. 36 for a connection 388 between part 382b and 382f), such as to facilitate different topologic states of a flexible display sheet which preferably is connected to said support.

In some embodiments, connection between parts of support 382 may be temporarily such that the parts may disconnect from each other (e.g. by pulling the parts apart or by any other operation of device 360). Connecting and disconnecting of the parts may be performed automatically and/or by a user operating device 360. For example, parts of support 382 may be connected to each other automatically as they are attached to each other, such as when sheet 380 is rolled on section 370.

In some embodiments, as described herein for locking states, connections between parts of support 382 can be locked (or otherwise maintained), such as to maintain a "rolled-up" state of sheet 380 around section 370, and can be unlocked, such as by operating device 360 in a specific manner (e.g. activating and deactivating a switch of the device wherein an activated switch locks a connection between parts of support 382). Accordingly, it is made clear that a device of the invention may include a locking mechanism which locks connections between parts of a support of said device.

In some embodiments, parts 382a-d of support 382 may be permanently connected to section 370 such that they can never be disconnected from it, while other parts of support 382 can temporarily be disconnected from or connected to each other or the section.

In FIG. 36, section 370 is shown including controls 372, 374 and 376 which may be located beneath sheet 380 when the sheet is rolled on the section, or otherwise in any way connected to the section (optionally via support 382 connecting to the section). Directly above the controls (when sheet 380 is rolled on section 370), specifically on sections of sheet 380, may be displayed visuals. Said visuals may correspond to operations related to operating the controls.

Figure 37:
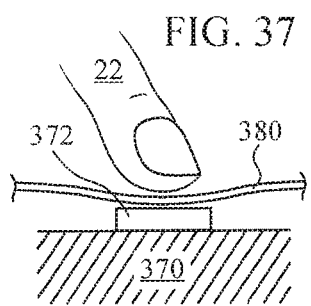
Figure 38:
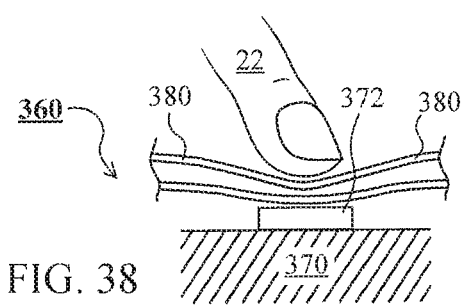

FIGS. 37 and 38 show a cross-section view of device 360, wherein sheet 380 is rolled on section 370 while a finger 22 is pressing on sheet 380 for operating control 372. Specifically in FIG. 37 there is shown a state of device 360 in which sheet 380 is generally rolled once on section 370, whereas specifically in FIG. 38 there is shown a state of the device in which the sheet is generally rolled twice, showing two layers of the sheet. Where finger 22 is pressing on the sheet may be displayed visuals which correspond to operating control 372. In FIG. 37 said visuals may be displayed on a first layer of sheet 380, whereas in FIG. 38 said visuals may be displayed on a second layer of the sheet which is shown to be rolled over said first layer.

Information may be obtained by device 360 (e.g. by including sensing means) about which section of sheet 380 covers which side of section 370, and how much layers of sheet 380 cover said side for displaying virtual on sheet 380, specifically on sections of the sheet which are externally exposed (i.e. sections of the sheet which are visible to a user, such as sections on which there is no additional layer of sheet 380). Said visuals may be displayed specifically where any number of layers of sheet 380 cover control 372 which is located beneath said any number of layers. For example, when sheet 380 is completely rolled on section 370, an icon may be displayed on a first layer of the sheet where said first layer covers a second layer of the sheet, specifically where said first and second layers cover control 372, whereas when half of sheet 380 is rolled off the section, said icon may be displayed on said second layer (which is not covered by said first layer).

In some embodiments, controls 372, 374 and 376 may always be covered by at least one layer of sheet 380, such as in embodiments wherein parts 382a-c of support 382 are permanently connected to section 370, as mentioned above, so that sections of sheet 380 which correspond to the parts may permanently cover the controls.

Figure 71:
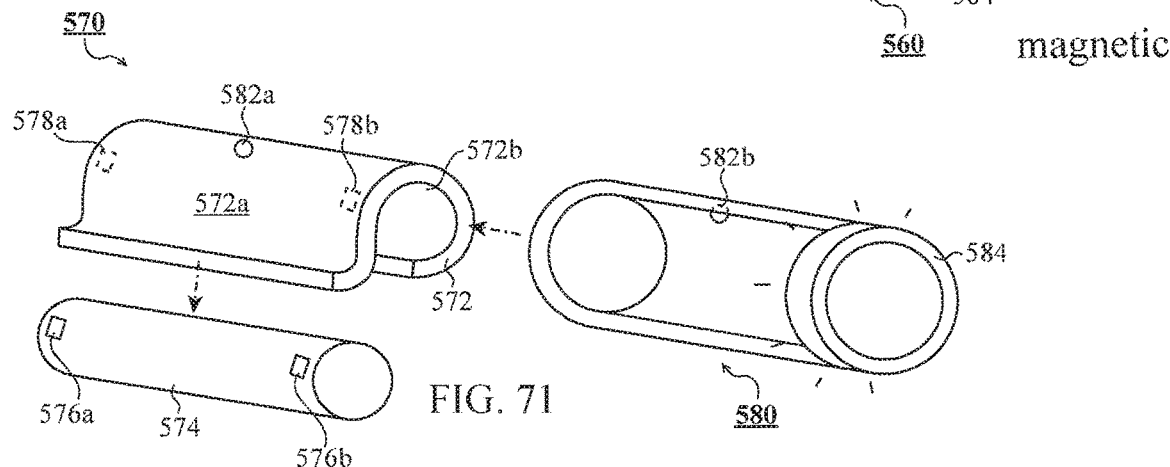
FIG. 71 shows an embodiment of the invention.

In some embodiments, a container may enclose device 330 or device 360 such that section 332 or base 370, respectively, may be installed inside said container (see e.g. a section 580 in FIG. 71). The container may be similar to tubes having openings, through which display sheets may be rolled, as previously described. Said container may include transparent sections (see e.g. an aperture 596 shown in FIG. 72) so that sections of a flexible display sheet may be visible through them, and so that visuals may be displayed on said flexible display sheet when it is rolled inside said container. Accordingly, device 330 or device 360 may be used for viewing visuals even when their flexible display sheets are rolled on other sections, similarly to the shown in FIG. 32.

FIG. 39 shows an embodiment of the invention as a flexible display device 400 (or simply "device"). Device 400 may include a flexible display sheet 410 (or simply "sheet") which can be bent for registering input or for prompting operations of device 400, similarly to the described for sheet 102 of device 100 and sheet 122 of device 120 (see ref. FIGS. 1 through 13). Accordingly, topological states of sheet 410, and/or changes thereof (e.g. by bending of corners of the sheet) can be sensed for registering input or for prompting device operations.

In FIG. 39, sheet 410 is shown connected to supports 412a,b (similar to the described herein for supports) which may be positioned, by way of example, on opposite sides of the sheet (left and right in FIG. 39). Such positioning of the supports may facilitate bending of the supports when sheet 410 is bent near said opposite sides, or similarly may facilitate bending at said opposite sides when the supports are bent.

In some embodiments, connection locations between parts of supports 412a,b (i.e. location whereat parts of the supports are connected) may serve as locations of bending (of sheet 410 and/or any of the supports), such as for registering input or for prompting operations, similarly to the described for bending locations 142, 144 and 146 of sheet 122 of device 120 shown in FIG. 13. In FIG. 39 there are shown exemplary bending locations 414a-e where parts of the supports are connected (e.g. connected by hinges or by an elastic material). Corresponding to locations 414a, 414c and 414e are displayed interface elements 416a, 416c and 416e, respectively, which may be similarly to interface elements 140a-d shown in FIGS. 11 through 13.

Following the above, supports 412a,b of device 400 may facilitate bending of sheet 410 at specific locations (whereat, preferably, parts of the supports are connected to each other), whereas corresponding to said specific locations may be displayed (on sheet 410) visuals which represent (or "correspond to") operations of device 400.

In some embodiments, any number of parts of supports 412a,b may be aligned (or "straightened"), for straightening sheet 410 (such as to provide a flat surface). As described above, a state in which any number of parts are aligned may be locked (e.g. by any means for locking), so that the alignment between the parts may be maintained, or specifically so that said any number of parts cannot change angle (or "position") relative to each other. Accordingly, because when such states are locked the supports cannot bend where the parts of the supports are aligned, sheet 410 cannot be bent in sections of the sheet which correspond to the aligned parts (e.g. sections of the sheet which are near the supports, specifically near the aligned parts). This may be beneficial for preventing bending of the sheet, or of specific sections of the sheet, when it is desired that such an action is prevented.

Note that it is made clear that devices of the invention may display visuals on flexible display sheets, whereas certain visuals may not represent or correspond to operations of said devices, in which case bending of said flexible display sheets may not be for registering corresponding input or prompting corresponding device operations. For example, a movie clip may be displayed across all of sheet 410 of device 400 and there may be no display space left on the sheet for displaying other visuals (similarly to common "full-screen" functions in media playing interfaces). In such cases, which can be temporary (e.g. the displaying of said movie clip may be changed to displaying of interface elements in accordance with the described herein), bending supports 412a,b at bending locations may not prompt operations of device 400, or otherwise may prompt operations of the device which are unrelated to where the supports are being bent, such as in case any bending at any location may be for prompting the displaying of an options menu for controlling the playing of the aforementioned movie clip.

The note above may refer to any device of the invention which includes a flexible display sheet (or plurality thereof).

FIG. 40 shows device 400 in another state than shown in FIG. 39. In FIG. 39 sheet 410 and supports 412a,b are shown straight (sheet 410 being flat and the supports having a straight rod shape), whereas in FIG. 40, parts of support 412a are shown bent backward (i.e. away from the view point of the figures) from location 414a, and parts of support 412b are shown bent forward from locations 414c and 414e. Accordingly, input may be registered which is associated with (or "which corresponds to") interface elements 416a, 416c and 416e, as the supports are bent from bending locations which correspond to the interface elements. Optionally, the direction of the bending (forward or backward) may also determine which input is registered, so that operations of device 400 which correspond both to bending locations (which themselves may correspond to interface elements) and to bending directions may be prompted or executed. For example, interface element 416a, which correspond to bending location 414a, may represent flipping pages of an "e-book" displayed on sheet 410, whereas bending support 412a forward from location 414a may be for changing the display on sheet 410 from any page displayed to its previous page, whereas bending backward from location 414a may be for changing the display from said any page to its following page. Note that bending support 412a at (or "from") other locations may be for other changes in the display on sheet 410.

FIG. 41 shows yet another state of device 400, in which support 412b (specifically parts of the support) is bent forward from (or "at") location 414c and backward from location 414b. Accordingly, an operation of device 400 associated with interface element 416c (as the interface element is being displayed at a location corresponding to the bending) may be prompted, whereas an operation associated with interface element 416b may also be prompted. Alternatively, an operation associated with both interface elements 416b and 416c may be prompted. For example, when the upper right corner of sheet 410 (which is connected to support 412b) is not bent, interface element 416c may be displayed near location 414c, but no other interface element is displayed at said upper right corner (as specifically shown in FIG. 39), whereas when said upper right corner is bent from location 414c interface elements 416b and 416d may be displayed near locations 414b and 414d, respectively (as specifically shown in FIG. 40). Interface elements 416b and 416d may be associated with controlling parameters of an interface element which correspond to interface element 416c, so that bending support 412b at location 414b (corresponding to interface element 416b) and/or bending the support at location 414d (corresponding to interface element 416d), as shown in FIG. 41, may be for changing said parameters. Optionally, bending at location 414b may be for changing different parameters than parameters changing by bending at location 414d (or alternatively changing the same parameters differently (e.g. increasing a value and decreasing a value as differently changing the same parameters). The parameters discussed above may be, for a specific example, related to a "window" (in common "windows" interfaces for operating systems) displayed on sheet 410, whereas bending at location 414b may be for closing said "window", and whereas bending at location 414d may be for minimizing said "window" (as known in "windows" interfaces).

Further shown in FIG. 41 interface element 418 displayed at the upper left corner of sheet 410 (substituting interface element 416a shown displayed at said upper right corner in FIGS. 39 and 40). Interface element 418 may be a collection of sub-elements which may be displayed correspondingly to bending locations of support 412a, so that each of said sub-elements may be interacted with (e.g. performing a bending which prompts an operation of device 400 which is associated with that sub-element) by bending support 412a from a corresponding bending location. Interface element 418 may be an options menu, a tool-bar, a dialog-box, a drop-down menu, a control panel, or otherwise any collection of sub-elements associated with operations of device 400.

In FIG. 41, device 400 is further shown displaying visuals 420 at a lower section of sheet 410. Visuals 420 may not be influenced by bending of the supports and sheet near where the visuals are displayed, yet may be influenced by bending at other locations, such as at locations 414*b-d*, which may be far from the visuals. For example, visuals 420 may be a media clip (e.g. from a video file) which is played at the aforementioned lower section of sheet 410. Said media clip may be controlled by interacting with interface elements displayed elsewhere on the sheet (e.g. interface elements 416*b-d*), provided said interface elements are displayed correspondingly to bending locations of any of supports 412*a,b*. Alternatively, said media clip may be controlled by bending actions (performed by a user of device 400) which may prompt operation of device 400 which may not be represented by interface elements displayed on sheet 410, such as in case any bending of the sheet at the aforementioned lower section may be for pausing the playing of said media clip. In such cases, when said media clip is paused, a displaying of interface elements (e.g. interface element 418, as including a list of options) correspondingly to bending locations, may be prompted. This may be similar to computer operations prompted by any action performed on a keyboard or mouse of said computer (e.g. the pressing of any key), such as for a pause reaction in an interface of said computer, even when no interface element representing said pause function is displayed.

FIGS. 42 and 43 show close-up views of a corner of an embodiment of a device 400' similar to device 400, whereas in device 400', a support 412*b'* (and optionally a support 412*a'* on an opposite side, not shown in FIGS. 42 and 43) may be located inside a sheet 410' (illustrated by dashed lines), in case sheet 410' is thick enough and support 412*b'* is thin (or "narrow") enough. In FIG. 42, the support and sheet are shown as straight (or "straightened"), whereas in FIG. 43 the support and sheet are shown as curved (or "bent"). Support 412*b'* is shown in the figures including parts of different sizes, and may include more or less parts than support 412*b*, to which support 412*b'* may be similar. Accordingly, as mentioned above, a support (or plurality thereof) of a device or system of the invention, may include any number of parts having any size. By including more parts, a support may be more bendable support, whereas by including fewer parts, a support may be less bendable. This may affect the flexibility of a flexible display sheet, or plurality thereof, which may connected to a support (or in any way include a support, such as inside said flexible display sheet). In embodiments including a support which has enough parts, bending of a flexible display sheet may seem continuous (i.e. may seem like no support is connected to the sheet or located inside the sheet, or may seem like there are no specific bending locations). Accordingly, the flexibility of a flexible display sheet of devices of the invention may be controlled by a support (or plurality thereof) connected to or located inside said flexible display sheet, in case different topographic states of said flexible display sheet, as formed by influence of said support, may be temporarily locked (as locked in alignment are parts of said support, so said parts may be regarded as a single part, and so it seems like said support has less parts). Such features can be modulated by locking aligned positions of parts of a support so that there are essentially less bending locations (i.e. less locations at which the support, and preferably a connected flexible display sheet, may be bent).

FIG. 44 shows a close-up view of a support 420 similar to supports 412*a* and 412*b* and which can be included in or connected to a flexible display sheet of the invention (e.g. sheet 410). Support 412 may sense, or facilitate sensing, bending, or otherwise any topologic states or changes thereof, of a flexible display sheet in which it is included (alternatively or additionally to other topology sensing means described herein, e.g. sensing sheet 124 of device 120 re. FIGS. 4 through 13). Support 420 may include any number of parts, such as shown in the figure for including parts 420*a-d*.

In some embodiments, parts 420*a-d* may be connected by connectors 422*a-c* (generally illustrated by dashed lines suggesting they may be mostly obscured from the point of view of FIG. 44, such as in case they are mostly inserted into parts of support 420). Each connector may include (or otherwise "integrate") any number of means for sensing relative positions between parts which that connector connects, and/or changes in relative positions between parts which that connector connects. Accordingly, connectors 422*a-c* may facilitate sensing bending of any of parts 420*a-d* relative to any other part. Further accordingly, connectors 422*a-c* may facilitate sensing bending of a flexible display sheet which they are included in or connected to (by sensing relative positions or changes thereof between parts of support 420.

In some embodiments, support 420, or specifically any of parts 420*a-c* and/or any of connectors 422*a-c* may include, or be connected to, means for automatically (e.g. by operations facilitated by actuation of mechanical and/or electronic elements of a device) bending or straightening parts 420*a-d* relative to each other, or otherwise changing or setting the positions of any of the parts relative to any other parts. For example, in FIG. 44, parts 420*a-c* are shown including snap-back means 428*a-c*, for so-called "snapping-back" the parts to aligned positions relative to each other (e.g. for straightening support 420). See ref. parts 420*a,b* shown in FIG. 44 aligned to each other (or "in aligned positions relative to each other"), such as in case snap-back means 428*a* are activated to align the parts, whereas parts 420*b,c* are shown not aligned (part 420*c* is shown bent relative to part 420*b*), such as in case snap-back means 428*b* are not activated and so parts 420*b,c* may be bent (e.g. by a hand of a user) relative to each other.

Following the above, in some embodiments, support 420, or any number of parts of support 420, may be straightened automatically (e.g. by operations of a device in which the support may be included) when no external force is applied (e.g. a hand applying force) on the support or on any of the parts of the support. Accordingly, in some embodiments, support 420, or any number of parts of the support 420, may be bent by applying external force (e.g. a hand or any number of fingers pushing or pulling any of the parts), whereas when said applying of external force is stopped (e.g. a hand bending the support is removed from the support), the support, or said any number of parts, may be automatically straightened by means included in support 420 (or to any of the parts of the support), or means connected to support 420 (or to any of the parts of the support).

In some embodiments, snap-back means 428*a-c*, or any other means included in or connected to support 420 (or to any number of parts of the support) may automatically bend support 420, or specifically any number of parts of the support, similarly to automatically straightening described in the previous paragraph. For example, the positions of parts 420*a-c*, as shown in FIG. 44, may be automatically set (such as in case snap-back means 428*a-c* are actuators which can control the positions of the parts), so that the relative bending between parts 420*b,c* and between parts 420*c,d* may be facilitated by snap-back means 428*a-c* (or by any other means included in or connected to support 420 or any parts of the support), whereas the alignment of parts 420*a,b* relative to each other may additionally be facilitated by snap-back means 428*a-c* (as described above).

In some embodiments, relative positions of any of the parts of support 420 may be locked (or otherwise maintained) so that any relative positions of any of the parts may be maintained, either when no external force is applied to the support (or to any of the parts), and/or even when external force is applied. For example, as shown in FIG. 44, parts 420*b-d* may include locking means 426*b-d* so that the relative positions of parts 420*a-d* (relative to each other) shown in FIG. 44 may be locked or otherwise maintained. Locking of the relative positions of the parts may be for preventing any external force from changing the relative positions, such as preventing a hand of a user from bending any of the parts from their relative positions as shown in FIG. 44. Alternatively, locking of the relative positions of the parts may be for automatically snapping-back the parts to their relative positions shown in FIG. 44, when applying of any external force on support 420, or on any of the parts of the support, is stopped, such as in case said applying of force bends any of the parts from their relative positions, in which case when said any of the parts are no longer subjected to force, the parts may return to relative positions which were locked.

FIGS. 45 and 46 show support 420 (shown in the figures excluding part 420*a*) influenced by two different forces (illustrated direction of forces by a dashed-dotted arrow in each figure).

In FIG. 45, thumb 24 is applying force on support 420 for straightening the support (i.e. aligning the parts of the support, as shown in the figure). Accordingly, the positions of parts 420*b-d* relative to each other may be a result of the thumb applying force on the support. Preferably, as long as thumb 24 is applying force on support 420, such as by pushing any part of the support (shown in the figure as pushing part 420*d*), the relative positions of the parts may be remain the same.

In FIG. 46, support 420 returns to a default state (i.e. a state in which no external force is applied on the support), or to a state which was previously locked (or otherwise "a state in which the positions of parts of the support were previously locked"). The state of support 420 shown in FIG. 46 may be a "bent state", i.e. a state in which parts of the support may be bent relative to each other, whereas the state of support 420 shown in FIG. 45 may be a straightened state, i.e. a state in which parts of the support may be aligned.

In some embodiments, support 420 may change (or "switch") from the state shown in FIG. 45 to a state shown in FIG. 46 automatically when thumb 24 is removed from the support (or when applying of force by the thumb on the support is stopped), such as by internal force (i.e. force applied by elements included in or connected to the support), or specifically by means for automatically changing any state of the support to the state shown in FIG. 46 (e.g. by snap-back means 428*b,c*, in accordance with the described above).

FIG. 47 shows a close-up view of part 420*b* of support 420 ready to be connected to connector 422*a*, such as to facilitate connection of part 420*b* to part 420*a* (as shown the parts connected via connector 422*a* in previous figures).

In some embodiments, parts of support 420 may be physically accommodated in any number of specific positions (e.g. the part having multiple states, or "stations", in which the relative positions of the parts may be maintained). Physically accommodating parts in specific positions may be for physically securing said specific positions so that said parts (of support 420) may be repositioned (relative to other parts of the support) only by utilizing enough force, so as to not accidently reposition said parts. When said parts are not in said specific positions, any slight force may reposition said parts, until they settle in said specific positions to be physically secured thereat. This may be similar to switching a knob between multiple set positions (e.g. a power knob (or "switch") of common electric appliances which may include an ON state, an OFF state and a STAND-BY state, for exemplary three states). Accordingly, performing bending of parts of the support relative to each other (as described for the invention for bending supports or parts thereof) may be for setting parts to specific physically accommodating positions, such as alternatively to smoothly bending the parts to any extent (or to any position). For example, as shown in FIG. 47, connector 422*a* of support 420 may include stations 434*a-c* into each of which a plug 436, which may be included in part 420*b* of the support, may fit, for three physically accommodating positions (said positions corresponding to stations 434). Part 420*b* may be in physically accommodating positions when the plug is inside any of the stations. Accordingly, part 420*b* may have three positions relative to part 420*a* to which part 420*b* may be set for being physically accommodated.

Note that combinations of relative positions of parts of support 420, such as specific positions in which parts of the support are physically accommodated, may correspond to states of support 420, so that in different states of the support, parts of the support may be in different relative positions.

FIGS. 48, 49 and 50 show support 420 in states 440*a*, 440*b* and 440*c*, respectively, whereas in each of the states parts of the support (specifically shown parts 420*a* and 420*b*) are in different relative positions. Optionally, each of said different relative positions may be physically accommodating, such that said different relative positions are maintained until enough force moves any the parts of support 420 (as opposed to locked positions in which no force can move parts of the support 420 which are in said locked positioned, or in which parts of the support return to their original position after an applying of force is stopped). Again regarding FIG. 47, in some embodiments, physical accommodation of parts of support 420 at specific positions (as described for FIG. 47) may be sensed, such as to correspond to specific inputs. Optionally, said physical accommodation may facilitate sensing of said specific positions, for registering corresponding inputs. In FIG. 47, by way of example, there are shown stations 434*a-c* including sensors 432*a-c*, respectively, whereas each of sensors 432*a-c* may sense when plug 436 is inside that sensor, such as for knowing at which corresponding position part 420*b* is (is accordance with the shown for part 420*b* in FIG. 47). In other embodiments, as also shown in the figure, plug 436 may include a sensor 438, for sensing which station (of stations 434*a-c*) the plug is in, such as for registering input corresponding to the position of part 420*b* when the plug is at that station. For example, a part at an end of support 420 may be bent from an aligned position (aligned with the rest of the parts) to a first bent position (relative to any other parts) that is physically accommodating, for displaying a first bookmarked page of an "e-book" that is displayed on a flexible display sheet which may be connected to support 420. Similarly, said part may be bent to a second bent position that is accommodating (e.g. a specific position subsequent to said first position in which the part is bent to a larger extent relative to the rest of the support), for displaying a second bookmarked page. Accordingly, a user may flip between multiple bookmarked pages by bending said part between multiple bent positions (as exemplary operating of a device of the invention which includes support 420 and a flexible display sheet connected to the support).

Figure 51:
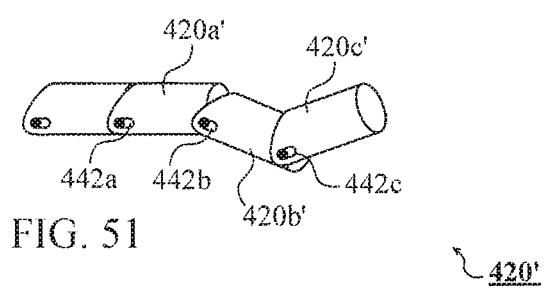
FIGS. 51 and 52 show an embodiment of the invention.
Figure 52:
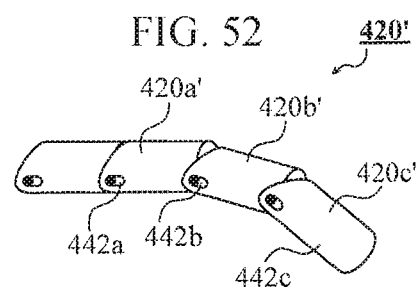

FIGS. 51 and 52 show an embodiment of a support 420' similar to support 420, whereas in support 420' there may be included any number of sensing means (shown and numbered sensors 442a-c as exemplary sensing means) for sensing any relative positions of any of the parts of support 420' (shown and numbered parts 420a', 420b' and 420c'). Sensing relative positions may be for registering input which corresponds to said relative positions (or for prompting operations of a device or flexible display sheet which includes support 420', whereas said operations may correspond to said relative positions). Accordingly, alternatively to the described for FIG. 47, a support of devices (or systems) of the invention may include sensing means for sensing bending of any number of parts of said support relative to other parts, whereas said sensing may be for any extent of bending.

In some embodiments, combinations of positions of different parts of 420', as sensed by sensing means included in support 420' (or connected thereto), may correspond to different inputs which may be registered when said combinations are sensed. For example, in FIG. 51, each of parts 420a', 420b' and 420c' is shown being certain positions, whereas in FIG. 52, parts 420a', 420b' are shown at the same position as shown in FIG. 51, and whereas in FIG. 52, part 420c' is shown at a different position (generally facing upward from the viewpoint of the figures) than shown in FIG. 51 (wherein the part is shown generally facing downward). Following the above, support 420' may be regarded as being in a first state at FIG. 51 and in a second state at FIG. 52, whereas in said first state positions of parts 420a', 420b' and 420c' may form a first combination of positions different than a second combination of positions in said second state of the support (the difference being in the figures, by way of example, part 420c' being at different position in each combination). Accordingly, a first input may be registered by sensing said first combination (e.g. by sensing positions of the parts relative to each other), whereas a second input may be registered by sensing said second combination.

Figure 53:
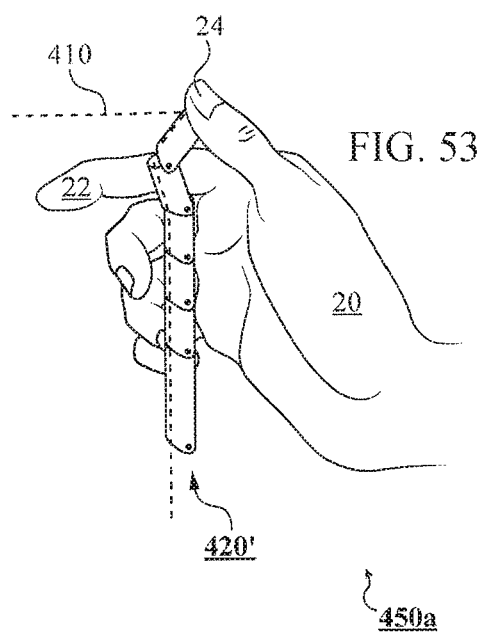
FIGS. 53 through 55 show a method of operating an embodiment of the invention.
Figure 54:
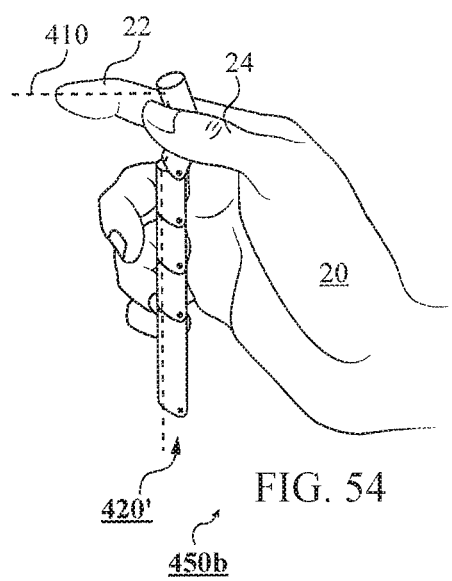
Figure 55:
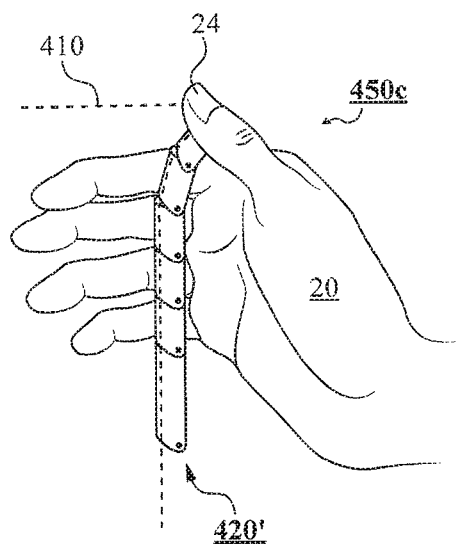

FIGS. 53 through 55 show a hand 20 performing gestures 450a-c, respectively, for bending support 420' (shown connected to sheet 410, see ref. FIGS. 39 through 41) differently in each of FIGS. 53 through 55. For gesture 450a (FIG. 53), finger 22 of hand 20 may be pushing (or otherwise "applying pressure on") sheet 410 from a back side of the sheet, whereas thumb 24 of the hand is pulling a part of support 420' at an end of the support, such that a first combination of positions of parts (relative to each other) may be formed (it is understood that positions of parts of the support may be influenced by bending of sheet 410, such as when force is applied on the sheet, as with finger 22 applying force from said back side of the sheet, for gesture 450a. For gesture 450b (FIG. 54), finger 22 is pushing sheet 410 at a top side (from the point of view of FIGS. 53 through 55) of the sheet, whereas thumb 24 is pulling on support 420' at a location whereat said part at an end of the support is connected to an adjacent part (similarly to the described for bending location in FIGS. 39 through 41), such that a second combination of positions may be formed. For gesture 450c (FIG. 55), thumb 24 is pulling on said part at an end of support 420' (as for gesture 450a), whereas the rest of the fingers of hand 20 are positioned generally at said back side of sheet 410, such that a third combination of positions may be formed. As shown in the figures, each of said first, second and third combination of positions of parts is different (certain parts are at different positions in each combination).

Following the above, in FIG. 53, by hand 20 performing gesture 450a and by sensing positions of parts of support 420' (e.g. by sensors 442a-c as shown in FIGS. 51 and 52, or by sensing means included in sheet 410 for sensing topologic states of sheet 410, whereas it is understood that different positions of parts of the support may influence topologic states of the sheet differently), a first input may be registered, whereas in FIGS. 54 and 55, by hand 20 performing gesture 450b and gesture 450c (and by sensing positions of parts of the support) a second and third inputs, respectively, may be registered. Said first, second and third inputs may be different, as said first, second and third inputs may correspond to the first, second and third combination of positions described in the previous paragraph.

Note that be knowing which gesture correspond to which input (to be registered when performing the gesture), no interface elements need be displayed for indicating where to bend flexible display sheets or supports included therein or connected thereto. Accordingly, a user may become used to performing gestures for certain interactions so that displaying interface elements corresponding to bending locations is not required.

Figure 56:
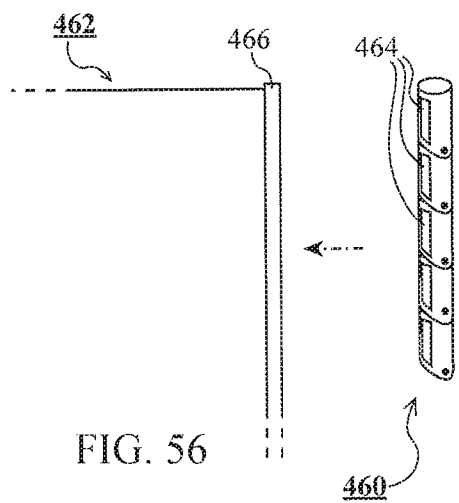
FIG. 56 shows an embodiment of the invention.

FIG. 56 shows an embodiment of the invention as a support 460 which can be connected to flexible display sheets. Support 460 is shown in the figure including connection means 464 which may facilitate a connection between the support and a flexible display sheet, or plurality thereof.

FIG. 56 further shows an embodiment of the invention as a flexible display sheet 462 similar to other flexible display sheets, or flexible display devices, described herein. Flexible display sheet 462 can be connected to supports (supports as described herein). In the figure, flexible display sheet 462 is shown connection means 466 which may facilitate a connection between the flexible display sheet and a support (or plurality thereof).

Following the above, any or both of connection means 464 of support 460 and connection means 466 of flexible display sheet 462 may facilitate a connection between support 460 and flexible display sheet 462 (suggested connecting direction illustrated by dashed-dotted arrow).

FIG. 57 shows a section of another embodiment of the invention as a flexible display device 470 which includes a flexible display sheet 472 (illustrated by dashed lines to facilitate depicting elements inside the sheet). Flexible display sheet 472 (or simply "sheet") can be bent horizontally at several specific bending locations and can be bent vertically at several specific bending locations.

In FIG. 57, there is shown inside sheet 472 a plurality of a support 474. Each support is shown to include tilters 476a,b for facilitating bending sheet 472 vertically, whereas the sheet may be bent at locations between parts of the plurality of supports and tilters. Accordingly, each of the plurality of support 474 can serve as a specific vertical bending location (numbered a bending location 478 at which the sheet is shown to be vertically bent, as a location corresponding to the location of support 474 as numbered in the figure. Further accordingly, locations whereat parts of the plurality of supports and tilters are connected may serve as location whereat sheet 472 may be bent horizontally.

In some embodiments, input may be registered from sensing horizontal and/or vertical curves of sheet 472. For example, as specifically shown in FIG. 58 (wherein sheet 472 is illustrated by continuous lines and internal elements of the sheet are obscured), interface element 350b (see ref. FIG. 34) may be displayed near the top side of sheet 472 whereas interface element 350c (also see FIG. 34) may be displayed near the right side of the sheet. Interface element 350b may be interacted with by bending the sheet vertically from a location where it is displayed, whereas Interface element 350c may be interacted with by bending the sheet horizontally from a location where it is displayed. Sheet 472 is shown in FIG. 58 bent vertically from a bending location 472b of sheet 472 (which corresponds to interface element 350b) and bent horizontally from a bending location 472c (which corresponds to interface element 350c). Following the above, an interface of device 470 may utilize horizontal and vertical bending for registering specific input associated with each axis of bending and/or with combination of bending at different axes.

FIG. 59 shows another embodiment of the invention as a flexible display device 470' (or simply "device") similar to device 470. Device 470 generally includes flexible display sheet 472 inside which are supports (numbered supports 484a-c) which support the sheet and influence the shape of the sheet, and optionally facilitate horizontal bending of the sheet.

In some embodiments, device 470 may further include inside sheet 472 operation components 488 which may be any number of components essential for operations of device 470. As shown in FIG. 59, operation components may include a processor 488a, a memory unit 488b, a power source 488c and a communication unit 488d. The operation components, in some embodiments, may be non-flexible components which may be located inside sheet 472. Thy operation components may be located between the supports inside sheet 472 (shown in the figure located between supports 484a,b and 484b,c. Because corresponding parts of the supports may be of the same length, the supports can bend from bending locations where said corresponding parts are connected to other parts, whereas sections of the sheet covering said parts (shown sections 472a,b covering parts of the supports between which operation components are located) remain straight (i.e. do not bend where the operation components are located). As shown in the figure, parts of supports between which are non-flexible operation components may have the same length or any length larger than the lengths of the non-flexible operation components.

In some embodiments, as shown in FIG. 59, operation components may be connected to each other by flexible connections (e.g. conductive wires), as numbered flexible connection 486 in the figure.

Note that whereas the described for and shown in FIG. 59 is for horizontal bending, flexible display device of the invention may similarly, and additionally or alternatively, have vertical bending features, optionally still including non-flexible components inside a flexible display sheet.

FIG. 60 shows yet another embodiment of the invention as a flexible display device 480 (or simply "device") generally including a flexible display sheet 482 (or simply "sheet") connected to or including a frame 484. Frame 484 may provide support for sheet 482 and may have influence on the shape (or topologic state) of the sheet, similarly to supports described herein, whereas alternatively to supports described herein, frame 484 may provide support and influence both horizontally and vertically (or otherwise in more than one axis).

In some embodiments, frame 484 may be located inside sheet 482 (the sheet illustrated by dashed lines for depicting the frame inside the sheet). Frame 484 is exemplarily shown made of connected parts which can be aligned or bent relative to each other. The frame can sense bending of its parts by any means known in the art, for registering input associated with topology of sheet 482 corresponding to the bending. In the figure there is shown frame 484, and accordingly sheet 482, bent for a location 486, which may be formed by a couple of parts from the upper section and a couple of parts from the right section of frame 484 bent from their aligned positions with the rest of the parts of the upper and right sections of the frame.

FIG. 61 shows an embodiment of the invention as a flexible display device 490 (or simply "device") in a folded state. In FIG. 61 there is shown a flexible display sheet 492 (or simply "sheet") of device 490 folded several times and displaying visuals 498 at an exposed section facing outward. Further shown in the figure is sheet 492 connected to supports 494a,b. Visuals displayed on the aforementioned exposed section of sheet 492 may fit the size of said exposed section by sensing the folded topology of the sheet by any means known in the art. In the figure there is further shown exemplary interface elements (not numbered) displayed near bending locations of support 494b. When the device is in a folded state, as shown in the figure, interface elements may still be displayed correspondingly to bending locations, and the sheet and supports can still be bent (suggested bending directions illustrated by curved dashed-dotted arrows) for interacting with the interface elements or otherwise for registering corresponding input. This may be beneficial for operating or interacting with device 490 when the device is in a more compact form (also "state") than when sheet 492 is fully "spread out", or otherwise straightened.

Figure 62:
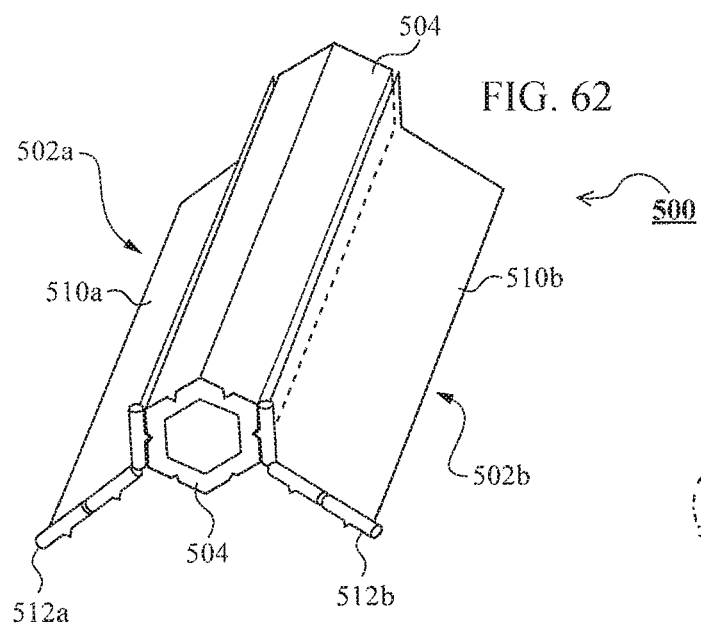
FIG. 62 shows an embodiment of the invention.

FIG. 62 shows an embodiment of the invention as a device 500 generally including a section 504 and flexible display sheets 510a,b (or simply "sheets") optionally connected to supports 512a,b, respectively. In some embodiments, sheet 510a and optionally support 512a may form a flexible display unit 502a, whereas sheet 510b and optionally support 512b may form a flexible display unit 502b. Flexible display units 502a,b may be operated separately (e.g. as physically detached) from section 504, such as by being individual flexible display devices including all elements necessary for being operated independently from the section (it is understood that unit 502a may be operated separately from unit 502b, in addition to being separated from section 504, whereas unit 502b may similarly be operated separately from unit 502a). In such embodiments of device 500, units 502a,b may be temporarily connected to section 504 (as shown in FIG. 62). In other embodiments, sheets 510a,b, optionally as connected to supports 512a,b, may be permanently installed on or connected to section 504.

In some embodiments, sheets 510a,b, and optionally supports 512a,b, may be rolled on and off section 504, whereas sections of the sheets and/or parts of the supports may be connected to and disconnected from sides of section 504 while attached to said sides. Accordingly, a device (or system) of the invention may include any number of flexible display sheets (each of said flexible display sheets optionally connected to any number of supports), whereas in some embodiments, flexible display sheets, and optionally supports connected to or included in said flexible display sheets, may be connected to any number of other sections of said device. Specifically, any number of sections of said flexible display sheets, and optionally any number of parts of said supports (preferably parts corresponding to said sections) may be connected to any number of sides of said any number of other sections.

FIGS. 63 through 66 show cross-sections of variations of device 500. Note that whereas the shown in the figures and the described in the following paragraphs (regarding FIGS. 63 through 66) relates to supports (in addition to other sections of said variations of device 500), it is made clear that each support may be connected to a flexible display sheet. Further note that similarly to the shown in the figures and the described in the following paragraphs, similar supports may be included inside flexible display sheets. Further note that the described in the following paragraphs for repositioning or tilting of parts of supports may refer to corresponding sections of a flexible display sheet connected to said supports or including said supports. Further yet, note that in the figures there are shown connection units of parts of support 522 (illustrated as triangular protrusions) and of sides of section 524 (illustrated as triangular indentations), any of which may facilitate connection between the support and the section, or specifically between parts of the support and sides of the section.

Figure 63:
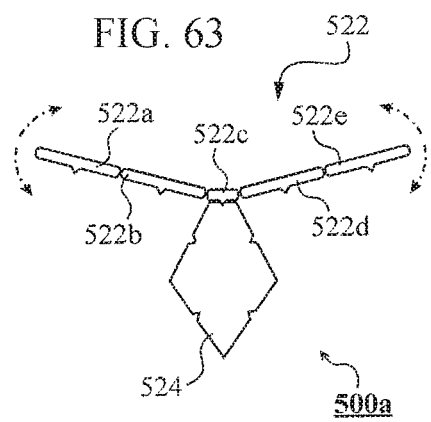
FIGS. 63 through 66 show similar embodiments of the invention.

In FIG. 63 there is shown a device 500a wherein a section 524 may be connected to and disconnected from a support 522. Support 522 may be connected to the section at a part 522c (i.e. part 522c is connected to a side of the section, for connecting support 522 to the section). Part 522c may be than the rest of the parts of the support (shown parts 522a,b and 522d,e), which may be spread-out similarly to a couple of opposite pages (also "spread") of an open book. For example, parts 522a,b may be aligned relative to each other, for straightening a section of a flexible display sheet (e.g. sheet 510a) connected to support 522, whereas parts 522d,e may be aligned, for straightening a different section of said flexible display sheet.

In some embodiments, the state of support 522 as shown in FIG. 63 may be locked, for maintaining the state, and accordingly maintaining the relative positions of the parts of the support, and further accordingly maintaining the shape of a flexible display sheet connected to the support. When the state shown in FIG. 63 is not locked, the support may be wrapped (or "rolled") around section 524 by attaching (and optionally connecting) parts 522a,b and 522d,e to sides of the section.

In some embodiments, or specifically states thereof, parts 522a,b may be aligned relative to each other (e.g. automatically or by a user), whereas the alignment between the parts may be locked (in accordance with the described for locking means), so that the parts temporarily cannot be repositioned relative to each other. Parts 522d,e may similarly be aligned and locked (such that the angle between them cannot be changed). Optionally, the positions (or specifically angle) of both parts 522a,b (as aligned and locked) and both parts 522d,e (as aligned and locked) may be changed relative to part 522c. In such cases (such embodiments or states of some embodiments), parts 522a,b (together) and parts 522d,e (together) may be tilted (suggested tilting directions illustrated by curved dashed-dotted arrows) relative to part 522c and accordingly relative to section 524, for convenience adjustment (e.g. by a user setting the best positions for the parts) and/or for registering input, similarly to the described for pushing and pulling flexible display sheets and/or supports connected to said flexible display sheets in device 240 shown in FIG. 21. For example, a flexible display sheet connected to support 522 of device 500a may display a video clip on one of its sections that is directly connected to parts 522a,b, whereas the parts may be tilted (or otherwise bent relative to part 522c) to one direction for fast-forwarding said video clip, and tilted to a generally opposite direction for pausing the playing of said video clip, whereas said one of the sections of said flexible display sheet (on which said video clip is displayed) may be repositions in accordance with the tilting of parts 522a,b, such as by bending relative to other sections of said flexible display sheet.

Following the above, any bending (or "tilting") of a support, in some variations of device 500, and/or any bending of a flexible display sheet (which may be connected to a support or otherwise), may be utilized for registering input. Bending may be performed on parts of said support and/or on sections of said flexible display sheet, for bending said parts or said sections relative to other parts or section.

Figure 64:
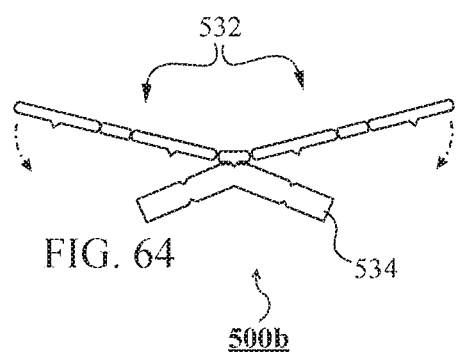

In FIG. 64 there is shown a device 500b including a section 534 and a support 532 (the support preferably connected to a flexible display sheet). The support is shown generally spread-out and straightened, except for a slight angle between a right section and a left section of the support, from the point of view of the figure (shown three parts in said right section and similar three parts in said left section). Parts of the support may be rolled on sides of section 534 (suggested rolling directions illustrated by curved dashed-dotted arrows) such that said parts fit on said sides, and optionally connect to said sides when settling on them. The shape of section 534, as shown in FIG. 64, may facilitate a compact state of device 500b, when parts of support 532 are rolled on it.

Figure 65:
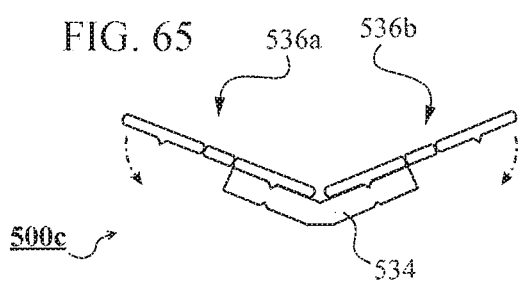

In FIG. 65 there is shown a device 500c including section 534 (as shown in FIG. 64) and supports 536a,b, both of which may be connected to section 534, alternatively to support 532 shown in FIG. 64 (note that in some embodiments, section 534 may connected to support 532 for a first state of said embodiments, whereas the section may be connected to supports 536a,b for a second state, so that accordingly support 532 and supports 536a,b may be switched). Optionally, different combinations of any number of supports and other sections may be facilitated, for different states of some embodiments (each combination of supports connected to section may correspond to a state). Switching between different combinations may be beneficial for several features. For example, a section of a device of the invention may store information that can be displayed on flexible display sheets, and/or may include element which are not included in some flexible display sheets, such as a large power source, an efficient processor and/or a certain firmware. Said section may "run" an interface which can be displayed on a flexible display sheet. Said interface may be displayed and interacted with by a single flexible display sheet or a couple of flexible display sheets. Accordingly, a user may own a single flexible display sheet (which may include a support) and interact with said interface running on said section (e.g. by hardware and software included in said section) by connecting said single flexible display sheet to said section (e.g. by connecting a part of a support, which may be connected to said single flexible display sheet, to a side of said section), whereas said user may purchase a second flexible display sheet and connect it to said section together with said single flexible display sheet, for interacting with said interface by utilizing two flexible display sheets. Note that multiple flexible display sheets may be connected to a section and may display visuals separately and/or collaboratively (e.g. by being connected "side-by-side" for a single combined display surface).

Figure 66:
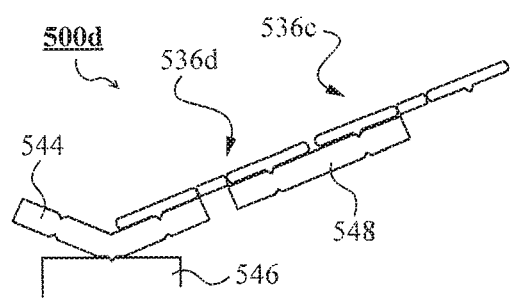

In FIG. 66 there is shown a device 500d including a combination of supports (as described herein, preferably connected to any number of flexible display sheets). Specifically, there are shown supports 536c,d which can connect to a section 548 (shown as connected in the figure). Section 548 essentially connects supports 536c,d to each other when the supports are both connected to the section. Any of supports 536c,d can further connect to a section 544 (shown as connected in the figure). Specifically, any number of parts of any of supports may be connected to any of sections 548 and 544, simultaneously or otherwise. In some embodiments, section 544 may connect to a device 546 (e.g. a computer). This may be beneficial in case support 536d cannot directly connect to device 546, in which case section 544 may be utilized for facilitating an indirect connection of the support (and preferably a flexible display sheet connect to or including the support) and device 546.

Figure 67:
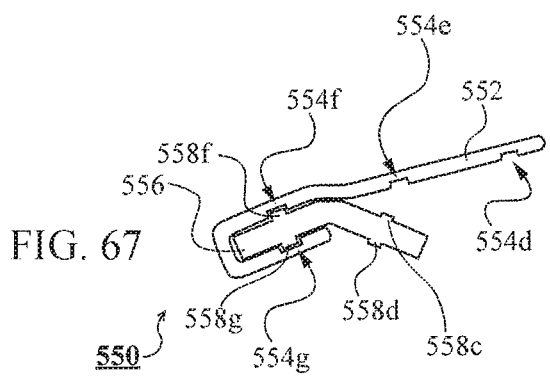
FIG. 67 shows a cross-section of an embodiment of the invention.

FIG. 67 shows a cross-section (similarly to the shown in FIGS. 63 through 66) of another embodiment of the invention as a device 550 which generally includes a flexible display sheet 552 (or simply "sheet"), as described herein for flexible display sheets, and a section 556 similar to section 534. Preferably, sheet 552 may be directly connected to and disconnected from section 556.

In some embodiments, section 556 may include any number of connection units which may facilitate a connection between the section and sheet 552, whereas additionally or alternatively, sheet 552 may include any number of connection units which may facilitate such a connection. In FIG. 67, by way of example, there is shown section 556 including connectors 554d-g (illustrated as rectangular protrusions), any of which may connect to any of connectors 558d-g (illustrated as rectangular indentations) shown included in sheet 552 (in the figure, connectors 554f,g shown connected to connectors 558f,g (by said rectangular protrusions fitting into said rectangular indentation).

Figure 68:
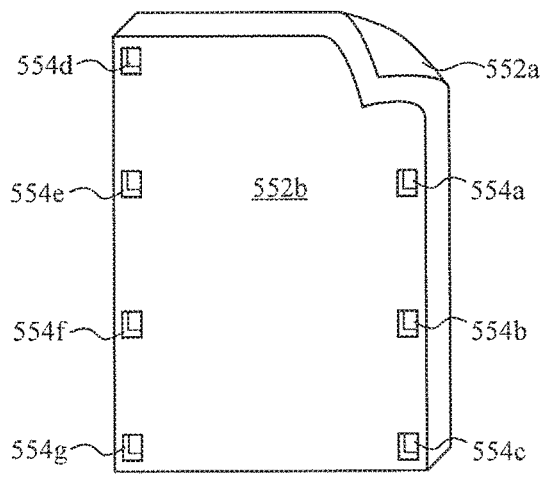
FIGS. 68 and 69 show an embodiment of the invention.

FIG. 68 shows sheet 552 from a perspective point of view. As shown in FIG. 67, sheet 552 is shown in FIG. 68 including connectors 554d-g on a back side 552b, which is opposite to a front side 552a on which visuals can be displayed (front side 552a revealed to the point of view of FIG. 68 by a curve at the upper right corner of sheet 552). Sheet 552 is further shown including connectors 554a-c located generally opposite to connectors 554e-g. Connectors 554a-g are exemplarily shown as sockets, into which plugs can be inserted, for connecting sheet 552 to other devices or to other modular components or elements of a flexible display device of the invention. This may be an alternative to the described herein for connecting display sheets to bases by utilizing parts of supports.

Figure 69:
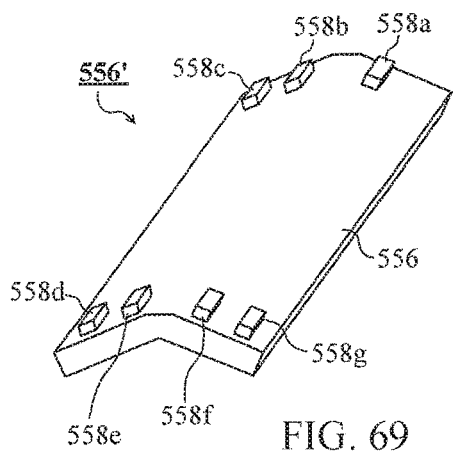

FIG. 69 shows a perspective view of a section 556' similar to section 556 shown in FIG. 67. Section 556' is shown in FIG. 69 including connectors 558a-g, which may facilitate connection of sheet 552 to the section, such as by connectors 554a-g of the sheet connecting to connectors 558a-g, respectively, or section 556'.

Figure 70:
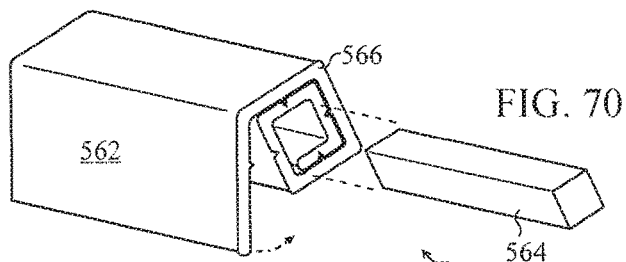
FIG. 70 shows an embodiment of the invention.

FIG. 70 shows an embodiment of the invention as a device 560 which may include a flexible display sheet 562 (or simply "sheet") and a section 564. In FIG. 70, sheet 562 is shown connected to (or otherwise including) a support 566 which is shown as a continuous item, not made up of parts. As per the patent references previously mentioned, a support of a device of the invention may be any elongated element which has a dynamic and controllable shape (i.e. the shape of which may be manipulated, by operations of said device and/or by a user of said device). Sheet 562 is shown generally "rolled-up" separately from section 564 (suggested "rolling-up" direction illustrated by a curved dashed-dotted arrow). Accordingly, sheet 562 can be "rolled-up" in on itself without utilizing section 564.

In some embodiments, a "rolled-up" state of sheet 562 may be facilitated and/or maintained by the sheet including or being connected to a support (as described herein for supports). Additionally or alternatively, a "rolled-up" state of the sheet may be facilitated and/or maintained by the sheet including connection units which facilitate connections between different sections of the sheet (suggested connection units illustrated in FIG. 70 as triangular protrusions and indentations). In device 560, sheet 562 can be connected to section 564 by slipping on the section similarly to a sleeve slipping on an art, or otherwise by section 564 being inserted into a cavity formed by the "rolled-up" shape of the sheet (suggested insertion direction illustrated by dashed lines).

FIG. 71 shows another embodiment of the invention as a device 570 which is shown generally including a flexible display sheet 572 (or simply "sheet") and a section 574 which is shown having a general cylindrical shape, so along the length of the section there are no sides (along the length there is a round curve). Accordingly and alternatively to the shown for other sections of devices of the invention, and to the described for flexible display sheets being rolled on said other sections, sheet 572 may be rolled on a curve of section 574, rather than sections of a flexible display sheet settling on corresponding sides of a section (i.e. on an item of a device of the invention which is not included in said flexible display sheet) when said flexible display sheet is rolled on said section.

Note that in FIG. 71 there are shown connection units 576a,b of section 574 which are located along the curve of the section (rather than on sides of the section), whereas sheet 572 is shown having connection units 578a,b, so that any of connection units 576a,b and 578a,b may facilitate connecting sheet 572 to section 574.

In some embodiments, as shown in FIG. 71, device 570 may include (additionally to the described above) a section 580 which may cover (or "encase") sheet 572 when the sheet is "rolled-up". Preferably, when the sheet is rolled on section 574, a display surface 572a of the sheet is facing outward (the display surface shown as opposite to a back surface 572b facing inward), facilitating displaying and viewing visuals while the sheet is "rolled-up". In some cases, it may be desirable to protect display surface 572a, and so section 580 may be utilized to cover the display surface (such as to prevent scratches of the display surface when device 570 is carried). Note that whereas section 580 is shown having a general tube shape, it is made clear that the section may have any shape which facilitates covering any section of (or all of) sheet 572 when the sheet is rolled on section 574. Further note that section 580 and/or sheet 572 may include any number of connection means for facilitating a connection between the section and the sheet (in the figure, sheet 572 is shown including a connector 582a, whereas section 580 is shown including a connector 582b, as exemplary connection means of device 570 for connecting the sheet to the section).

In some embodiments, section 580, or any section thereof, may be transparent (to any extent), so as to expose sheet 572, or any section thereof, to viewing, while the section covers the sheet. Accordingly, while the section covers the sheet, display surface 572a (which is preferably facing outward), or any section thereof may be visible.

In some embodiments, section 580 may include a light source 584 for illuminating display surface 572a when sheet 720 is inside the section, such as to facilitate viewing of visuals displayed on the display surface, specifically in low light conditions.

Figure 72:
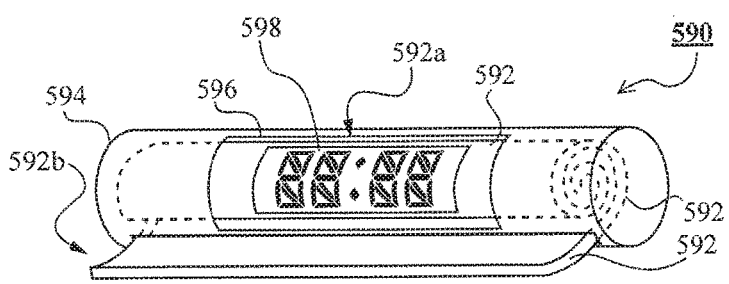
FIG. 72 shows an embodiment of the invention.

FIG. 72 shows another embodiment of a device of the invention as a device 590 generally including a flexible display sheet 592 (or simply "sheet") which can be rolled in and out of a cover 594. Similarly to the described for section 580, or any section thereof, being transparent, cover 594 is shown having an aperture 596 (which may be any transparent section of the cover) through which a section 592a of sheet 592 is visible. Section 592a may be any section of the sheet which is directly facing the aperture when the sheet is rolled inside cover 594. Preferably, section 592a can display visuals 598 (illustrated as a digital clock) so that sheet 592 (or specifically the section thereof) may be utilized for displaying visuals even when rolled inside cover 594. Note that it is made clear that visuals may be displayed on other sections of sheet 592, such as on sections of the sheet which are rolled out of cover 594 (shown in FIG. 72 section 592b of the sheet rolled out of the cover).

FIGS. 73 through 76 shows a front view an embodiment of the invention as a flexible display device 600 (or simply "device") including a flexible display sheet 602 (or simply "sheet"). Interacting with or operating device 600 may be by folding, or bending to a large extent, sheet 602, whereas folding or bending of sheet 602 (or otherwise topologic states, or changes thereof, of the sheet) may be sensed by any means known in the art, such as per referenced in previously mentioned US patents.

In FIGS. 73 through 76 there are shown interface elements 604a-c (similar to previously described interface elements) displayed on sheet 602. Each of interface elements 604a-c may visually represent an operation, function or command of an interface or program, whereas said operation, function or command may be performed on other elements of said interface or program (or on objects of said interface or program which correspond to said other elements). For example, interface element 604a may represent a selection-tool (which may correspond to performing a selection command in an interface), whereas interface element 604b may represent a drawing-tool (optionally corresponding to executing a drawing function), and whereas interface element 604c may represent a compression-tool (optionally corresponding to a compression operation).

Figure 73:
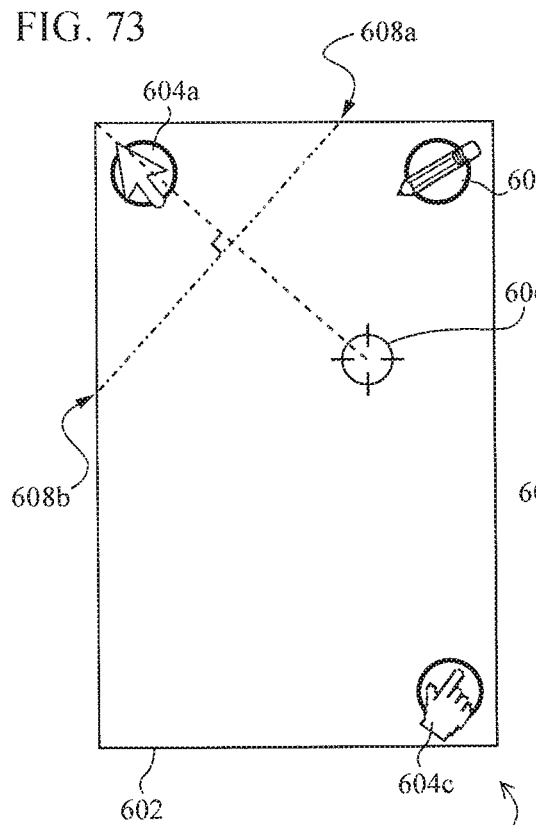
Figure 74:
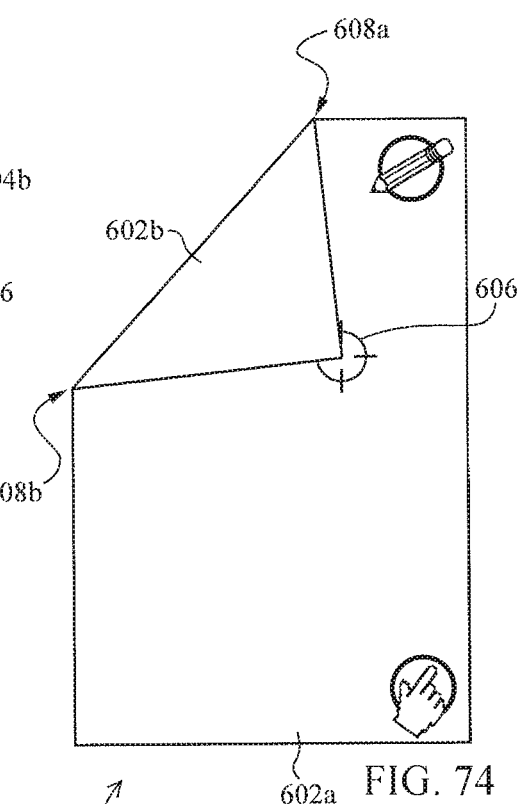

In FIG. 73, interface elements 604a-c are shown displayed near corners of sheet 602 so that each interface element may corresponds to a different corner of the sheet. Further shown displayed on the sheet is an object 606 which may represent any interface or program element, such as a file or an application. Any operations, functions and command represented by interface elements 604a-c may be applied to or performed on said any interface or program element represented by object 606, by folding (or extensively bending) a corner (or plurality thereof) of sheet 602 (a corner corresponding to any of the interface elements displayed near it), on a location where the object is displayed. By sensing said folding (similarly to the described for sensing bending), input may be registered which is associated with (or "corresponding to") said any of the interface elements and with object 606. For example, as shown in FIGS. 73 and 74, the upper left corner of sheet 602 (from the viewpoint of the figures) near which interface element 604a is displayed, can be folded on the location where object 606 is displayed, by folding the sheet from folding locations 608a,b. Geometrically, there is only one couple of folding locations for folding the upper left corner on the location where object 606 is displayed. The line connecting the folding locations (illustrated by a dashed-dotted line in FIG. 73), as the only line passing through the folding locations, is the line whereat sheet 602 is to be folded, and is the line crossing the line which connects the upper left corner and the location where object 606 is displayed (illustrated by a dashed line), at an angle of ninety degrees. In FIG. 74 there is shown the upper left corner (which may correspond to interface element 604a, obscured in FIG. 74 by the folding) folded on the location where object 606 is displayed on sheet 602. Notice that in FIG. 74 there is numbered a front surface 602a of sheet 602, on which visuals may be displayed, and a back surface 602b (visible in FIG. 74 by the folding) opposite to the front surface. Because there is only one manner to fold any corner of sheet 602 on any one location on the sheet (i.e. there is only one folded topology of sheet 602 formed by the folding (in accordance with the described for only one line connecting folding locations and with the described for only one line connecting a corner with a location on sheet 602), specific input may be registered by sensing specific folding of the sheet (i.e. folding performed from any corner of the sheet to any location on the sheet), and by deducing which manner the sheet is folded by (or otherwise by sensing the topology of the sheet caused by the folding). Said specific input may correspond to the folded corner and to the location on the sheet where the corner is folded to, and/or to interface elements or objects displayed at (or "near") the folded corner and at said location of the sheet. For example, folding the upper left corner (which is suggested to correspond to interface element 604a (which may represent a selection command)) on object 606 may be sensed for knowing how sheet 602 is folded, for registering input corresponding to the interface element and to the object, such as for facilitating prompting an operation of device 600 which corresponds to the interface element and to the object (e.g. performing selection of the object in an interface of device 600 displayed on sheet 602).

Figure 75:
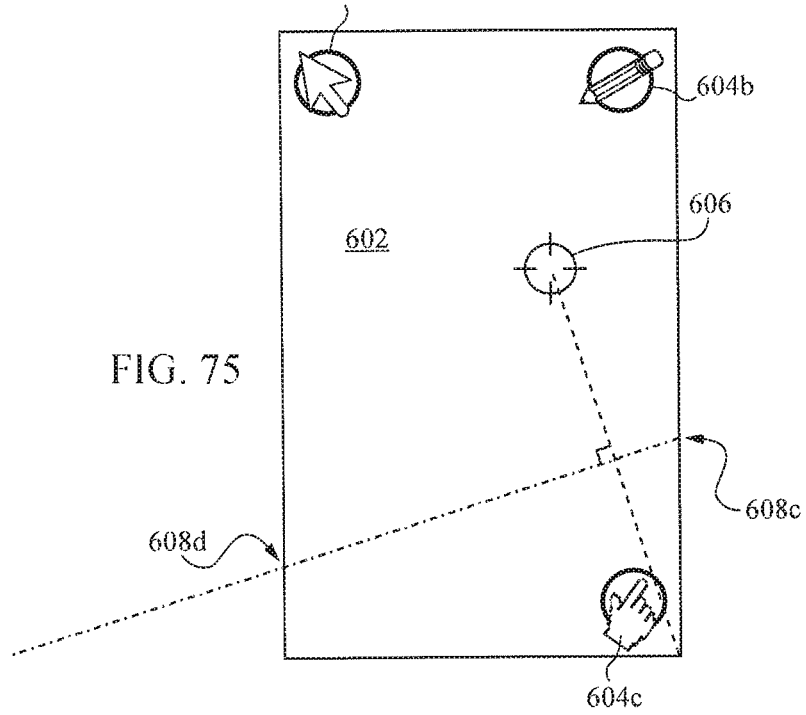

In FIGS. 75 and 76, for another example, there are shown folding locations 608c,d for folding the bottom right corner of sheet 602 on the location where object 606 is displayed. Illustrated in FIG. 75 as connecting the folding locations is a dashed-dotted line which crosses the line connecting the bottom right corner of the sheet with the location where the object is displayed, at a ninety degrees angle (and also at its middle point). In FIG. 76 there is shown the resulted topology of sheet 602 when the bottom right corner of the sheet is folded on the location where the object is displayed. Accordingly, by sensing the specific topology shown in FIG. 76, an operation represented by interface element 604c (which may correspond to the bottom right corner) may be applied to or performed on object 606.

Note that after any folding of sheet 602 is stopped, the sheet may snap-back to a default topology, preferably straight (i.e. unfolded or flat) state. Then, further interactions may be performed, specifically (but not limited to) by other folding actions.

FIG. 77 shows sheet 602 of device 600 displaying different visuals, such as a different interface than an interface which includes interface elements 604a-c and object 606 (as shown in FIGS. 73 through 76). Said visuals may include interface element 614a-d distributed generally along the upper side of sheet 602, so that each of the interface elements may correspond to a location on said upper side (such as the location that interface element is closest to). Each of include interface element 614a-d, similarly to the described for interface elements 614*a-c*, may represent a function of an interface. For example, interface element 614*b* may be a graphic symbol representing closing a "window" in a "windows" interface (as known in the art for operating systems), whereas interface element 614*d* may represent a "minimize" function in said "windows" interface.

In FIG. 77 there is further shown an object 616, similar to object 606, displayed on sheet 602. Object 616 may be, by way of example, a "window" in a "windows" interface, specifically a "window" of an application loaded in said interface and being displayed on sheet 602. Similarly to the described above, locations on the upper side of the sheet, which may correspond to interface elements 614*a-d*, may be folded on the location where object 616 is displayed, for registering input that is associated with the interface elements and with the object. Specifically shown in FIG. 77 are folding locations 608*e,f*, from which sheet 602 is to be folded for interface element 614*b* to be folded specifically on object 616 (the folding locations may be determined by a first line connecting the interface element and the object (illustrated as dashed) and by a second line crossing said first line in the middle of said first line, and in a ninety degrees angle.

FIG. 78 shows device 600 such that the location where interface element 614*b* (illustrated by dashed lines) is displayed on sheet 602 is folded generally on the center of object 616 (as the object is displayed on the sheet) such as for registering input corresponding to the state of the device shown in the figure, or corresponding to the topologic state of sheet 602 as shown in the figure. For example, in case interface element 614*b* represents a "closing" function, when the location where the interface element is folded object 616, an application represented by the object may then closed. Executing the closing function may be prompted by input registered from detecting the locations from which sheet 602 is folded in FIG. 77, or from detecting the folding line at which the sheet is folded, or from detecting the topology of the sheet after the folding.

Figure 79:
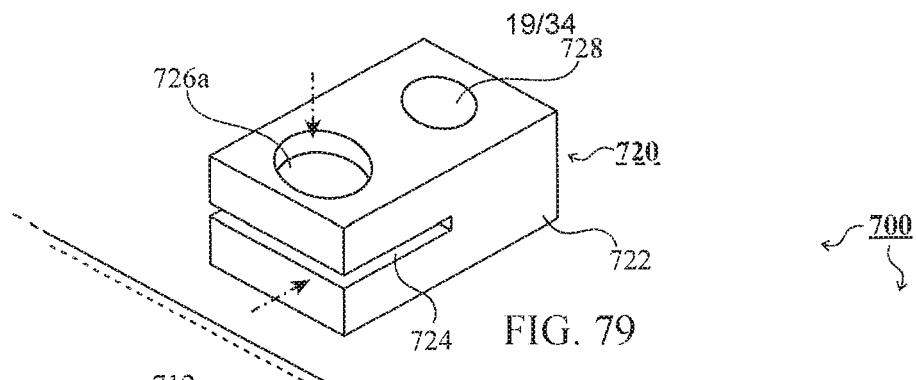
FIGS. 79 and 80 show an embodiment of the invention.
Figure 80:
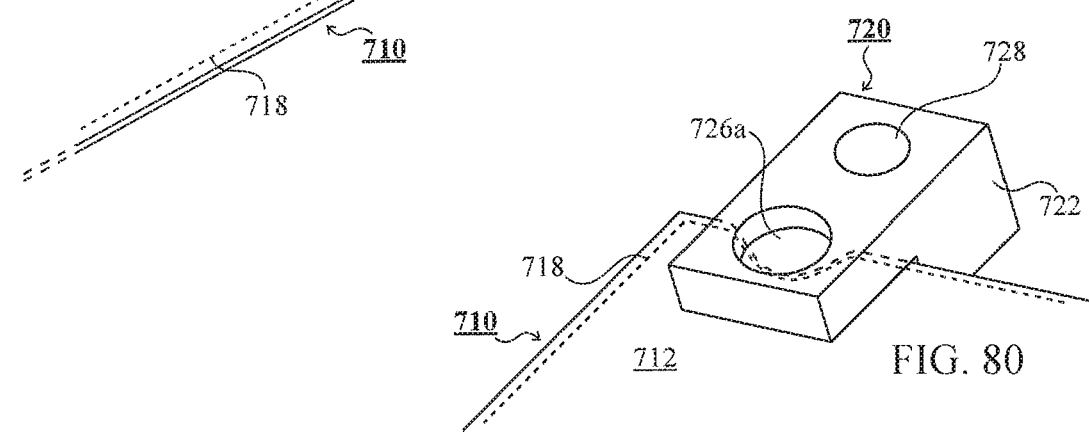

FIGS. 79 and 80 show (from two different perspective views) an embodiment of the invention as a device 700 which is shown generally including a flexible display sheet 710 (or simply "sheet") and a unit 720. Sheet 710 may include a display surface 712, on which visuals may be displayed, and bending sensing means 718 (illustrated by dashed lines) which facilitate sensing any topologic states of sheet 710, such as topologic states formed by bending. Section 720 may include a body 722 having a cavity 724, and may include controls 726*a,b* (see control 726*b* shown in a cross-section view of device 700 FIGS. 81 through 84, as it is obscured from the points of view of FIGS. 79 and 80).

In some embodiments, sheet 710, specifically a section thereof, may fit into cavity 724 of unit 720, as shown in FIG. 79 the sheet ready to be inserted into the cavity (suggested direction illustrated by dashed-dotted arrow extending from the sheet), and as shown in FIG. 80 a section of the sheet occupying cavity 724 (the end of said section is illustrated by dashed lines, suggesting it is inside the cavity). In other words, cavity 724 may accommodate a section of sheet 710 which can be inserted into the cavity.

In some embodiments, operating control 726*a* when a section of sheet 710 is inside cavity 724 may be for bending said section of the sheet (illustrated curve of said section in FIG. 80, preferably formed by operating control 726*a*). In FIG. 79 there is illustrated a dashed-dotted arrow toward control 726*a*, suggesting manner of operating the control (by way of example), such as pushing the control in case the control is a button or a key. However, it is made clear that control 726*a* may be operated in other manner, such as rotated in case the control is a knob or a handle. It is further made clear that operating control 726*a* may prompt any operation or reaction of unit 720, or specifically of a part or component thereof, which facilitates bending of a section of sheet 710 which occupies cavity 724.

Similarly to the described above for bending flexible display sheets included in devices of the invention, for registering input or for prompting operations of said devices, bending of a section of sheet 710 which is inside (or "which occupies") cavity 724 may be sensed and registered as input, or may be sensed for prompting an operation of device 700, such as displaying of certain visuals on display surface 712 of sheet 710.

In some embodiments, bending of a section of sheet 710 which is inside cavity 724 may be facilitated by mechanical means without requiring any electronic means or other types of means known in the art (as demonstrated for FIGS. 81 through 84 bending facilitated by mechanical means. In other embodiments, electronic means may be utilized for facilitating bending of the aforementioned cavity.

In some embodiments, unit 720 of device 700 may include output means 728 which can produce (or "generate") any output which is related to operations of device 700. For example, output means 728 may include a light-emitting-diode (LED) for generating visual output related to operations of device 700, such as for specifically emitting a red colored light for indicating no flexible display sheet is occupying cavity 724 of unit 720, and such as for specifically emitting a green colored light for indicating a section of a flexible display sheet (e.g. sheet 710) is accommodated inside cavity 724.

FIGS. 81 through 84 show, from a cross-section point of view, an exemplary operation of control 726*a* which facilitates bending of a section of sheet 710 which occupies cavity 724 (each figure may represent a step in said exemplary operation). Note that from the cross-section point of view there is shown control 726*b* opposite to control 726*a*, whereas control 726*b* may be operated similarly to the described herein for control 726*a*, and whereas operating control 726*b* may be for bending a section of sheet 710 (which is inside cavity 724) in a different (preferably opposite) direction. Further shown from the cross-section point of view are plates 730*a,b* at opposite sides, generally near cavity 724 (it is understood that in FIGS. 79 and 80 the plates are obscured from the point of view).

Figure 81:
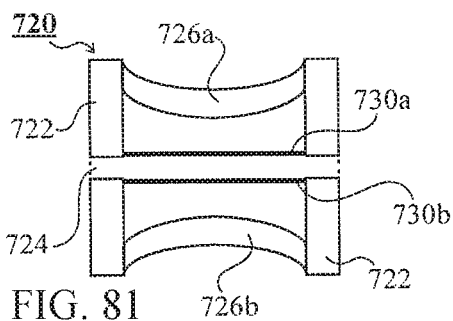
FIGS. 81 through 84 show a cross section of the embodiment shown in FIGS. 79 and 80.

In FIG. 81 there is shown cavity 724 of unit 720 not occupying any section of sheet 710 (i.e. the cavity is empty).

Figure 82:
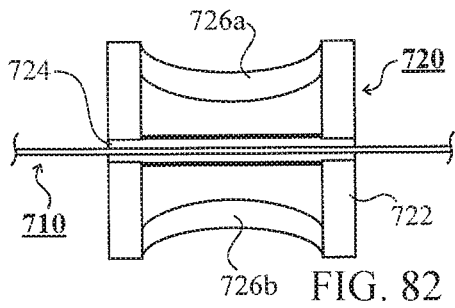

In FIG. 82 there is shown cavity 724 accommodating a section of sheet 710, or in other words there is shown said section of sheet 710 occupying cavity 724. Accordingly, said section may have been inserted into the cavity.

Figure 83:
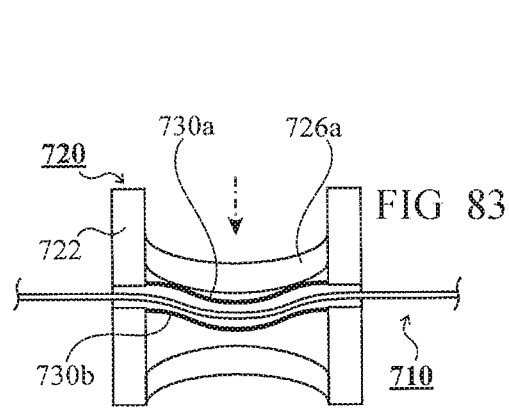

In FIG. 83 there is shown control 726*a* being operated, specifically pushed into unit 720 (as exemplary operation performed on the control), as suggested by illustrated dashed-dotted arrow in the figure. Operating the control may consequently cause plates 730*a,b* to bend, whereas the plates may influence the section of sheet 710 which is inside cavity 724 such that it also bends.

Figure 84:
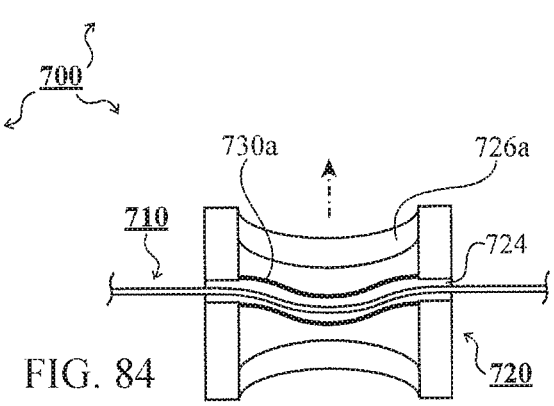

In some embodiments, stopping operating control 726*a*, specifically releasing pushing pressure applied on the control (in embodiments wherein operating control 726*a* is by pushing the control) may cause the section of sheet 710 which is inside cavity 724 to straighten, such as in case no pressure applied to said section is removed. In other embodiments, as shown in FIG. 84, the section of sheet 710 which is inside cavity 724 remains bent even if operation of control 726a is stopped. In FIG. 84 there is shown control 726a not being operated, whereas plates 730a,b are shown bent, preferably as a consequence of previously operating the control (see FIG. 83). Accordingly, by plates 730a,b remaining bent after control 726 is operated, an influence on the section of sheet 710 which is inside cavity 724 for bending said section is maintained. Straightening plates 730a,b may be facilitated by other actions or operations than stopping operating control 726a.

Note that in FIG. 84 there is illustrated dashed-dotted arrow, suggesting direction of movement of control 726a when stopping operating the control, by way of example, such as in case operating control 726a is by pushing it in an opposite direction.

Further note that whereas the described for device 700 is a control 726a (and optionally a control 726b) included in unit 720, which may be operated to facilitate bending of a section of sheet 710 which is inside cavity 724 of unit 720, it is made clear that bending of said section may be facilitated by other actions or operations which may, in some embodiments, negate the need for control 726a. For example, in some embodiments, unit 720 itself may be operated for facilitating bending of a section of sheet 710 which is inside cavity 724 of unit 720, such as by twisting unit 720.

Further note that unit 720 may be regarded itself as a device of the invention, not necessarily included in device which includes a flexible display sheet (e.g. device 700 which includes sheet 710). For example, unit 720 may be a device which can be connected to any one sheet of multiple display sheets (by a section of said one sheet fitting inside cavity 724 of unit 720) other than sheet 710.

Figure 85:
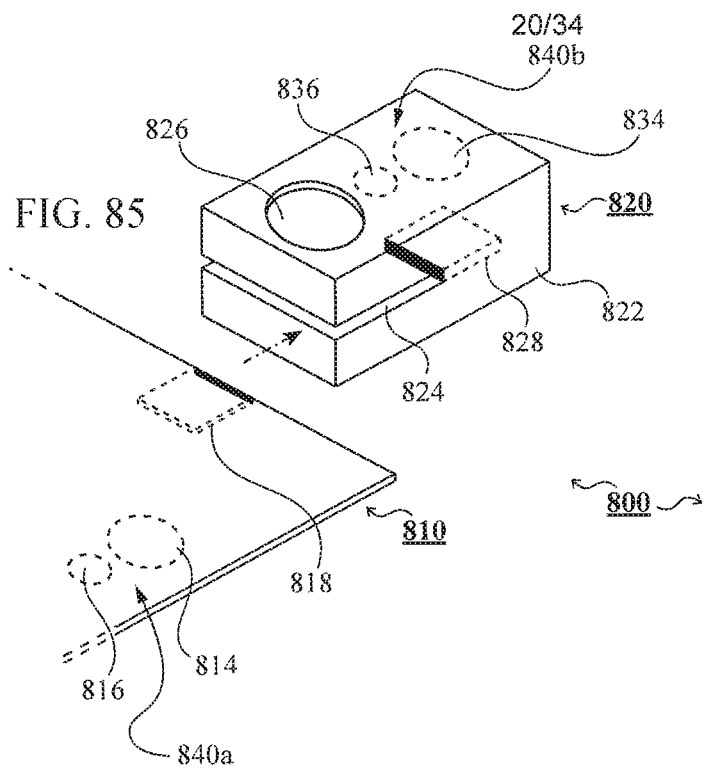
FIGS. 85 and 86 show an embodiment of the invention.

FIG. 85 shows another embodiment of the invention as a device 800 similar to device 700. Device 800 is shown including a flexible display sheet 810 (or simply "sheet") similar to sheet 710, and a unit 820 (including a body 822 with a cavity 824) similar to unit 720. For device 800, sheet 810 (which similarly to sheet 710 may include sensing means for sensing bending, and a display surface) may include operation elements 840a which facilitates operations specifically of sheet 810 (such as when the sheet is separated from unit 820), such as the displaying of visuals or the sensing of bending. Operation elements 840a may be flexible, for not disturbing bending of sheet 810, and are shown including, by way of example, a processor 816 and a power source 814, yet it is made clear that the operation elements may include any number of elements which facilitate operations specifically of sheet 810, such as by including a memory unit (see e.g. memory unit 107 of device 100 in FIG. 1). Similarly, unit 820 of device 800 is shown including operation elements 840b which may facilitate operations specifically of unit 820, such as generating output. The operation elements of unit 820 (i.e. operation elements 840b) are shown, by way of example, to include a processor 836 and a power source 834.

In FIG. 85, sheet 810 is further shown including a connection unit 818 (illustrated by dashed lines, suggesting the connection unit may, in some embodiments, be inside the sheet) which may facilitate a connection between the sheet and unit 820 of the device, such as when a section of the sheet occupies cavity 824 of unit 820 (similar to cavity 724 of unit 720). Similarly, unit 820 is shown including a connection unit 828 (illustrated by dashed lines) which may facilitate a connection between the unit and sheet 810. Accordingly, any or both of connection unit 818 of sheet 810 and connection unit 828 of unit 820 may facilitate a connection between the sheet and the unit.

Figure 86:
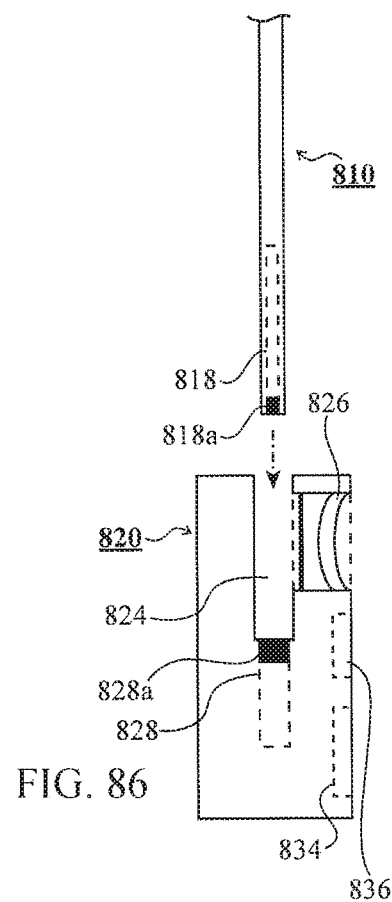

FIG. 86 shows a cross-section view of sheet 810 connecting to unit 820 by a section of the sheet entering cavity 824 of the unit (illustrated direction of entering by dashed-dotted arrow). In FIG. 86, (similarly to how the connection units are illustrated in FIG. 85) connection unit 818 is shown having a contact 818a whereas connection unit 828 is shown having a contact 828a (contacts not numbered in FIG. 85). When sheet 810 is inserted into cavity 824 (or in other words "when a section of the sheet enters the cavity and generally occupies the cavity"), contact 818a may come in contact with contact 828a, for forming a connection between sheet 810 and unit 820. Generally by any or both of connection units 818 and 828 facilitating a connection between the sheet and the unit, or specifically (by way of example) by contacts 818a and 828a coming in contact with each other, any of physical attachment, data connection and power connection (as described above) may be facilitated. Accordingly, it is made clear that sheet 810 may be connected to unit 820 by a section of the sheet occupying cavity 824 of unit 820, whereas by connecting sheet 810 to unit 820, physical attachment may be facilitated, and/or data may be transferred between unit 820 and the sheet, and/or power may be transferred between unit 820 and the sheet (i.e. from the sheet to unit 820 and/or from unit 820 to the sheet).

Figure 87:
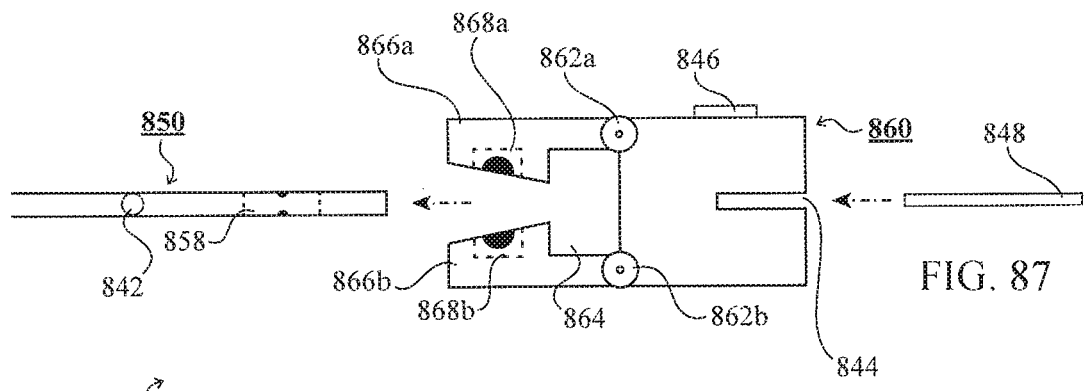
FIGS. 87 and 88 show a cross-section of an embodiment of the invention.
Figure 88:
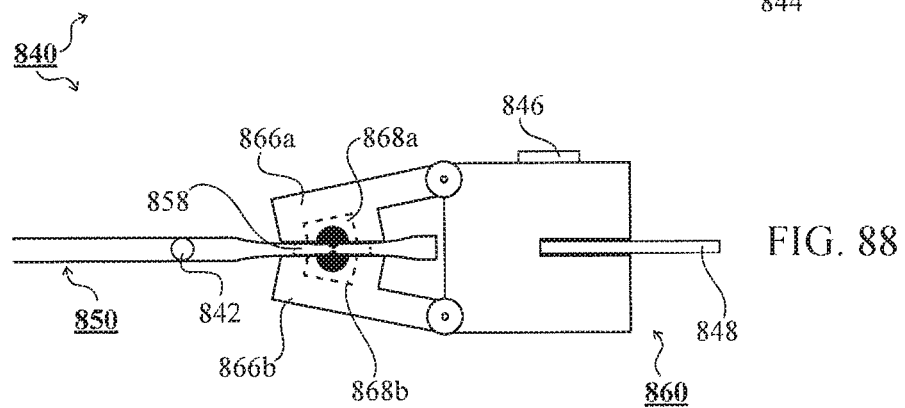

FIGS. 87 and 88 shows another embodiment of the invention as a device 840 which includes a flexible display sheet 850 (or simply "sheet") and a device 860 similar to unit 820 of device 800 shown in FIGS. 85 and 86 (as it is understood that unit 820 may itself be a device). Sheet 850, similarly to other flexible display sheets described herein, may include sensing means 842 for sensing any deformation of the sheet, such as curves formed by bending of the sheet, or otherwise topologic states (and/or changes thereof) of the sheet. Sensing performed by sensing means 842 (e.g. sensing of bending of sheet 850) may be registered as input.

In the figures, device 860 is shown including dynamic arms 866a,b as sections of the device which can be repositioned (e.g. tilted), such as by operating device 860, or such as automatically. Operating device 860 may be facilitated by a control 846 of the device. Repositioning arms 866a,b may be facilitated by hinges 862a,b included in device 860.

In some embodiments, arms 866a,b may define a cavity 864 into which a section of sheet 850 may be inserted, such as for connecting the sheet to device 860. Similarly to a section of sheet 850 being inserted into cavity 864, device 860 may be situated (e.g. by a user of device 840) on a section of sheet 850 (as shown in FIG. 87 situating direction illustrated by a dashed-dotted arrow), such that said section occupies (or "is accommodated by") cavity 864, as shown in FIG. 88.

In some embodiments, when a section of sheet 850 is inside cavity 864, arms 866a,b may be repositioned such as to facilitate physical connection between the sheet and device 860, and/or such as to have influence on the topologic state of said section. Having influence on the topologic state of said section may be by bending sheet 850 or pressing on said section. In FIG. 88, arms 866a,b are shown as repositioned from the shown in FIG. 90, and are shown clenching on a section of sheet 850 (similarly to common clothes pegs clenching on clothes) which is inside cavity 864, such that said section is deformed. Any repositioning of arms 866a,b may be for forming a grip of device 860 on sheet 850. Additionally or alternatively, repositioning arms 866a,b may be for having influence of the topologic state of sheet 850 (e.g. for bending the sheet) such that input may be registered (e.g. by sensing means 842 sensing the topologic state of the sheet and/or changes in said topologic state). Accordingly, a user may reposition arms 866a,b, such as by directly manipulating the arms or operating device 860, to have influence on the topologic state of sheet 850 (preferably when a section of the sheet is inside cavity 864). Alternatively, repositioning arms 866a,b may be performed automatically, such as when it is sensed (e.g. by sensing means in device 860) that a section of sheet 850 occupies cavity 864.

In some embodiments, a connection between device 860 and sheet 850 may be facilitated by any of connection units 868a,b and connection unit 858, shown included in the device and in the sheet, respectively. In FIG. 88, for example, connection units 868a,b are shown as being in contact with connection unit 858 (note that it is understood that a connection may be facilitated without direct contact between the connection units).

In some embodiments, device 860 may be connected to a memory unit (e.g. a Flash memory card), such as for extracting data from said memory unit and prompting displaying of visuals, which may be the result of processing said data, on sheet 850, when the sheet and the device are connected. For example, device 860 may include a socket 844 into which a memory unit 848 may be inserted, for connecting the device to the memory unit. Similarly, other units may be connected to device 860, such as an external power source (e.g. battery) or a power adapter. Providing power to device 860, such as by connecting the device to a power source (or "power supply"), may be for facilitating displaying of visuals by sheet 850, in case device 860 and the sheet are connected. This may be beneficial for embodiments in which sheet 850 itself lacks a power source, or otherwise requires additional power to operate.

Figure 89:
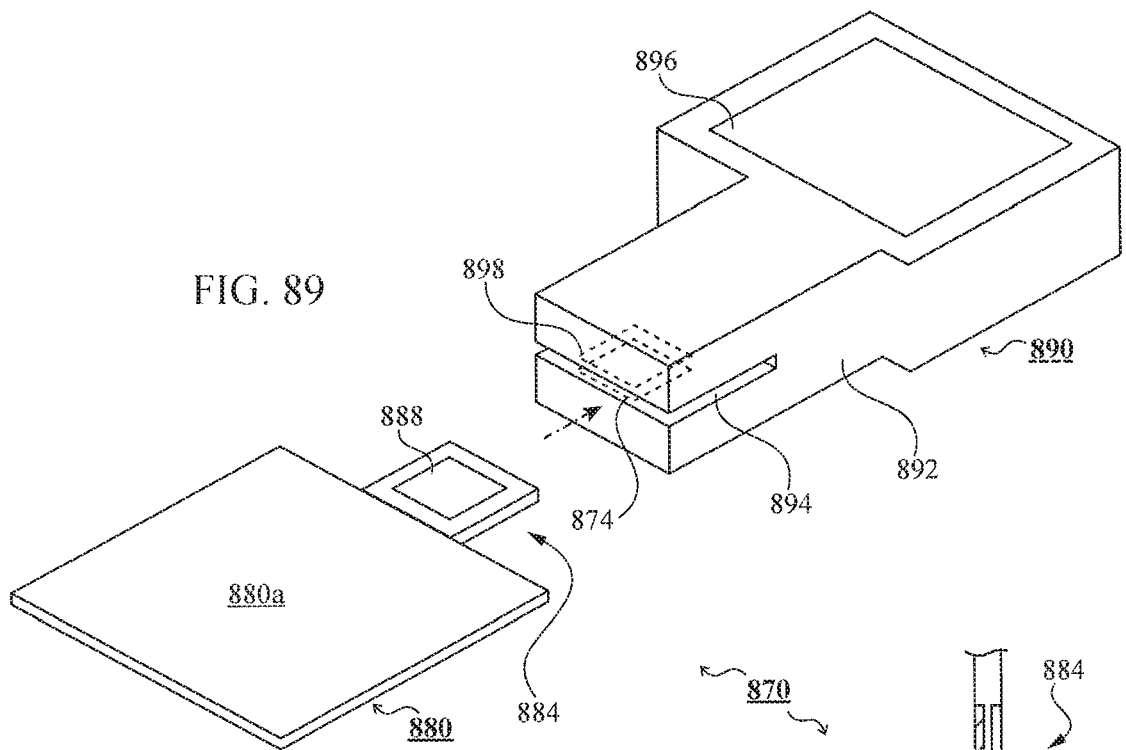
FIGS. 89 and 90 show an embodiment of a device of the invention.

FIG. 89 shows an embodiment of the invention as a system 870 which is shown generally including a flexible display sheet 880 (or simply sheet) and a device 890. Sheet 880 is shown having a front surface 880a, whereon visuals may be displayed, and an extension 884 which may fit into a cavity 894 of device 890 (in accordance with the described above for a section of a flexible display sheet inserted into a cavity of a unit).

In some embodiments, sheet 880, specifically extension 884 of the sheet, may include a connection unit 888 which may facilitate connecting sheet 880 to device 890, whereas device 890 may include a connection unit 898, preferably located facing cavity 894 (and accordingly facing extension 884 when the extension is inside the cavity), which may facilitate connecting the device to the sheet. Accordingly, any or both of connection units 888 and 898 may facilitate a connection between device 890 and sheet 880.

In some embodiments, a connection between device 890 and sheet 880 may facilitate data transfer from device 890 to sheet 880, specifically data which may be utilized for displaying visuals by sheet 880 (specifically on front surface 880a). For example, by forming a connection between device 890 and sheet 880, data may be transferred by utilizing said connection, whereas said data may include commands (e.g. as coded signals) which may prompt sheet 880 to generate visuals according to said commands.

In some embodiments, device 890 may include a control 896 which may be or include any number of elements which a user of system 870 can operate for registering input, or specifically for prompting displaying of visuals by sheet 880, whereas said visuals preferably correspond to how control 896 is operated. Accordingly, a user may operate control 896 for determining which (or "setting") visuals are displayed by sheet 880 (specifically on front surface 880a). Note that it is understood that data from operating control 896 (e.g. input), or signals as results of processing said data (e.g. by a processor), may be transferred to sheet 880 from device 890 for facilitating displaying visuals, which may correspond to said data, on front surface 880a. For example, a user may operate control 896 for prompting sheet 880 to display certain visuals according to how the control is operated (by said user), so that by operating the control, input may be registered at device 890 and processed at device 890 for sending data, which is a result of the processing of the input, to sheet 880 whereat said data may be utilized for generating the aforementioned certain visuals. For a more specific example, control 896 may be, or may include, a keyboard which may be operated for typing text, whereas by typing said text (by operating said keyboard), a user may determine which text (preferably the text the was typed) is displayed on front surface 880a of sheet 880.

Figure 90:
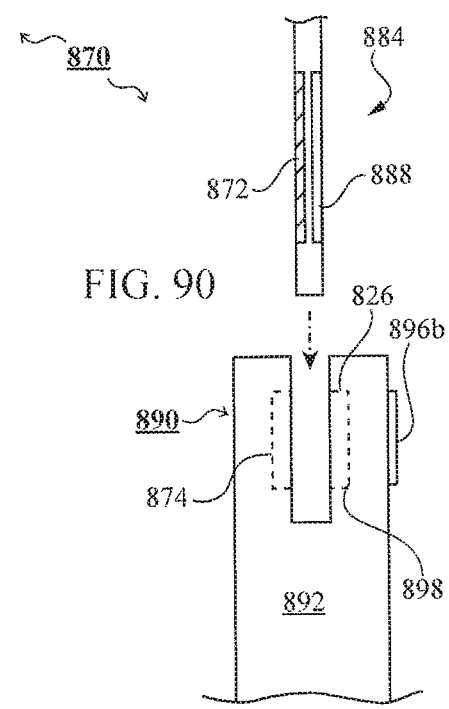
Figure 91:
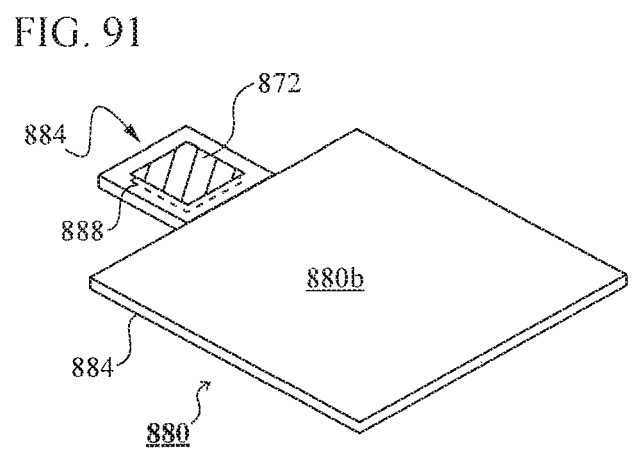
FIGS. 91 and 92 show different elements of embodiments of devices of the invention.

FIG. 90 shows system 870 from a cross-section point of view, whereas FIG. 91 shows sheet 880 of system 870 from a different perspective view than shown in FIG. 89, so as to depict the opposite side of the sheet which is not visible in FIG. 89.

In FIGS. 90 and 91 there is shown extension 884 of sheet 880 including an attachment unit 872 which facilitate attaching sheet 880, or specifically extension 884 to certain surfaces. It is understood that attachment unit 872 may be located at the back side of sheet 880, or specifically the back side of extension 884, such that when the sheet (or specifically the extension) is attached to a surface (by utilizing attachment unit 872), front side 880a of the sheet, on which visuals may be displayed, is facing away from said surface so that it is visible (whereas back side 880b is facing the surface and so is not visible). For example, attachment unit 872 may include an adhesive, such as adhesives used in common duct-tapes, which facilitates taping or sticking sheet 880 (or specifically extension 884) to certain surfaces such as walls or boards (e.g. a whiteboard). Taping or sticking the sheet to certain surfaces may facilitate posting the sheet, such as known in the art for post-its.

In some embodiments, device 890 may include adhesive supply unit 874 which may be any means for replenishing attachment unit 872, or otherwise supplying sheet 880, or specifically extension 884, a supply of attachment means. Supply unit 874 may be located generally facing cavity 894 such that when extension 884 is inside the cavity, supply unit 874 may come in contact with attachment unit 872, for supplying attachment means to the attachment unit. Such as common in business rubber stamps wherein a carved sheet of rubber is supplied with ink by an ink pad, attachment unit 872 may be supplied with adhesive, such as glue, each time the attachment unit comes in contact with supply unit 874 (such as when extension 884 is inserted into cavity 894 of device 890).

Figure 92:
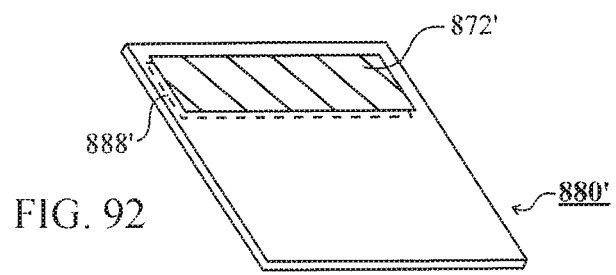

Note that in some embodiments, sheet 880 may not include an extension (e.g. extension 884 as described above), whereas the described above for extension 884 may similarly refer to any section of sheet 880. In FIG. 92 there is shown an embodiment of a flexible display sheet 880' (or simply "sheet"), similar to sheet 880 yet excluding extension 884. Sheet 880' may include a connection unit 888' and an attachment unit 872' similar to connection unit 888 and attachment unit 872 of sheet 880. Connection unit 888' and an attachment unit 872' may be located at a specific section (shown located at a top section from the point of view of sheet 8H, by way of example) which may fit into cavity 894, or which may otherwise be utilized for the described for previous figures. It is specifically noted that attachment means may be supplied to attachment unit 872' by a section of sheet 880', whereat the attachment unit is located, being inserted into cavity 894 of device 890.

Further note that it is made clear that sheet 880 does not necessarily include sensing means for sensing topologic states, or changes thereof, of sheet 880.

Figure 93:
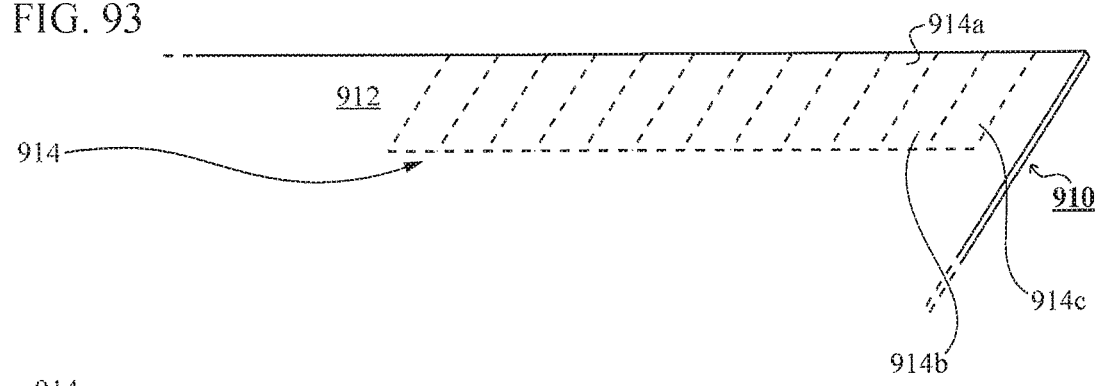
FIG. 93 shows an element of embodiments of devices of the invention.

FIG. 93 shows a perspective view of a flexible display sheet 910 (or simply "sheet") which includes a display surface 912 on which visuals may be displayed. Sheet 910 is further shown including an input section 914 whereat the sheet may be bended, or whereat changes to the topologic state of sheet 910 may be applied, for registering input or prompting operations of the sheet (e.g. displaying of visuals, or changing displayed visuals). Section 914 is shown divided to regions (shown numbered regions 914a-c), such that the topologic state of each of the regions, or changes in said topologic state, as sensed by any sensing means, may correspond to specific input. For example, bending of sheet 910 at region 914a of section 914 may correspond with a first input being registered when said bending is sensed, whereas bending of the sheet at region 914b of section 914 may correspond with a second input being registered when sensing the bending at region 914b, so that by bending the sheet at region 914a, a first operation (corresponding to said first input) of sheet 910 may be prompted, and so that by bending the sheet at region 914b, a second operation (corresponding to said second input) may be prompted. For a more specific example, bending sheet 910 at region 914a may be for displaying a first page of an "e-book" on display surface 912 of the sheet, whereas bending the sheet at region 914b may be for displaying a second page of said "e-book", and whereas bending the sheet at region 914c may be for displaying a third page of said "e-book". Preferably, said first, second and third pages are a sequence of following pages.

Figure 94:
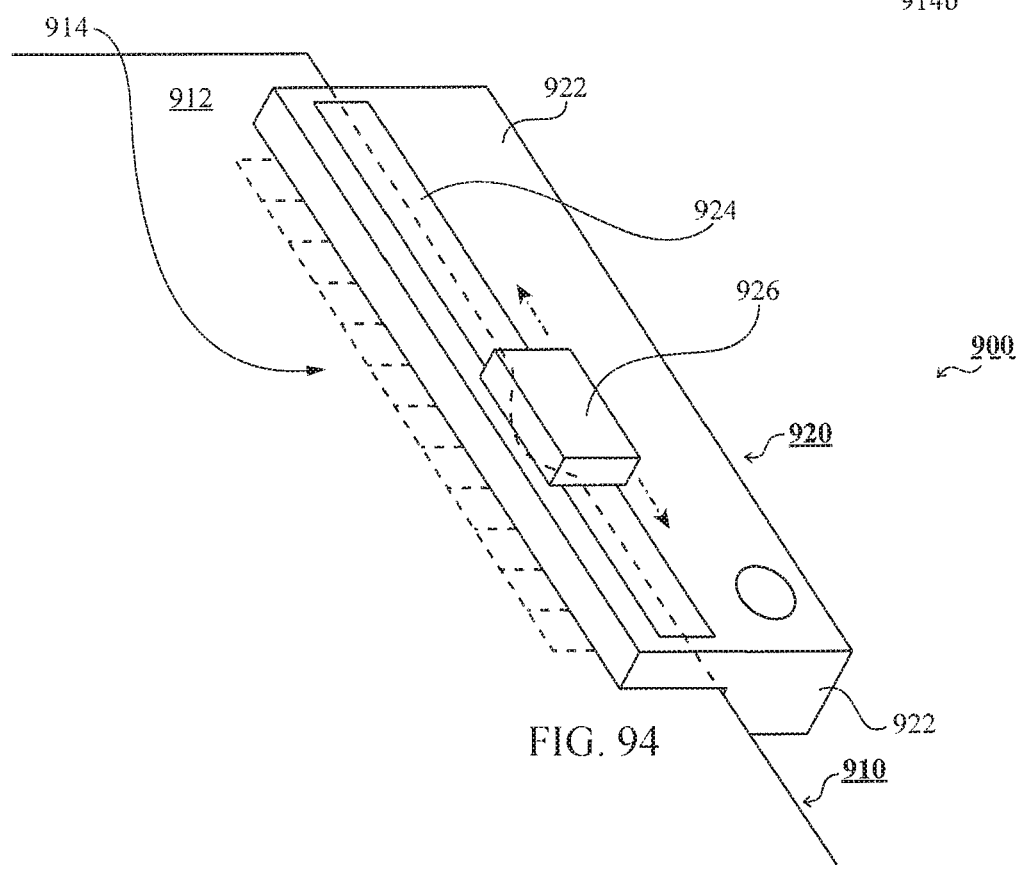
FIGS. 94 and 95 show an embodiment of the invention.

FIG. 94 shows an embodiment of the invention as a device 900 which may include flexible display sheet 910 (see ref. FIG. 93) and a unit 920. Similarly to the described for units of devices 700, 800 and 840 in previous figures, unit 920 may be attached to sheet 910, such as by a section of the sheet being inserted into a cavity of the unit (said cavity may be in a body 922 of the unit).

In some embodiments, unit 920 may include a control 926 which can be operated (e.g. repositioned) for influencing any of the regions of section 914 at any given time, specifically for changing (or "altering") the topologic state of said any of the regions, such as by bending. Accordingly and following the described for FIG. 93, control 926 may be operated for registering different inputs, specifically inputs corresponding to any of the regions of section 914, such as by repositioning the control for registering different inputs during said repositioning. For example, as shown in FIG. 94, control 926 may be repositioned along a track 924, as suggested by illustrated dashed-dotted arrows, such as similarly to moving a handle of a scroll bar in common computer user-interfaces, in which case influence may be applied (by any operation of unit 920) to a sequence of adjacent regions of section 914 while the control is being repositioned. For a similar more specific example, each of the regions of section 914 may correspond to a different page of an "e-book" which may be displayed by sheet 910, such that by influencing any one of said regions (or specifically influencing the topologic state thereof), a different page (of said "e-book") may be displayed by the sheet on display surface 912, in which case repositioning control 926 along track 924 may be for flipping between pages of said "e-book".

Figure 95:
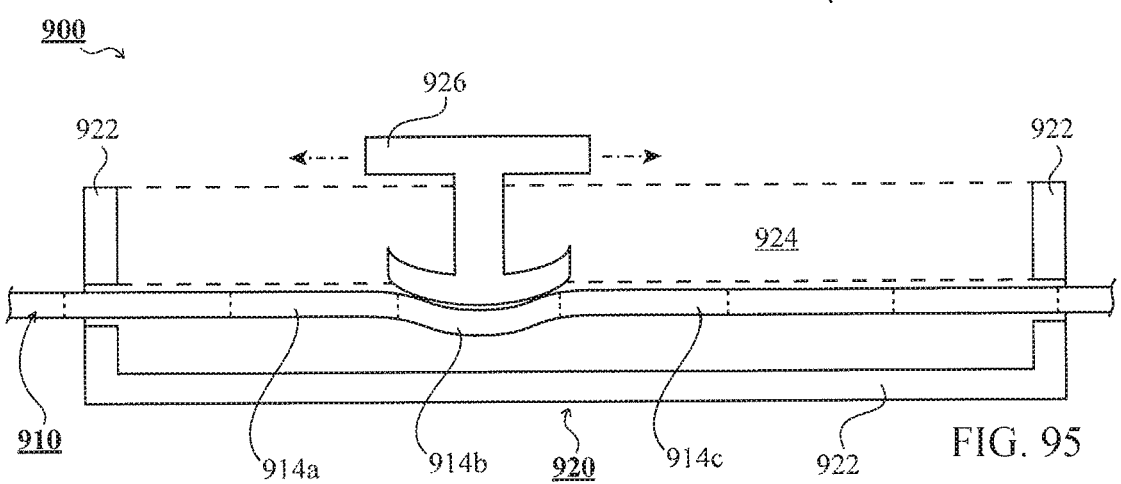

FIG. 95 shows a cross-section view of device 900 in which sheet 910, specifically to topologic state of regions of section 914 of the sheet, may be influenced by operating control 926 of unit 920 (e.g. by repositioning of the control as suggested by illustrated dashed-dotted arrows in the figure). In FIG. 95, region 914b of section 914 of sheet 910 is shown bent by control 926 (yet it is understood that the region may be bent by any element which is controlled by control 926), whereas by moving the control leftward (from the viewpoint of the figure), region 914a may be bent by the control, and whereas by moving the control rightward, region 914c may be bent by the control. Following the above, bending each one of the regions (as an exemplary influence on that region) at any given time may be for registering a different input at any given time, so that by moving control 926, different inputs may be registered during the moving.

Note that whereas regions 914a and 914c are shown in FIG. 95 as slightly bent (specifically at one side of each of the regions), it is understood that because region 914b is bent significantly more than regions 914a,b, an input corresponding only to region 914b may be registered (or an operation of device 900 corresponding only to region 914b may be prompted) in accordance with the position of control 926 as shown in FIG. 95.

Further note that it is made clear that following the above, in some embodiments, unit 920 may be generally mechanical (i.e. lacking electronic elements, or including a limited amount of electronic elements) and/or may serve as a physical scroll-bar (i.e. a scroll-bar similar to scroll-bars common in GUIs) which may be generally mechanical.

Figure 96:
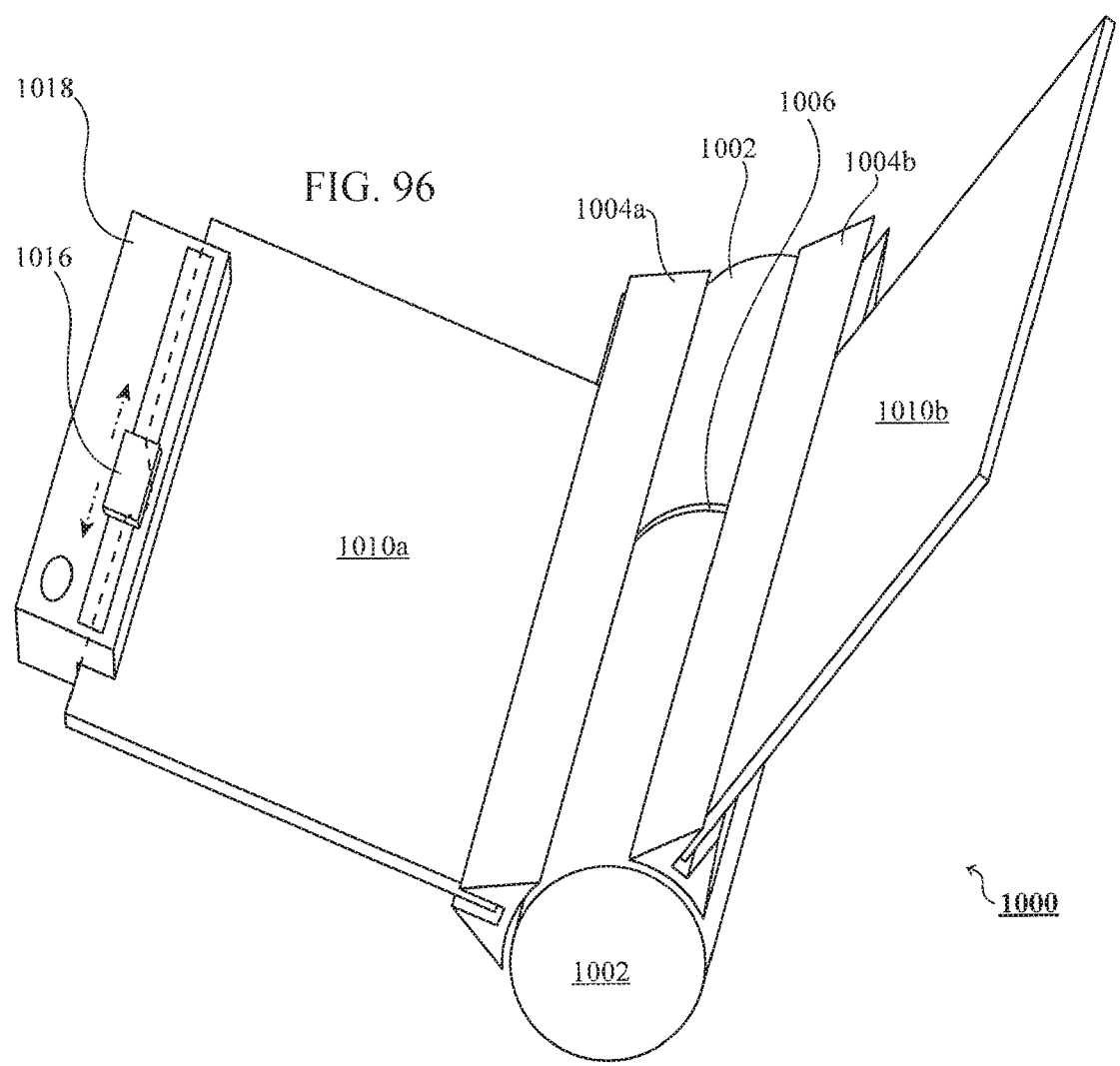
FIG. 96 shows an embodiment of embodiments of devices of the invention.

FIG. 96 shows a device 1000 which may include flexible display sheets 1010a,b (or simply "sheets"). Sheets 1010a,b may be connected to a unit 1002 (in the figure, by way of example, the sheets are shown connected to the unit for a general shape of an open book for device 1000).

In some embodiments, sheets 1010a,b may be connected to unit 1002 by being installed on units 1004a,b, respectively. Said units may be repositioned, such as along a track 1006 of unit 1002. Repositioning of the units may be automatic (e.g. by operations of device 1000), or by directly manipulating the units (e.g. manually adjusting the positions of the units), or by manipulating sheets 1010a,b (e.g. pulling forward or pushing backward, similarly to the described for sheets 260a,b of devices 240 and 240'). Further similarly to the described for devices 240 and 240' (see ref. FIGS. 20 and 21), repositioning of units 1004a,b may be for adjusting the positions of sheets 1010a,b (such as for more comfortably viewing visuals displayed on the sheets), and/or for registering input.

In some embodiments, any of sheets 1010a,b may be connected to a unit 1018 (shown in FIG. 96 sheet 1010a connected to unit 1018) similar to unit 920 of device 900 (see ref. FIGS. 94 and 95), for registering input by operating unit 1018 (e.g. by specifically repositioning a control 1016 of the unit). Similarly any of sheets 1010a,b may be connected to any of units 720, 820 and 860 described for previous figures, and/or any of units 1120, 1130, 1220 and 1320 described in following figures.

Figure 97:
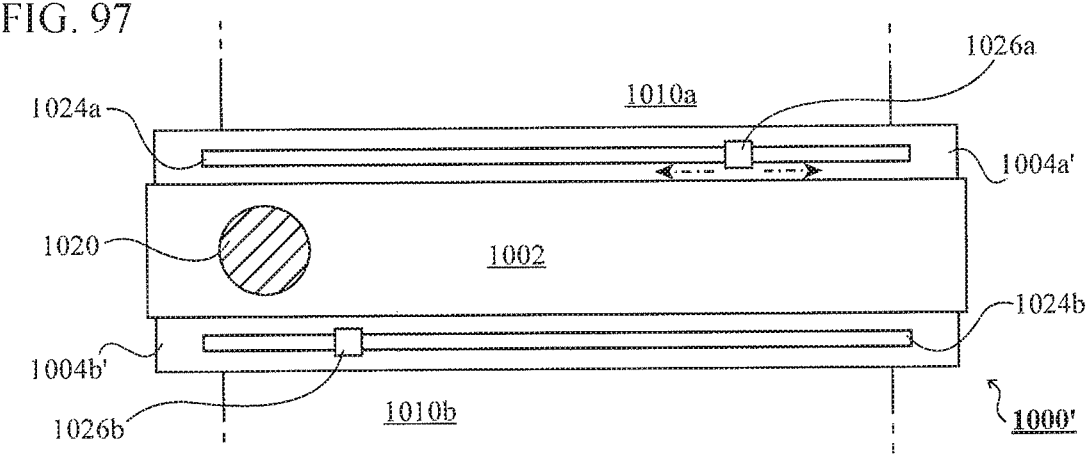
FIG. 97 shows an embodiment of embodiments of devices of the invention.

FIG. 97 shows a back view of a device 1000' (i.e. opposite to a point of view of a user holding the device) similar to device 1000 in that sheets 1010a,b are generally connected to unit 1002 (shown sheets connected to the unit via units 1004a' and 1004b' similar to units 1004a,b of device 1000). Device 1000' may include a control 1026a (shown installed on, or in, a track 1024a similarly to control 926 and track 1024 of device 900) for registering input, or for prompting operations of device 1000', such as prompting the displaying of certain visuals on sheet 1010a (or changing the displaying of visuals thereat) of the device. In some embodiments, device 1000' may further include a control 1026b (shown installed on, or in, a track 1024b), for prompting the displaying of certain visuals on sheet 1010b (or changing the displaying of visuals thereat) of the device. Accordingly, controls of device 1000' may serve a similar purpose as a control of any unit connected to any of sheets 1010a,b (e.g. unit 1018 connected to sheet 1010a as shown in FIG. 96). Note that because the shown in FIG. 97 is a back view of device 1000', it is made clear that controls of the device may preferably be located at the back of the device. This may be beneficial when holding the device, as fingers (commonly all fingers of each hand of a user, excluding the thumb of said each hand) of a user holding the device may be positioned generally at the back of the device for comfortably holding of the device.

Figure 98:
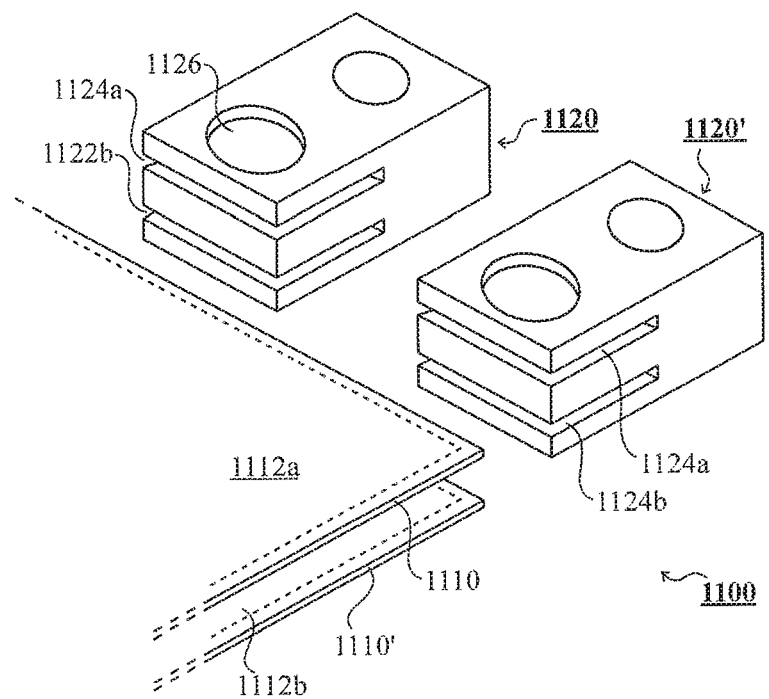
FIG. 98 shows an embodiment of the invention.

FIG. 98 shows an embodiment of the invention as a system 1100 which may include any number of units 1120 and any number of flexible display sheets 1110. In the figure there is shown system 1100 including unit 1120 and a similar (or preferably identical unit) unit 1120'. System 1100 is further shown including flexible display sheet 1110 (or simply "sheet") and a similar (or preferably identical) sheet 1110'. Note that flexible display sheets 1110 and 1110' may be similar to any flexible display sheet described herein for the invention, whereas units 1120 and 1120' may be similar to any unit which may be connected to a flexible display sheet, as described herein for several units (see e.g. unit 720 of device 700 in FIGS. 79 and 80). Accordingly, sheet 1110 and/or sheet 1110' may be connected to unit 1120 and/or to unit 1120', such as by sheet 1110 inserted into a cavity 1124a of any of the units and by sheet 1110' inserted into a cavity 1124b of any of the units.

Similarly to other units described above, unit 1120 may include a control 1126 for operating device 1100, such as for registering input which is utilized for operation of the device, or specifically for bending sheet 1110 and/or sheet 1110' (in which case said bending may be sensed and registered as input.

In some embodiments, following the described above for cavities 1124a,b of each of units 1120 and 1120' (wherein any of the units may include any number of cavities), units 1120 and 1120' may facilitate connecting sheets 1110 and 1110' (whereby the sheets may be connected via the units).

Following the above, it is made clear that a device of the invention may include any number of units and any number of flexible display sheets, whereas said any number of units may facilitate connecting said any number of flexible display sheets to each other.

In some embodiments, a couple of flexible display sheets which are connected to each other, such as by utilizing unit 1120 for connecting sheets 1110 and 1110', may be facing opposite direction so that their back surfaces may be facing each other and their front surfaces, on which it is preferable for visuals to be display (also termed "display surfaces"), may be exposed as to be visible. For example, in FIG. 98, sheet 1110 is shown including a display surface 1112a facing away from sheet 1110', whereas sheet 1110' is shown including a back surface 1112b (which is on a side opposite to a display surface of sheet 1110') facing sheet 1110, so that when the sheets are positioned as shown in the figure, their display surfaces are facing outward. The position shown in the figure may be similar to a position in which the sheets may be connected to each other by being inserted into cavities 1124a,b of any of units 1120 and 1120'.

Figure 99:
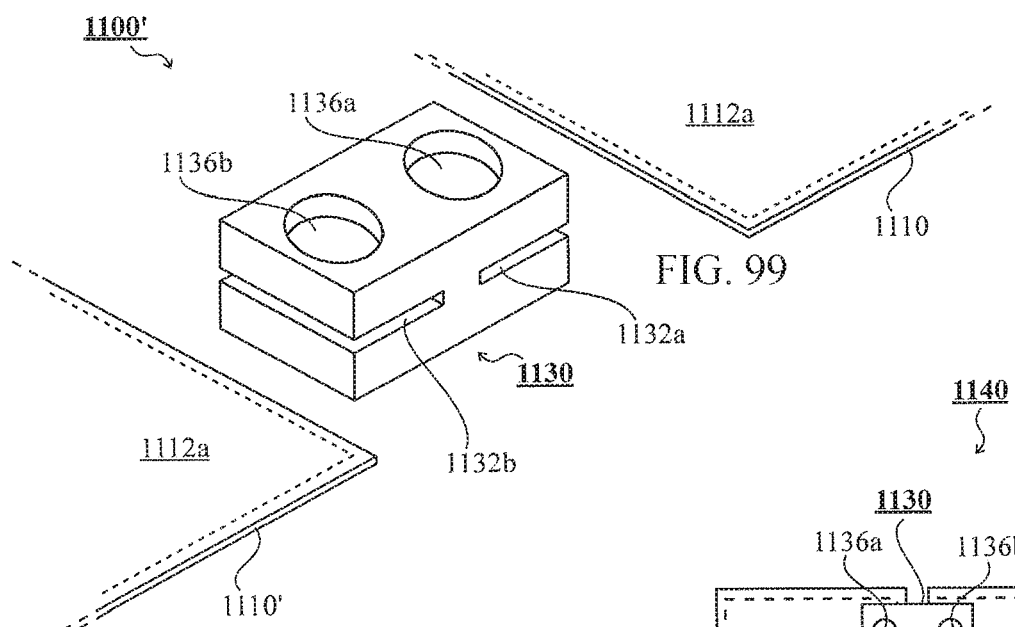
FIG. 99 shows an embodiment of the invention.

FIG. 99 shows an embodiment of the invention as a system 1100' similar to system 1100 shown in FIG. 98. System 1100' is shown including a unit 1130 which may include cavities 1132a,b on opposite sides of the unit (as opposed to the shown for unit 1120 which may include cavities 1124a,b on the same side). The system is shown further including sheets 1110 and 1110' as positioned side by side such that each of the sheets may be inserted into each of cavities 1132a,b of unit 1130 which is shown positioned between the sheets.

In some embodiments, as opposed to the described for system 1100, sheets 1110 and 1110' may be positioned such that their display surfaces facing the same side (as shown both display surfaces 1112a of the sheets generally facing the point of view of FIG. 99).

In some embodiments, unit 1130 may include a control 1136a and a control 1136b, for determining which visuals are displayed on sheet 1110 and on sheet 1110', respectively. For example, control 1136a may be for bending a section of sheet 1110 when said section is inside cavity 1132a of unit 1130, such that input may be registered which correspond to how the control is operated and to sheet 1110, whereas said input may be utilized for displaying corresponding visuals on display surface 1112a of the sheet. Similarly, control 1136b may be for bending a section of sheet 1110', for the same purposes.

Figure 100:
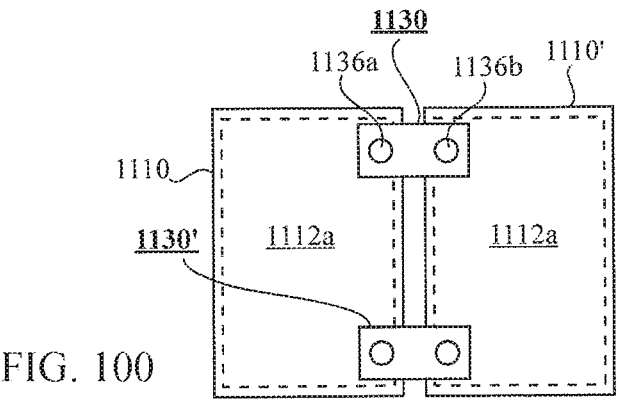
FIG. 100 shows an embodiment of the invention.

FIG. 100 shows a front view of a system 1140 similar to system 1110', wherein sheets 1110 and 1110' are shown connected to unit 1130 (by optionally inserted into cavities 1132a,b of the unit, as shown in FIG. 99). System is further shown a unit 1130' (similar to unit 1130) to which the sheets are also connected. Accordingly, in some embodiments of system 1140, any number of flexible display sheets may be connected to any number of units similar to unit 1130. Otherwise, in some embodiments of system 1140, any number of units (similar to unit 1130) may be utilized for connecting any number of flexible display sheets to each other (as sheets 1110 and 1110' are essentially connected to each other via unit 1130 and unit 1130').

Figure 101:
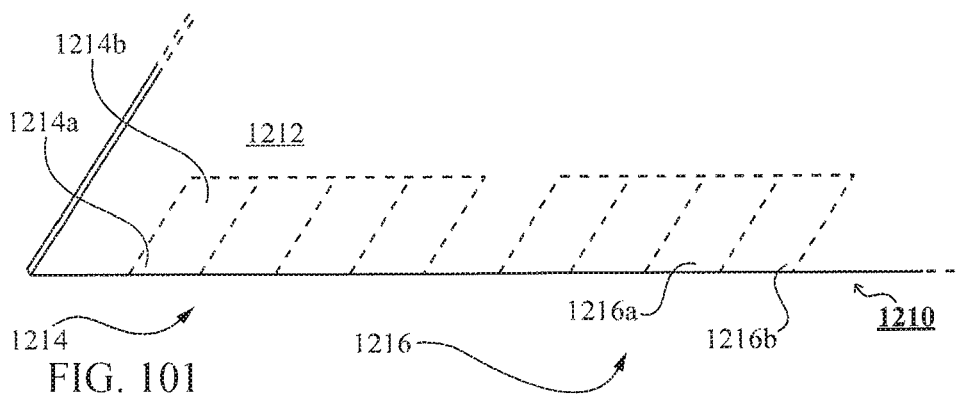
FIG. 101 shows an element of embodiments of the invention.

FIG. 101 shows a perspective view of a flexible display sheet 1210 (or simply "sheet") similar to sheet 910 (see ref. FIGS. 93 through 95). Sheet 1210 accordingly includes a display surface 1212 on which visuals may be displayed. The sheet is further shown including input sections 1214 and 1216 similar to input section 914 of sheet 910, whereas the sections may respectively include input regions 1214a,b and 1216a,b similar to regions of section 914 (so that bending each of the regions may be for registering input).

Note that it is made clear that flexible display sheets of the invention may include any number of sections similar to section 914 of sheet 910, whereas said any number of sections may include any number of regions similar to input regions 1214a,b and 1216a,b and similar to regions of 914 (e.g. regions 914a-c).

Figure 102:
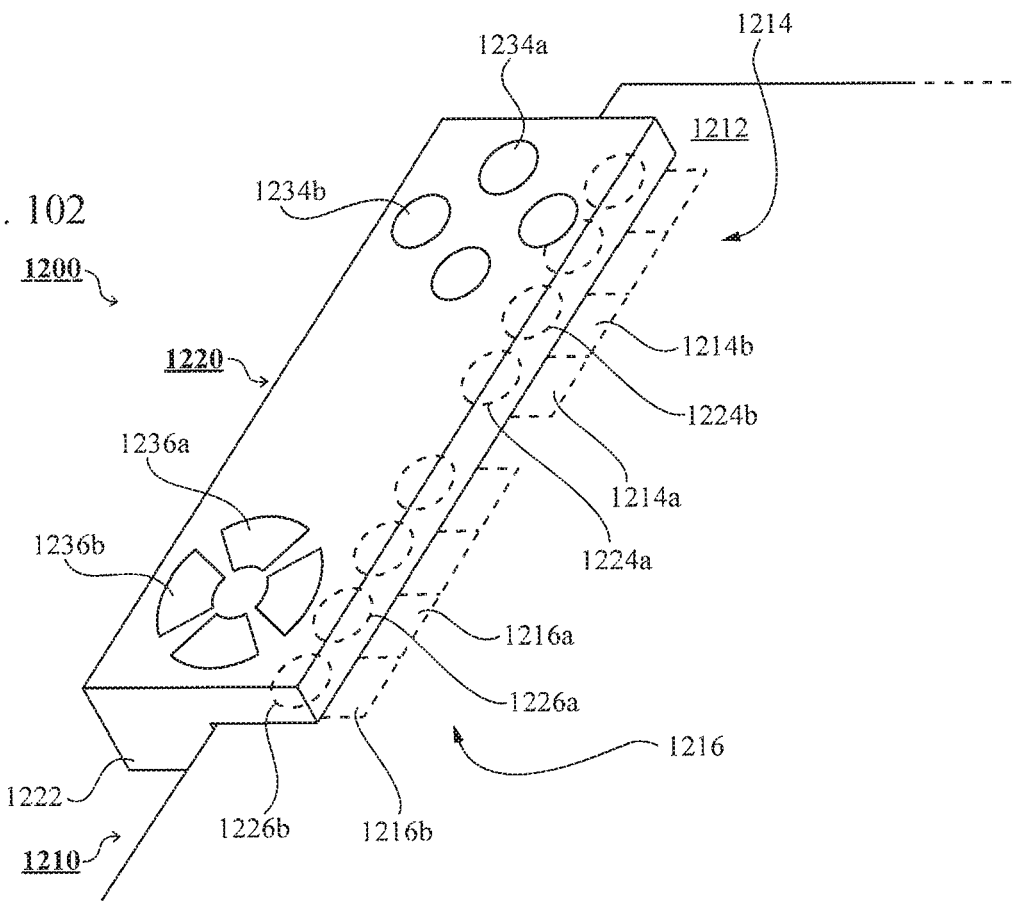
FIG. 102 shows an embodiment of the invention.

FIG. 102 shows (from a different perspective view than in FIG. 101) an embodiment of the invention as a device 1200 which may generally include flexible display sheet 1210 and an input unit 1220 (similar to unit 920 of device 900 in FIGS. 94 and 95). Similarly to the described for device 900, unit 1220 is shown connected to sheet 1210, such as by a cavity of the unit accommodating the sheet, specifically sections 1214 and 1216 of the sheet. Unit 1220 is shown in FIG. 102 including controls 1234a,b and controls 1236a,b, whereas operating (e.g. pressing, in case the controls are keys) each of controls 1234a,b and controls 1216a,b may be for registering a different input or prompting a different operation of device 1200.

In some embodiments, in accordance with the described for FIGS. 94 and 95 (specifically for operating control 926 of unit 920), controls 1234a,b may correspond to regions 1214a,b (respectively) of section 1214, and controls 1236a,b may correspond to regions 1216a,b (respectively) of section 1216, so that by operating each of controls 1234a,b, the topologic state of each of regions 1214a,b (respectively) may be influenced (or "affected"), where similarly by operating each of controls 1236a,b, the topologic state of each of regions 1216a,b (respectively) may be influenced. For example, control 1234a may be a key which can be operated by pressing on said key, whereas pressing on said key may be for bending region 1214a, or specifically prompting an operation of unit 1220 for bending region 1214a. Said bending of the region 1214a may be performed by bending means 1224a (e.g. a mechanism which may be actuated when control 1234a is operated) and may be sensed by sensing means (see e.g. sensing means 718 of sheet 710 of device 700 in FIGS. 79 and 80) included in sheet 1210, such as for registering input, or specifically for prompting a display (or changing thereof) of visuals on display surface 1212 of sheet 1210. The latter example may similarly refer to operating any of control 1234b and 1236a,b for prompting bending means 1224b and 1226a,b (respectively) of unit 1220.

Figure 103:
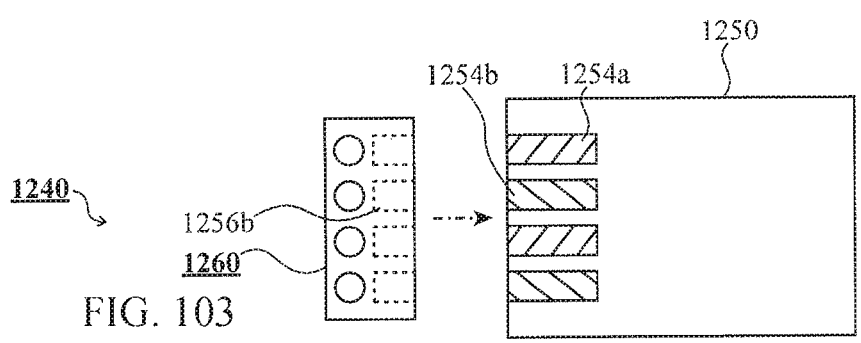
FIG. 103 shows an embodiment of the invention.

Note that the described for operating units 820, 860, 920, 1120, 1130 and 1220 for bending flexible display sheets or changing topologic states thereof for registering input or prompting operations such as displaying or changing of visuals displayed on said flexible display sheets (by sensing said bending or changing of topologic states), may similarly and alternatively refer to operating the aforementioned units for sending data (e.g. electronic signals) to flexible display sheets, such as by utilizing a connection (e.g. electronic connection) between the units and said flexible display sheets, for registering input or prompting operations (said operations preferably corresponding to how the units, or controls thereof, are operated, as described above). For example, in FIG. 103 there is shown an embodiment of a device 1240 which may include a unit 1260 having contacts 1256a,b and a flexible display sheet 1250 having contacts 1254a,b, so that the unit may be connected to the flexible display sheet by contacts of the flexible display sheets coming in contact with contacts of the unit.

Figure 104:
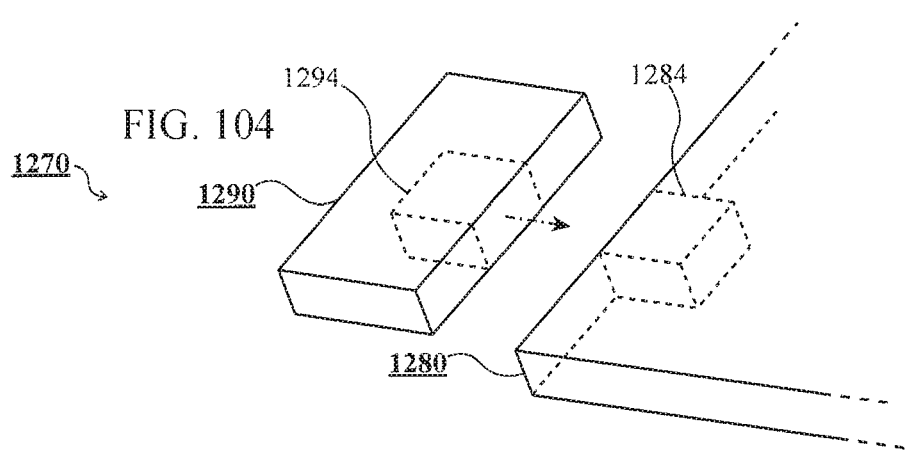
FIG. 104 shows an embodiment of the invention.

Note that whereas units 720, 820, 860, 920, 1120, 1130 and 1220 are described connecting to flexible display sheets of the invention by sections of said flexible display sheets inserted into cavities of the units, it is made clear that the scope of the invention is not limited to such methods of connecting the units to flexible display sheets, and that within the scope of the invention may be units similar to the aforementioned units excluding cavities fitted for flexible display sheets, whereas the units may connect to flexible display sheets by any means known in the art. For example, in FIG. 104 there is shown an embodiment of a device 1270 which may include a unit 1290 having a connection unit 1294, whereas the device may further include a flexible display sheet 1280 having a connection unit 1284. The connection units of unit 1290 and flexible display sheet 1280 may facilitate a connection between unit 1290 and flexible display sheet 1280, such as by magnetic attraction (in case the connection units include magnetic elements).

Figure 105:
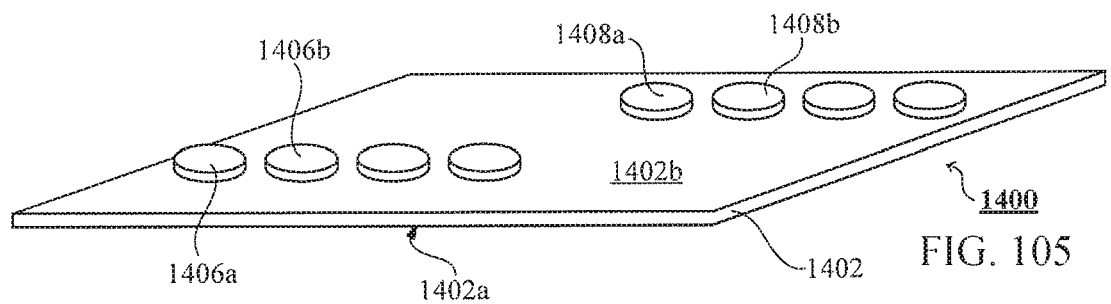
FIG. 105 shows an embodiment of the invention.

FIG. 105 shows an embodiment of the invention as a device 1400. Device 1400 is shown generally including a flexible display sheet 1402 (or simply "sheet") and controls 1406a,b and 1408a,b (other controls illustrated but not numbered). The controls may be operated for registering input or prompting operations of device 1400, such as specifically the displaying of visuals.

In some embodiments, controls 1406a,b and/or controls 1408a,b may be generally located at (or "on") a back surface 1402b of sheet 1402, or otherwise located to be accessible to fingers positioned generally behind sheet 1402 (from the point of view of a user of device 1400), whereas visuals may be displayed on a front surface 1402a of sheet 1402 which is opposite to back surface 1402b (front surface 1402a, which is obscured from the point of view of FIG. 105, numbered in the figure by an arrow generally pointing to a surface opposite to back surface 1402b). Accordingly, when a user is holding device 1400, it is preferable for front surface 1402a (on which visuals may be displayed) to be facing said user, whereas a grip of hands of said user, for holding the device, may be facilitated by fingers of said hands positioned generally at the back of sheet 1402, i.e. generally at back surface 1402b. It is understood that fingers being positioned at back surface 1402b refers to fingers touching (or "coming in contact with") the back surface, or are in reach of the back surface.

Figure 106:
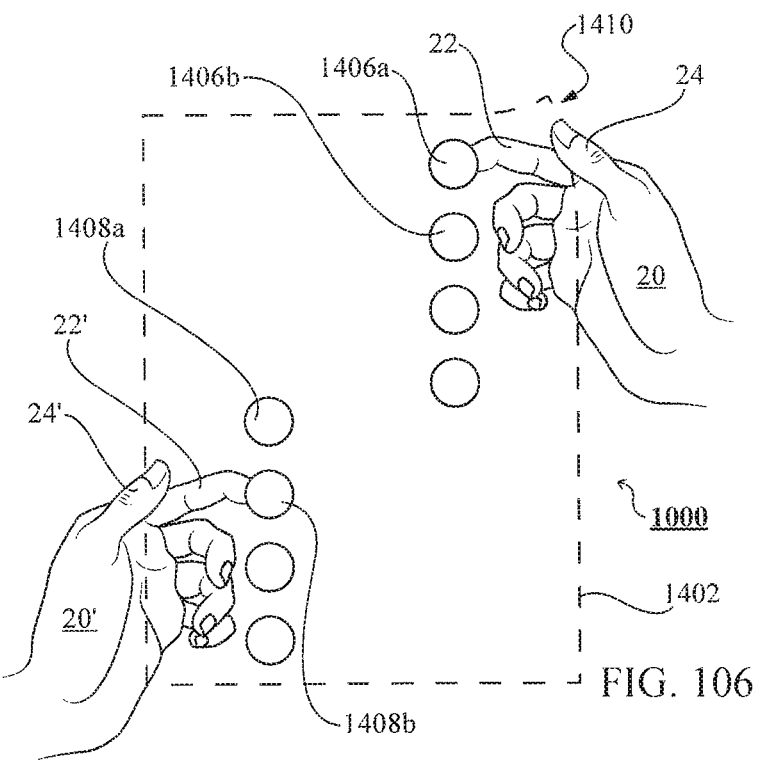
FIG. 106 shows an embodiment of the invention and method of use.

FIG. 106 shows a front view of device 1400 being held by hands 20 and 20' of a user. Sheet 1402 of the device is illustrated by dashed lines, for facilitating depiction of what is behind the sheet. In accordance with the shown in FIG. 105, controls 1406a,b and 1408a,b of device 1400 are shown in FIG. 106 located at the back of sheet 1402, preferably accessible to any number of fingers of hands 20 and 20'. In FIG. 106, fingers 22 and 22' of hands 20 and 20' (respectively) are shown reaching controls 1406a and 1408b (respectively), such as for operating controls 1406a and 1408b (e.g. pressing on each control, in case the control are keys).

In some embodiments, device 1400 may include sensing means for sensing bending of sheet 1402, or otherwise for sensing topologic states, and/or changes thereof, of sheet 1402 (or of sections thereof), as described herein for several sensing means which facilitate the purpose of sensing bending or topologic states (and/or changes thereof).

In FIG. 106 there is shown (in addition to the described above) hand 20 bending a corner (specifically the upper right corner from the viewpoint of the figure), as shown in the figure for forming a curve 1410, for registering input (or for prompting operations of device 1400), whereas said registering input may be facilitated by the aforementioned sensing means (see previous paragraph) which may be included in device 1400. Accordingly, and following the above, device 1400 may be used or interacted with by operating any of control 1406a,b and 1408a,b, and/or by any bending of sheet 1402 of the device. Optionally, operating any of the controls may be performed simultaneously to bending of the sheet, as shown in FIG. 106, for facilitating a variety of manners, or a variety of actions, of using device 1400 or interacting therewith, such as described for gestures 450a-c in FIGS. 53 through 55.

Figure 107:
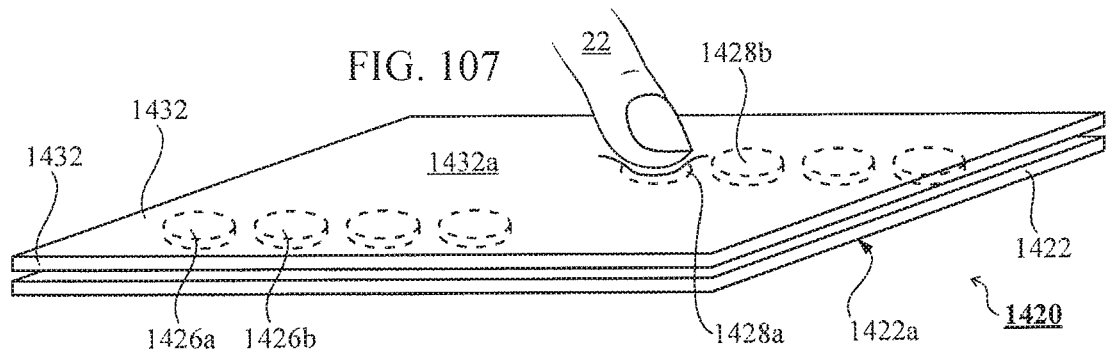
FIG. 107 shows an embodiment of the invention.

FIG. 107 shows another embodiment of the invention as a device 1420 which generally includes flexible display sheets 1422 and 1432 (or simply "sheets") connected to each other. Preferably, the sheets are positioned in device 1420 such that they are so-called "back-to-back", i.e. their back surfaces, on which visuals are not displayed, are facing each other, whereas their front surfaces, on which visuals may be displayed, are facing outward and so are visible (numbered front surfaces 1422a and 1432a for sheets 1422 and 1432, respectively, whereas front surface 1432a is referred to in the figure by an arrow generally pointing to a surface of sheet 1432 which is not visible from the point of view of the figure).

In some embodiments, sensing means may be located generally between sheets 1422 and 1432, for sensing pressure applied on front surface 1422a and/or front surface 1432a. In FIG. 107 there are shown controls 1426a,b and 1428a,b between sheets 1422 and 1432, whereas the controls may include said sensing means located generally between the sheets. In the figure there is further shown finger 22 applying pressure (or "pressing") on sheet 1432, specifically along front surface 1432a, at a location corresponding to the location of control 1428a (located on another side of the sheet), for operating device 1420 by said pressure being sensed by control 1428a (which may be influenced by pressure applied on front surface 1432a). Input may be registered by the control sensing said pressure, so that device 1420 may be operated by pressing on front surface 1432a, specifically at locations corresponding to locations of controls 1426a,b and 1428a,b. Similarly, in some embodiments, the controls may additionally sense pressure applied on front surface 1422a of sheet 1422, so that device 1420 may also be operated by pressing on front surface 1422a.

FIGS. 108 and 109 show (from a cross-section point of view) another embodiment of the invention as a device 1400' similar to device 1400. Device 1400', as in device 1400, generally includes flexible display sheets 1422 and 1432 as connected such that their front surfaces (front surface 1422a and 1432a, respectively) are facing outward. In device 1400' there is further included a rigid surface 1440 which has less flexibility than sheets 1422 and 1432. Accordingly, when pressure is applied to any of the sheets, and that sheet is consequently distorted (as specifically shown in FIG. 109 pressure applied on sheet 1432, specifically on front surface 1432a of the sheet), the other sheet may not be influenced (or otherwise may be influenced significantly less than sheet 1432), such as remain undistorted (also as shown in FIG. 109).

In some embodiments, device 1400' may include sensing means for separately sensing pressure applied on sheet 1432 and on sheet 1422, such that pressure applied on sheet 1432 may be sensed as different from pressure applied on sheet 1422. For example, as shown in the figures, device 1400' may include controls 1426a-d located between sheet 1432 and rigid surface 1440, and controls 1426a-d located between sheet 1422 and the rigid surface. Because rigid surface 1440 is dividing between the sheets and between controls 1426a-d and controls 1428a-d, pressure applied on any of the sheets may be sensed by any of the controls located between that sheet and the rigid surface (as shown in FIG. 109, pressure applied on sheet 1432 may be sensed by control 1426b, and optionally by controls 1426a and 1426c, whereas none of controls 1428a-d can sense said pressure which may be somewhat blocked by rigid surface 1440).

In some embodiments, specific inputs may be registered by specific combination of actions performed (by a user) on either or both of sheets 1422 and 1432, such as pressing on a specific combination of locations on sheet 1422 and/or on sheet 1432. Similarly to the described for gestures (see ref. FIGS. 53 through 55) of a hand operating a device of the invention, a hand (or any number of fingers thereof) may perform a combination, or series, of actions, which, by being sensed, may correspond to a specific input. For example, a user may press on a specific location along surface 1432a of sheet 1432, whereas said specific location may correspond to a first control located "beneath" (or "under") the sheet, so that said first control is influenced by the pressing and senses it, for registering a first input. Similarly, for another action, said user may press on a specific location along surface 1422a of sheet 1422, whereas said specific location may correspond to a second control located "beneath" (or "under") the sheet, so that said second control is influenced by the pressing and senses it, for registering a second input. Following the above, a combination of actions may be pressing on both of the aforementioned specific locations (along surfaces 1422a and 1432a) simultaneously (such as from either side of device 1440, in accordance with the shown in FIGS. 42 and 43), whereas by performing said combination of actions, a third input may be registered.

FIG. 110 shows another embodiment of the invention as a device 1450 which is shown including flexible display sheets 1452 and 1462 (or simply "sheets") as connected. Between the sheets may be located units 1454a-c which can sense pressure applied on any of the sheets (similarly to controls 1426a-d and 1428a-d shown in FIGS. 108 and 109), and/or which can generate tactile output (or "tactile feedback") by influencing the topologic state of any of any of the sheets, or otherwise in any way distorting the shape of any of the sheets. In the figure there is shown unit 1454a generating tactile indication 1456a which can be felt by touching a front surface 1452a of sheet 1452, whereas units 1454b and 1454c are shown generating tactile indications 1456b and 1456c, respectively, which may be different than tactile indication 1456a (i.e. feel different when touched).

FIGS. 111 through 113 show unit 1454b in different states, each of said different states may correspond to tactile output generated by the unit or pressure sensed by the unit.

In FIGS. 111 and 112, unit 1454b is shown including a dynamic tactile indicator 1464, whereas in FIG. 111, the dynamic tactile indicator may be in a state 1464a, and whereas in FIG. 113, the dynamic tactile indicator may be in a state 1464b. For example, dynamic tactile indicator 1464 in state 1464a may be deactivated (e.g. an actuator included in or connected to the dynamic tactile indicator may not receive power), whereas the dynamic tactile indicator in state 1464b may be activated (e.g. an actuator included in or connected to the dynamic tactile indicator may be receiving power for facilitating generating tactile feedback).

In FIGS. 112 and 113, unit 1454b is shown including a section 1466 which may be influenced by pressure, and/or which may sense pressure. In FIG. 112, section 1466 is shown at a state 1466a when not being influenced by pressure, whereas in FIG. 113, section 1466 is shown at a state 1466b when being influenced by pressure (e.g. pressed from a certain direction).

FIG. 114 shows a cross-section view of device 1450, wherein sheet 1452 is influenced by unit 1454b such that tactile output 1468, which can be felt by touching sheet 1452, is generated.

Note that tactile indications may substitute displayed interface elements described corresponding to bending location, whereas said tactile indications may correspond to bending locations and may indicate said bending locations by generating tactile output, rather than interface elements being displayed.

Figure 115:
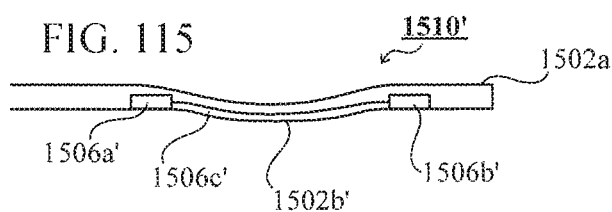
FIG. 115 shows a section of an embodiment of the invention.
Figure 116:
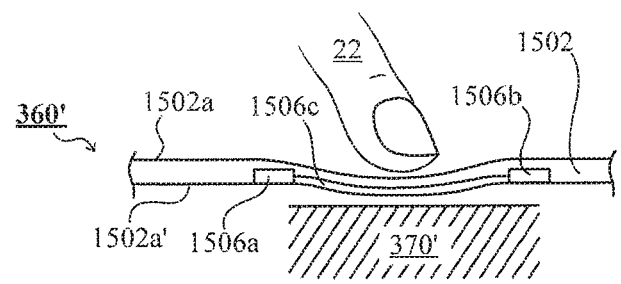
FIG. 116 shows a section of an embodiment of the invention.

FIGS. 115 and 116 show a perspective view of a section of an embodiment of the invention as a flexible display device 1500 (or simply "device") which include a flexible display sheet 1502 (or simply "sheet"). Sheet 1502 may be any apparatus which is flexible and which can display visuals, specifically on a front surface 1502a, opposite to a back surface 1502b (not visible from the point of view of the figures, and numbered by an arrow pointing a side of sheet 1502 opposite to front surface 1502a), in accordance with the described herein for flexible display sheets. Sheet 1502 is shown including a sensor 1504 as means for sensing pressure applied specifically on front surface 1502a of the sheet, and a sensor 1506 (shown having sections 1506*a-c*) as means for sensing bending or topologic states (or changes thereof) of sheet 1502, such as of a corner of sheet 1502 (as shown in the figures as a section of device 1500).

In FIG. 115, sheet 1502 of device 1500 is shown generally straight (i.e. not bent, or otherwise flat) and not being subjected to pressure, whereas in FIG. 116 the sheet is shown bent (generally upward from the viewpoint of the figures). The bending of the sheet is shown generally at (or "generally from") an illustrated dashed-dotted line. As shown in FIG. 116, section 1506*c* of sensor 1506 is shown influenced by the bending (section shown also bent), whereas sensor 1504 is shown unaffected (i.e. not influenced) by the bending.

Figure 117:
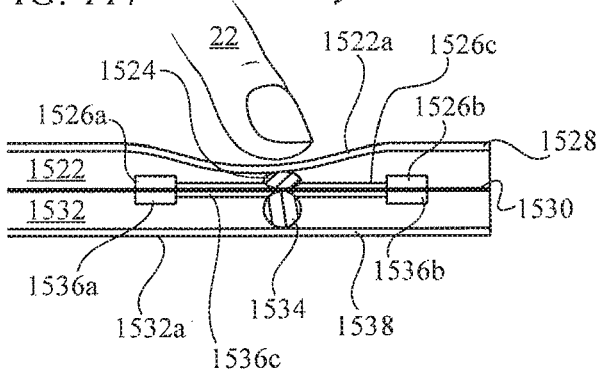
FIG. 117 shows a cross-section of a section of an embodiment of the invention.
Figure 118:
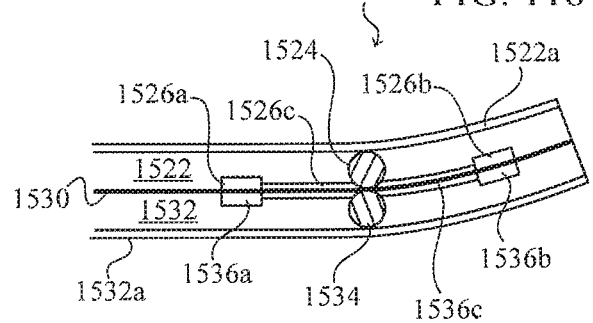
FIG. 118 shows a cross-section of a section of an embodiment of the invention.

FIGS. 117 and 118 show a cross-section view of the section of device 1500 shown from a perspective view in FIGS. 115 and 116. In FIG. 117, sheet 1502 of device 1500 is shown bent upward by finger 22, whereas section 1506*c* of sensor 1506 is shown bent in accordance with the bending of sheet 1502, similarly to the shown in FIG. 115. Accordingly, in FIG. 117, sensor 1506 may be sensing the bending of sheet 1502, such as by detecting the positions of sections 1506*a,b* relative to each other, and/or by measuring the bending of section 1506*c* which is described to be influenced by the bending of sheet 1502. Note that sensor 1504 is shown unaffected by the bending.

In FIG. 118, sheet 1502 is shown generally straight, whereas pressure is shown applied specifically on front surface 1502*a*, by finger 22 (yet it is understood that any other object may be applying the pressure, such as the tip of a stylus). Sensor 1504 is shown influenced by front surface 1502*a* being subjected to pressure (from finger 22) and consequently being distorted. Accordingly, in FIG. 118, sensor 1504 may be sensing pressure applied on front surface 1502*a*. Notice that sensor 1506, or specifically sections 1506*a-c*, is shown unaffected by finger 22 applying pressure specifically on front surface 1502*a*.

In some embodiments, back surface 1502*b* (which is opposite to front surface 1502*a*) may be less flexible (or "more rigid or stiff") than front surface 1502*a*. This may facilitate back surface 1502*b* not being influenced by pressure applied on front surface 1502*a*, or influenced significantly less than front surface 1502*a* when pressure is applied to the front surface (even if back surface 1502*b* is not placed on a non-flexible surface, such as on the surface of a table, or such as on a wall). By back surface 1502*b* being less flexible than front surface 1502*a*, both surfaces may be influenced by bending of sheet 1502, whereas only front surface 1502*a* may be influenced (e.g. distorted) by pressure being applied on it, or may be influenced significantly more than back surface 1502*b* when pressure is applied on the front surface.

Figure 125:
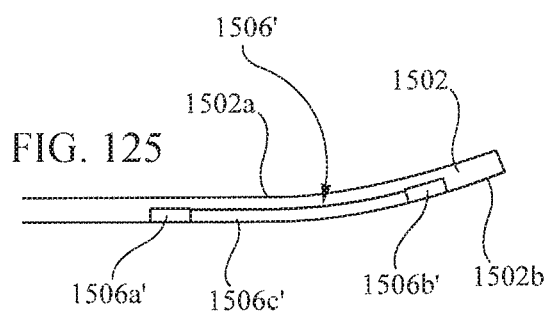
FIG. 125 shows a cross-section of a section of an embodiment of the invention.

Preferably, for bending sheet 1502, as shown in FIG. 117, pressure is directly applied on back surface 1502*b* of the sheet, whereas for distorting only front surface 1502*a* of the sheet, pressure is applied on the front surface (see ref. FIG. 125 for depiction of pressure applied on each surface).

Note that for the described for FIGS. 115 through 126, bending of a flexible display sheet may refer to forming a curve of said flexible display sheet similarly to the shown in FIG. 117, whereas distorting a surface of said flexible display sheet may refer to forming a depression in said flexible display sheet similarly the shown in FIG. 118.

Figure 119:
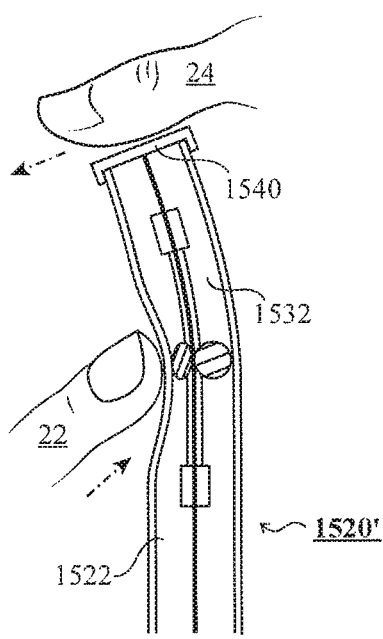
FIG. 119 shows a cross-section of a section of an embodiment of the invention.
Figure 120:
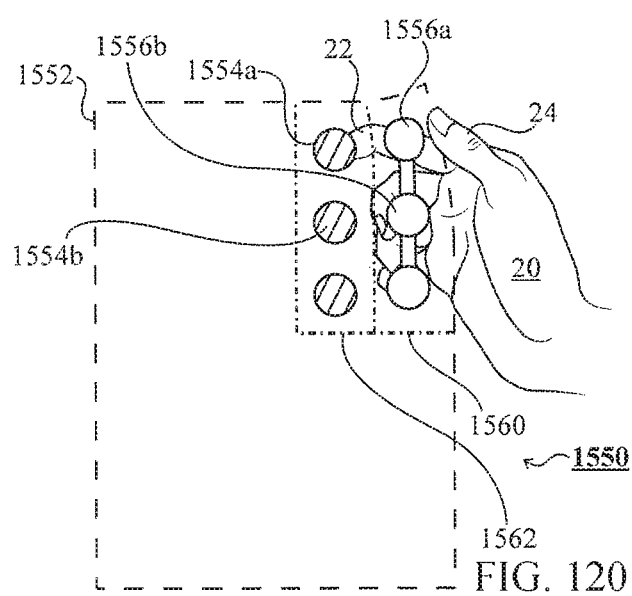
FIG. 120 shows a cross-section of a section of an embodiment of the invention.

FIGS. 119 and 120 show a section (from a cross-section point of view) of another embodiment of the invention as a device 1510 similar to device 1500, whereas device 1510 is shown as including a sensor 1506' (as a variation of sensor 1506) and excluding sensor 1504 (as opposed to the described for device 1500). Sensor 1506' may include sections 1506*a*', 1506*c*' and 1506*c*', whereas the sensor may serve as sensing means for sensing both bending of sheet 1502 and distortion of front surface 1502*a* by pressure applied on the front surface. Specifically, section 1506*c*' (and/or sections 1506*a*' and 1506*b*') of sensor 1506' may be influenced differently from bending of sheet 1502 than from pressure applied on front surface 1502*a* of the sheet. In FIG. 119 (wherein sheet 1502 is bent), section 1506*c*' is shown bent by the bending of sheet 1502, for sensing said bending of the sheet, whereas in FIG. 120 (wherein pressure is applied on front surface 1502*a*), the section is shown distorted in a different manner than in FIG. 119, for sensing pressure applied on front surface 1502*a* (or otherwise for sensing distortion of the front surface). Additionally or alternatively (such as for other exemplary means for sensing bending of sheet 1502 differently then sensing pressure applied on front surface 1502*a*), by bending sheet 1502, the relative positions of sections 1506*a*' and 1506*b*' may be changed (FIG. 119), whereas by applying pressure on front surface 1502*a* (and preferably by front surface 1502*a* being more flexible than back surface 1502*b*), the relative positions of the sections may not be changed (FIG. 120).

Figure 121:
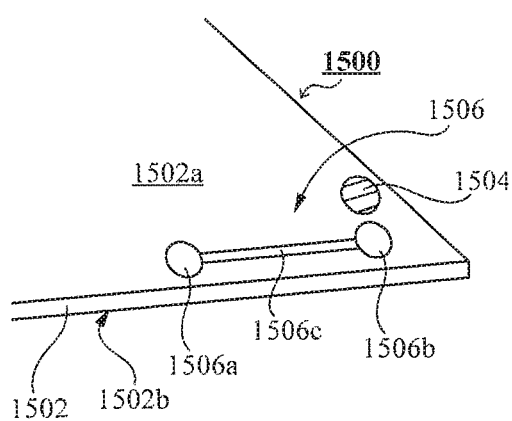
FIG. 121 shows a cross-section of a section of an embodiment of the invention.

FIG. 121 shows a cross-section view of a section of an embodiment of a device 1510' similar to device 1510, whereas in device 1510', a back surface 1502*b*' is substituting back surface 1502*b*. In device 1510', back surface 1502*b*' may have a flexibility similar to the flexibility of front surface 1502*a* (as opposed to back surface 1502*b* as described for devices 1500 and 1510, which may be more rigid or stiff than front surface 1502*a*), so that when pressure is applied to front surface 1502*a* of device 1510', back surface 1502*b*' may be distorted in accordance with distorting of the front surface, as shown in the figure both surfaces similarly distorted.

In device 1510', when pressure is applied on front surface 1502*a*, section 1506*c*' of sensor 1506' (shown sections 1506*a*', 1506*b*' and 1506*c*' of the sensor in FIG. 121) may bend in accordance with bending of front surface 1502*a* and back surface 1506*b*' of device 1510', whereas the relative positions of sections 1506*a*', 1506*b*' may remain unchanged, as opposed to changing of the relative positions of the sections when sections 1502' of the device is bent.

Figure 122:
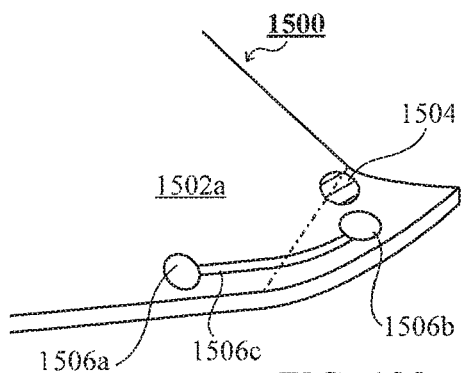
FIG. 122 shows a cross-section of a section of an embodiment of the invention.

FIG. 122 shows a close up view (similar to the shown in FIGS. 37 and 38) of a device 360' similar to device 360 (see ref. FIGS. 37 and 38). For device 360', a section 370' may be substituting section 370 described for device 360, and sheet 1502 may be substituting sheet 380, whereas alternatively to section 370, section 370' excludes controls 372, 374 and 376 (see ref. FIG. 36). Device 360' may have similar features to device 360 even when the controls are excluded. In FIG. 122 for device 360', pressing on the exposed surface of sheet 1502 (front surface 1502*a* as shown in the figure) may facilitate registering input by distortion of the sheet being sensed by any of sections 1506*a-c* in sheet 1502, alternatively to any of the controls in section 370 of device 360 sensing pressure.

Figure 123:
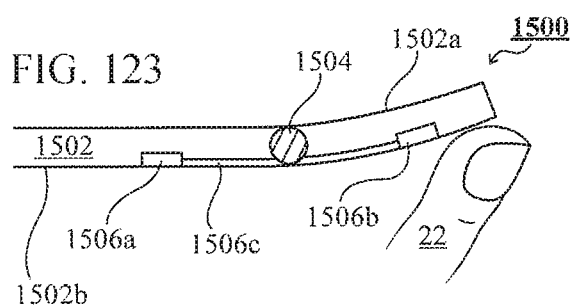
FIG. 123 shows a cross-section of a section of an embodiment of the invention.
Figure 124:
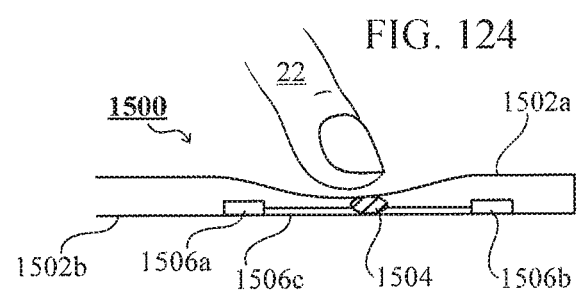
FIG. 124 shows a cross-section of a section of an embodiment of the invention.

FIGS. 123 and 124 show (from a cross-section point of view) a section of another embodiment of the invention as a device 1520 which generally includes flexible display sheets 1522 and 1532 (or simply "sheets"). Sheets 1522 and 1532 may include display surfaces 1522*a* and 1532*a*, respectively, on which visuals may be displayed. The display surfaces may be facing opposite directions. In the figures there are specifically shown flexible display apparatuses 1528 and 1538 of sheets 1522 and 1532, respectively, for depicting how visuals may be displayed from "in front" of the sheets, whereas other elements of device 1520 may be located "behind", and optionally obscured by, flexible display apparatuses 1528 and 1538 which facilitate generating visuals on display surfaces 1522a and 1532a, respectively. "Behind" flexible display apparatus 1528, inside sheet 1522, may be located a sensor 1524 similar to sensor 1504 (see ref. FIGS. 115 through 118) and sections 1526a-c similar to sections 1506a-c of sensor 1506. "Behind" flexible display apparatus 1538, inside sheet 1532, may be located a sensor 1534 similar to sensor 1524, and sections 1536a-c similar to sections 1526a-c.

In some embodiments, generally between sheets 1522 and 1532 there may be located a rigid surface 1530 similar to rigid surface 1440 shown in FIGS. 118 and 119. Rigid surface 1530 may accordingly prevent influence from pressure applied on any of the sheets from influencing the other sheet. In FIG. 123, similarly to the shown in FIG. 118 for device 1510, pressure may be applied on front surface 1522a of sheet 1522 by finger 22, such that said pressure may influence and/or be sensed by sensor 1524 and not by any other sensing means. Notice that as said pressure distorts sheet 1522, said pressure does not influence the shape of sheet 1532. In FIG. 124, similarly to the shown in FIG. 117 for device 1510, both sheets 1522 and 1532 may be bent, such that any of sections 1526a-c and 1536a-c may be influenced by and/or may sense the bending of the sheets. Notice that sensors 1524 and 1534 are shown not influenced by the bending.

FIG. 125 shows an embodiment of a device 1520' similar to device 1520 and further including means for facilitating bending of both sheets 1522 and 1532, as a section 1540 by way of example. In the figure, finger 22 is shown applying pressure on sheet 1522 (suggested direction of applying pressure illustrated by dashed-dotted arrow next to the finger), for distorting sheet 1522, whereas thumb 24 is shown simultaneously operating section 1540 (e.g. pushing the section, as suggested by pushing direction illustrated by dashed-dotted arrow next to the thumb), for bending both sheets 1522 and 1532. Accordingly, section 1540 may facilitate bending of both sections such that the sections are bent yet may not be distorted, unless a force is applied to any of the sections directly, such as shown pressure applied directly on sheet 1522 by finger 22.

Figure 126:
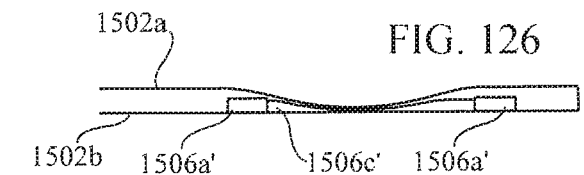
FIG. 126 shows an embodiment of the invention being used.

FIG. 126 shows another embodiment of the invention as a flexible display device 1550 (or simply "device") generally including a flexible display sheet 1552 (or simply "sheet"). Sheet 1552 is illustrated in the figure by dashed lines to facilitate depicting other elements of device 1550 inside sheet 1552 or connected thereto.

In some embodiments, sheet 1552 may include a region 1560 (defined by illustrated dashed-dotted lines and right and top side of the sheet) which includes, or which is connected to, sensing means 1556a,b (which, in some embodiments, may be any plurality of sensor 1506, see ref. FIGS. 115 through 118) for sensing bending specifically of the region. Additionally, sheet 1552 may include a region 1562 (defined by dashed-dotted lines and top side of the sheet, generally located left of region 1560 from the point of view of FIG. 126) which includes, or which is connected to, sensing means 1554a,b (which, in some embodiments, may be any plurality of sensor 1504, see ref. FIGS. 115 through 118) for sensing distortions of sheet 1552 other than bending of region 1560, such as sensing pressure applied on a back surface of sheet 1552 (similarly and alternatively to the described above for pressure applied on front sides of flexible display sheet), specifically in the perimeter of region 1562 (where sensing means 1554a,b are shown to be located).

In FIG. 126, hand 20 is shown operating device 1550 by bending region 1560 (shown curve top right corner of sheet 1552 which may be included in the region) and by applying pressure on locations in the perimeter of region 1562, specifically from the back of sheet 1552 (i.e. pressure specifically applied on a back surface of the sheet, inside the perimeter of the region). Thumb 24 of hand 20 is specifically shown manipulating the upper right corner of sheet 1552, for forming a curve, whereas finger 22 of the hand is specifically shown applying pressure on a location in the perimeter of region 1562, specifically from the back of sheet 1552, whereas said location may correspond to the location of sensing means 1554a (as shown in the figure), so that pressure applied on said location may be sensed by sensing means 1554a. Notice that thumb 24 is manipulating the upper right corner of the sheet (which is included in the perimeter of region 1560) and finger 22 is applying pressure on a location corresponding to sensing means 1554a (inside the perimeter of region 1562) simultaneously. Accordingly, device 1550 may be operated by combinations of actions of bending of sheet 1552 and applying pressure on locations along a back surface of the sheet, simultaneously or otherwise (e.g. by a sequence of subsequent actions). This may be facilitated by sheet 1552 having a plurality of regions, on each of which different actions may be performed. Note that the described for applying pressure on a back side of sheet 1552 may be beneficial when holding device 1550, as fingers of a hand holding the device may be located "behind" the sheet (from a point of view of a user holding the device) such that said finger may have access to locations along said back side of sheet 1552.

Figures 127, 128, 129:
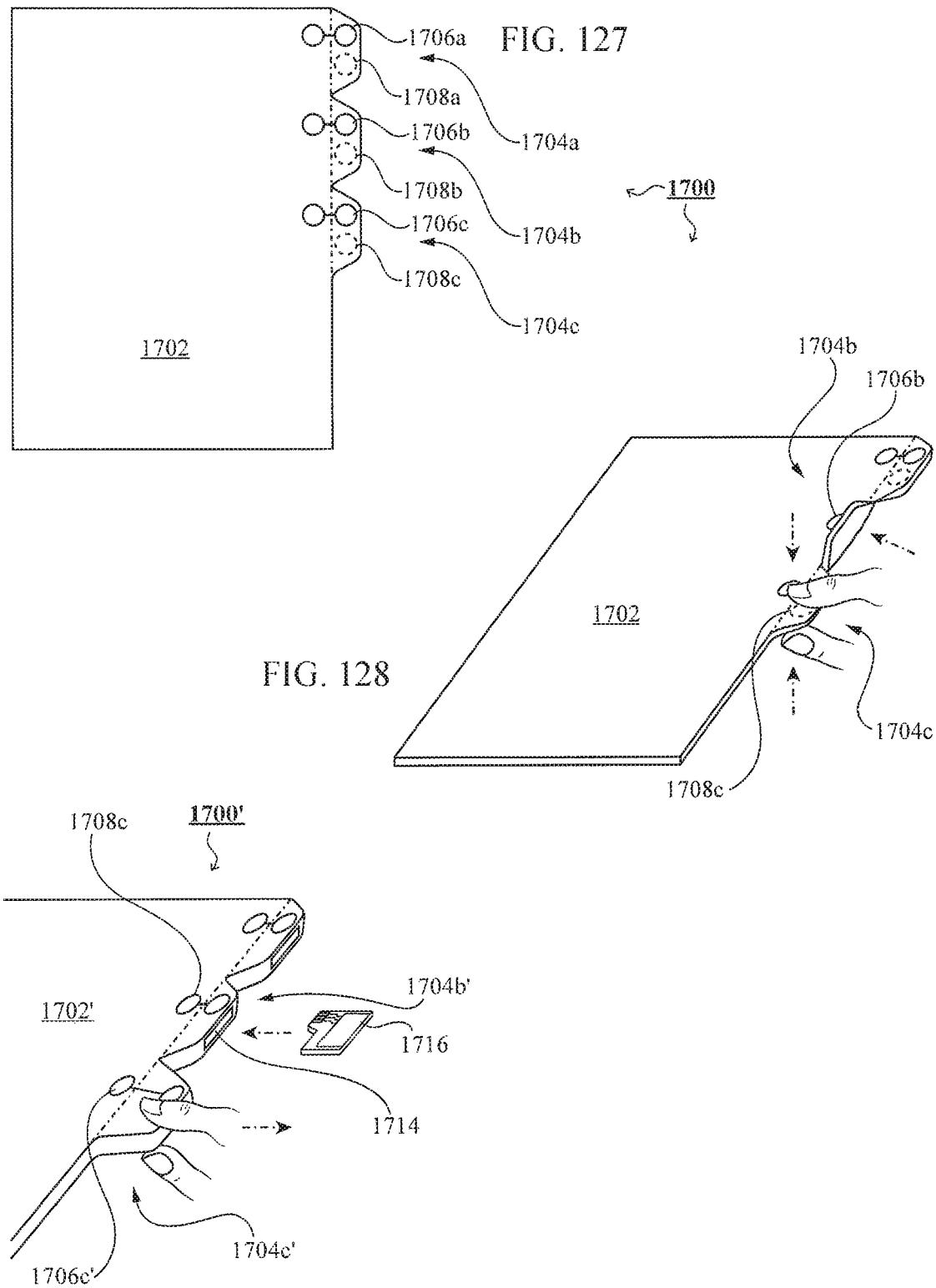
FIGS. 127 and 128 show an embodiment of the invention.
FIG. 129 shows an embodiment of the invention.

FIG. 127 shows a front view of an embodiment of the invention as a flexible display device 1700 (or simply "device") which generally includes a flexible display sheet 1702 (or simply "sheet") and tabs 1704a-c. The tabs may be operated, or interacted with, for registering input in device 1700, such as to control visuals displayed on sheet 1702 of the device.

In some embodiments, tabs 1704a-c may be extensions of sheet 1702, whereas in other embodiments the tabs may be units of device 1700 connected to sheet 1702. Said units may be permanently connected to sheet 1702, or otherwise installed on the sheet, whereas alternatively, said units may be modular so that they can be connected to and disconnected from the sheet.

In some embodiments, tabs 1704a-c may include sensors 1706a-c, respectively, for sensing bending of the tabs relative to sheet 1702, whereas additionally or alternatively, tabs 1704a-c may include 1708a-c, respectively, for sensing other manipulations of or influences on tabs 1704a-c, such as pressure applied from opposite sides of a tab while said tab is not bent relative to the sheet.

Note that alternatively to including sensors, as described in the previous paragraph, tabs 1704a-c may be connected to sensors or may otherwise be adapted to influence sensors to facilitate the described sensing.

FIG. 128 shows a perspective view of device 1700. In FIG. 128, tab 1704b is shown bent relative to sheet 1702 of the device (suggested bending direction illustrated by diagonal dashed-dotted arrow) such that the bending of tab 1704b may be sensed by sensor 1706b. Further in FIG. 128, tab 1704c is shown being pressed by a finger and a thumb, from opposite directions (suggested pressing directions illustrated by vertical dashed-dotted arrows), such that the pressing of tab 1704*c* may be sensed by sensor 1708*c*.

In some embodiments, any of tabs 1704*a-c* may be stretched, such as by pulling on said any of tabs 1704*a-c*. Accordingly, in some embodiments, 1704*a-c* may be mainly made of, or may include, any number of stretchable materials and/or components. The stretchable feature of any of the tabs (in some embodiments) may or may not be in common with sheet 1702 (i.e. sheet 1702 may or may not be stretchable), whereas it is made clear that in case only any of the tabs are stretchable, stretching of said any of the tabs may be facilitated nonetheless, such as by stretching a tab relative to sheet 1702. It is further made clear that in accordance with the described herein for manipulating flexible sheets and regions and sections thereof (e.g. by bending), stretching of any of tabs 1704*a-c* may be for registering inputs (in device 1700) corresponding to the stretching, additionally or alternatively to any other manipulations of any of the tabs (i.e. actions performed on any of the tabs).

FIG. 129 shows a close-up perspective view of a device 1700' similar to device 1700. Included in device 1700', such as an extension of flexible display sheet 1702' similar to sheet 1702, is a tab 1704*c*' which following the previous paragraph may be stretchable. Tab 1704*c*' is shown in FIG. 129 stretched by a finger and a thumb (suggested stretching direction illustrated by a dashed-dotted arrow), whereas the stretching of the tab may be sensed by a sensor 1706*c*' (included in device 1700' and located correspondingly to tab 1704*c*' to facilitate sensing stretching of the tab) which can sense the stretching (such as by being influenced by the stretching), preferably for registering appropriate input. Note that in some embodiments, other actions may be performed on tab 1704*c*', simultaneously to stretching of the tab, or otherwise, whereas said other actions may be sensed by any sensing means, for registering input corresponding to said other actions (see pressing on tab 1704*c* of device 1700 in FIG. 128, as an example of an action other than stretching).

In FIG. 129 there is further shown a tab 1704*b*' which may include a connector 1714 (e.g. a socket, or electric contacts) for facilitating connection of a memory unit 1716 to device 1700'. Similarly and alternatively, connector 1714 may facilitate connection of other elements to the device, such as a power source (e.g. a battery). Accordingly, tabs of a device of the invention may facilitate, such as by including any number of connection units (or "connectors"), connecting external (or "separate") elements (or "components") to said device. For example, 1704*b*' may be thicker than the thickness of sheet 1702', for facilitating connecting to the sheet elements which cannot be directly connected to the sheet, such as because the sheet is not thick enough to accommodate said elements.

FIG. 130 shows an embodiment of the invention as a device 1800 which generally includes flexible display sheets 1802 and 1804 (or simply "sheets") having display surfaces 1802*a* and 1804*a*, respectively. The sheets are shown positioned such that the general shape of device 1800 resembles a common shape of an open book (open to a certain extent).

In some embodiments, sheets 1802 and 1804 may be connected by a section 1806 which facilitates tilting (or otherwise "in any way repositioning") the sheets relative to each other. Said tilting, in accordance with the general positions of the sheets as shown in FIG. 130, may be similar to flipping pages in an open book, or adjusting the angle of a cover of an open book. For example, section 1806 may be a hinge to which both sheets may be connected.

In some embodiments, section 1806 may be flexible, preferably more than sheets 1802 and 1804, for convenient repositioning of the sheets relative to each other. Optionally, section 1806 may be stretchable, such as by having high elasticity, preferably significantly higher elasticity than sheets 1802 and 1804. Accordingly, section 1806 may be stretched by pulling the sheets apart (suggested pulling directions illustrated by arrows directed generally away from the sheets).

In some embodiments, device 1800 may include sensing means 1816*a,b* for sensing repositioning (e.g. tilting) of any of sheets 1802 and 1804 relative to the other, and/or for sensing stretching of section 1806. Sensing performed by sensing means 1816*a,b* may be for registering input in device 1800, or for prompting operations of device 1800, whereas said input and said operations may correspond to how sheets 1802 and 1804 are repositioned and/or to how section 1806 is stretched (e.g. how hard, or with how much force).

Notice that further shown in FIG. 130 are connectors 1808*a,b* as means for temporarily connecting (and optionally locking the temporary connection) sides of sheets 1802 and 1804 which are not connected to section 1806 (and so are not directly connected to each other). Preferably, connectors 1808*a,b* may connect said sides when surfaces of the sheets are overlapping each other, such as when display surfaces 1802*a* and 1804*a* are facing each other and overlap each other (see ref. FIG. 132 showing overlapping flexible display sheets).

FIG. 131 shows an embodiment of a device 1800' similar to device 1800. In device 1800', substituting sheet 1802 of device 1800, is a flexible display sheet 1802' (or simply "sheet"). Sheet 1802' may be divided to any number of regions having different flexibility, so that more flexible regions may be manipulated (such as bent or otherwise distorted) without influencing other regions. For example, sheet 1802' is shown in the figure including a region 1812*a* which may be less flexible than a region 1812*b* which may also be shown included in the sheet. As shown in the figure, region 1812*b*, or any section thereof, may be bent relative to region 1812*a*, or otherwise may be bent while region 1812*a* remains unbent. This may facilitate registering input by manipulating (e.g. bending) region 1812*b* while sheet 1802', in which region 1812*a* may be a significantly larger region than region 1812*b*, may be generally or mostly rigid, in accordance with low flexibility of region 1812*a*. A generally or mostly rigid sheet 1802' may facilitate repositioning sheet 1802' relative to sheet 1804, without distorting the shape (or topology) of sheet 1802'.

FIG. 132 shows another embodiment of the invention as a device 1820 (which may generally be similar to device 1800) which is shown including flexible display sheets 1822 and 1824 connected to each other. Facilitating connection between the sheets may be a section 1826, shown included in device 1820, which may be similar to section 1806 of device 1800 (so that section 1826 may facilitate repositioning of any of the sheets relative to the other).

In FIG. 132, device 1820 is shown in a state in which sheets 1822 and 1824 are overlapping each other, and specifically a state in which back surfaces 1822*b* and 1824*b* or sheets 1822 and 1824 (respectively) are facing outward. Back surfaces 1822*b* and 1824*b* may be surfaces which are more rigid (or less flexible) than other surfaces of the sheets. Preferably, back surfaces 1822*b* and 1824*b* may be robust, for protecting other elements of sheets 1822 and 1824, such as delicate electronics located between back surfaces 1822*b* and 1824*b* and any other surfaces of the sheets. Said other elements may be covered or concealed by the back surfaces when device 1820 is in the state shown in FIG. 132.

In FIG. 132 there is further shown a connection 1828a (such as a connection between connectors of each of sheets 1822 and 1824), for securing or maintaining (and optionally locking) the state of device 1820 as shown in the figure, or specifically the positions of the sheets as shown in the figure.

By repositioning any of sheets 1822 and 1824 relative to the other, device 1820 may change to other states than the state shown in FIG. 132. Notice suggested repositioning directions illustrated by curved dashed-dotted arrows.

FIG. 133 shows a state of device 1820 different than the shown in FIG. 132, whereas in FIG. 133, sheets 1822 and 1824 may have been repositioned from their position shown in FIG. 132. For example, sheet 1824 may have been tilted to be positioned generally from another side of sheet 1822 (from the point of view of FIGS. 132 and 133), as suggested by tilting direction illustrated by a curved dashed-dotted arrow in FIG. 133. Optionally, for the state of device 1820 shown in FIG. 133, connection 1828 may have been disconnected.

FIG. 134 shows yet another state of device 1820 wherein sheet 1824 may have been tilted further than the tilted position of the sheet shown in FIG. 133 (relative to the position of the sheet shown in FIG. 132).

In FIG. 134, back surfaces 1822b and 1824b of sheets 1822 and 1824 are facing each other and overlap each other, and are also facing inward, whereas display surfaces 1822a and 1824a (on which visuals may be displayed) of sheets 1822 and 1824 (respectively) are facing outward, so that they are visible, and so that visuals displayed on the display surfaces may be viewed. Optionally, when device 1820 is in the state shown in FIG. 134, a connection 1828b may be formed between sheets 1822 and 1824, for securing or maintaining (and optionally for locking) the positions of the sheets in that state of device 1820.

In some embodiments, when device 1820 is in the state shown in FIG. 134, sheets 1822 and 1824 may be manipulated for registering input (or otherwise for operating or interacting with the device). As previously described for some flexible display sheets, sheet 1822 and/or sheet 1824 may be bent, such as shown in FIG. 134 sheet 1822 bent at a corner by thumb 24 (suggested bending direction illustrated by a dashed-dotted arrow extending from the thumb), preferably for registering corresponding input. Further as previously described, pressure may be applied on display surface 1822a and/or display surface 1824a, for distorting display surface 1822a and/or display surface 1824a, as shown in FIG. 134 finger 22 pressing on display surface 1822a (suggested pressing direction illustrated by dashed-dotted arrow next to the finger) for registering correspond input.

Figure 135:
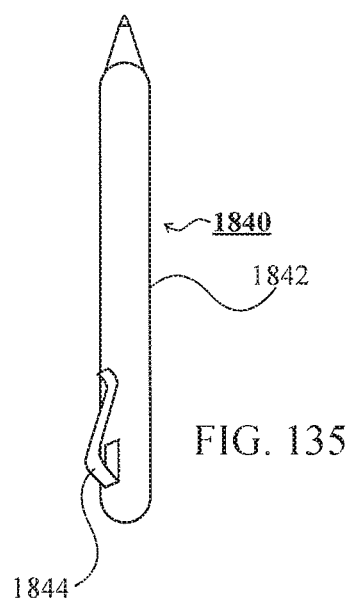
FIG. 135 shows an element of embodiments of the invention.

FIG. 135 shows an embodiment of the invention as a stylus 1840. Stylus 1840 may be any stylus known in the art for interacting with devices, such styluses common in so-called tablet-PCs. Stylus 1840 is shown in the figure including an elongated body 1842 and a clip 1844 similar to common clips of common pens.

Figure 136:
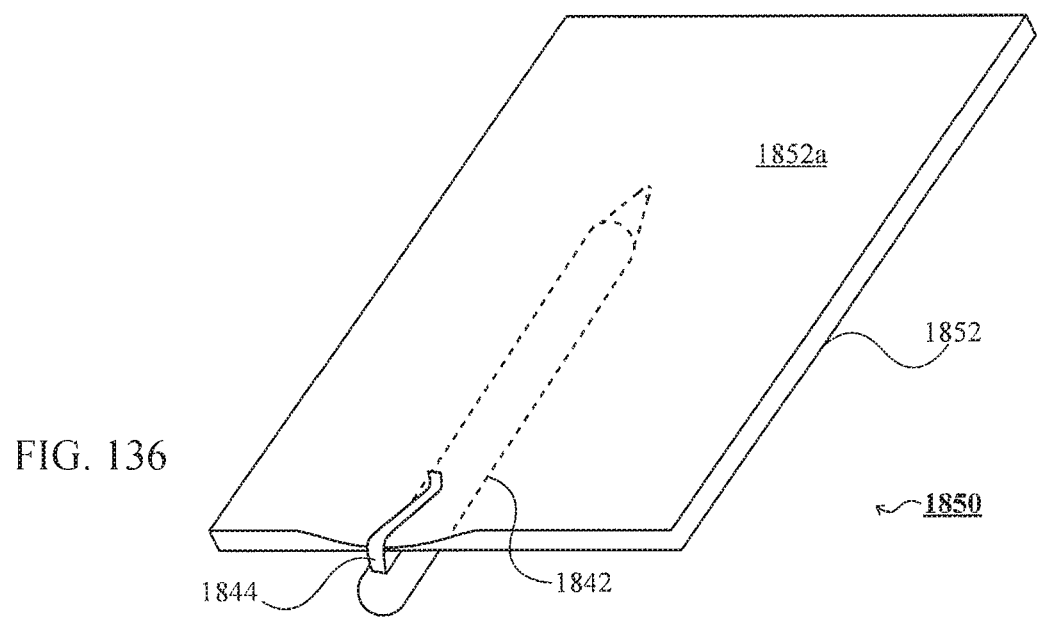
FIG. 136 shows an embodiment of the invention.

FIG. 136 shows another embodiment of the invention as a system 1850 which generally includes stylus 1840 and a flexible display sheet 1852 (or simply "sheet"). In the figure, the stylus is shown connected to the sheet by utilizing clip 1844. As shown in the figure, when the stylus and the sheet are connected by utilizing the clip, the clip may apply pressure on a display surface 1852a of sheet 1852, which may result in distortion of the display surface. Said distortion may be sensed, in accordance with the described herein, for registering input. For example, when stylus 1840 is connected to sheet 1852 by clip 1844 being clipped on the sheet, power may be turned off, as an exemplary operation prompted by registering input from sensing distortion caused by the clip on front surface 1852a. Similarly, when the stylus is disconnected from the sheet, said distortion caused by the clip may cease to be present in front surface 1852a, whereby power may be turned on, as an exemplary operation corresponding to removing the clip from the sheet.

Note that the described herein for flexible display sheets and flexible display devices may be interchanged, such that flexible display sheets, as mentioned herein, may refer to devices which mainly include flexible display sheets. Accordingly, mentioning of flexible display sheets in the described herein may refer to devices mainly including flexible display sheets.

Further note that any flexible display sheet mentioned herein, or any flexible display device mentioned herein may include any necessary elements which facilitate displaying of visuals (see e.g. display apparatus 152b of device 150 shown in FIG. 14) and flexibility features.

Further note that any mentioning of sections of embodiments of the invention (or of elements thereof) may refer to parts, components, objects, items, units, areas, regions, modules, etc.

While the described herein is for certain embodiments of devices of the invention featuring certain elements, it will be appreciated that other embodiments may be included in the scope of the invention which feature different combinations of elements described herein, and their equivalences as known in the art.

While the invention has been described with respect to a limited number of embodiments, it will be appreciated that many variations, modifications and other applications of the invention may be made.

What is claimed is:

1. A display device comprising:
   a housing comprising an opening portion and at least one controller configured to change a state of the display device;
   a flexible display comprising a display area and configured to display visual information in the display area of the flexible display and to be rolled into and out of the housing through the opening portion based on the state of the display device;
   a plurality of support parts coupled to the flexible display and configured to support at least a portion of the flexible display and to be rolled into and out of the housing through the opening portion together with the flexible display based on the state of the display device such that at least the portion of the flexible display supported by the plurality of support parts; and
   a plurality of support strips provided at a rear side of the flexible display and configured to be changed to a first configuration or a second configuration based on the state of the display device,
   wherein a size of the visual information displayed in the display area of the flexible display is changed based on the state of the display device.

2. The display device as claimed in claim 1, wherein the plurality of support strips comprise a first group of support strip parts for supporting an area of the flexible display in a first direction and a second group of support strip parts for supporting the area of the flexible display in a second direction perpendicular to the first direction.

3. The display device as claimed in claim 2, wherein the plurality of support parts are further configured to support the area of the flexible display in the first direction by connecting strip support parts corresponding to the area of the flexible display from among the first group of support strip parts.

4. The display device as claimed in claim 3, wherein the connected support strip parts of the first group of support strip parts are in contact with each other in cross sections of adjacent support strip parts.

5. The display device as claimed in claim 2, wherein the plurality of support parts are further configured to support the area of the flexible display in the second direction by support strip parts corresponding to the area of the flexible display from among the second group of support strip parts.

6. The display device as claimed in claim 1, wherein the plurality of support parts comprise a locking part, and
wherein the plurality of support parts are further configured to, in response to a user manipulation for maintaining the flexible display in a rolled out state when the user manipulation is input, maintain the rolled out state of the flexible display via the locking part.

7. The display device as claimed in claim 6, wherein the rolled out state includes a first state in which an entirety of the flexible display is rolled out of the housing and a second state in which a partial area of the flexible display is rolled out of the housing.

8. The display device as claimed in claim 1, wherein the plurality of support strips comprise a plurality of support strip parts connected in a series, and
wherein the plurality of support strip parts are aligned to form a straight rod based on an area of the flexible display being rolled out of the housing.

9. The display device as claimed in claim 8, wherein the plurality of support parts further comprise a flexible string stretchable to align the plurality of support strip parts to form the straight rod.

10. The display device as claimed in claim 1, wherein the housing further comprises a second opening portion,
wherein the display device further comprises:
a second flexible display configured to be rolled into and out of the housing through via the second opening portion; and
a plurality of second support parts connected to the second flexible display for supporting the second flexible display, the second support parts being configured to be rolled into and out of the housing through the second opening portion, and
wherein the plurality of second support parts are further configured to, based on an area of the second flexible display being rolled out of the housing, be rolled out of housing through the second opening portion and support the area of the second flexible display so that the area of the second flexible display is flat.

11. The display device as claimed in claim 2, wherein the first group of support strip parts and the second group of support strip parts cross with each other on the rear side of the flexible display.

* * * * *